(12) United States Patent
Kaku et al.

(10) Patent No.: US 12,151,593 B2
(45) Date of Patent: Nov. 26, 2024

(54) SEAT SYSTEM WITH SENSOR AND USER INTERFACE

(71) Applicant: TS TECH CO., LTD., Asaka (JP)

(72) Inventors: Hiroyuki Kaku, Tochigi (JP); Atsushi Kusano, Tochigi (JP); Munetaka Kowa, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 249 days.

(21) Appl. No.: 17/604,459

(22) PCT Filed: Apr. 6, 2020

(86) PCT No.: PCT/JP2020/015548
§ 371 (c)(1),
(2) Date: Oct. 18, 2021

(87) PCT Pub. No.: WO2020/213459
PCT Pub. Date: Oct. 22, 2020

(65) Prior Publication Data
US 2022/0194264 A1  Jun. 23, 2022

(30) Foreign Application Priority Data

Apr. 19, 2019 (JP) ................................ 2019-079901
Apr. 19, 2019 (JP) ................................ 2019-079902
(Continued)

(51) Int. Cl.
*B60N 2/00* (2006.01)
*A63F 13/24* (2014.01)
(Continued)

(52) U.S. Cl.
CPC .............. *B60N 2/002* (2013.01); *A63F 13/24* (2014.09); *H04N 7/183* (2013.01); *H04N 23/56* (2023.01)

(58) Field of Classification Search
CPC ... A47C 7/62; A61B 5/18; A63F 13/21; A63F 13/24; A63F 13/327; A63F 13/67;
(Continued)

(56) References Cited

U.S. PATENT DOCUMENTS 7,161,490 B2   1/2007 Huiban
8,095,278 B2   1/2012 Schaaf et al.
(Continued)

FOREIGN PATENT DOCUMENTS

CN    107264341 A    10/2017
JP    S59-14877      1/1984
(Continued)

OTHER PUBLICATIONS

Office Action (with English translation) received in corresponding Application No. JP 2019-079990, dated Apr. 17, 2023, 10 pages.
(Continued)

*Primary Examiner* — Stephen R Burgdorf
(74) *Attorney, Agent, or Firm* — Dority & Manning, P.A.

(57) ABSTRACT

To provide a seat system that allows the information of the user seated in the seat to be acquired by another user, a seat system includes: a seat main body; at least one sensor provided in the seat main body; a control device for processing a signal from the sensor; and a first user interface communicating with the control device and notifying information based on a signal from the control device. Preferably, the sensor acquires information obtained from a seated person who is seated on the seat main body. Preferably, the seat system includes a camera for capturing an image of the seated person who is seated on the seat main body, and the control device causes the first user interface to display the image captured by the camera.

7 Claims, 32 Drawing Sheets

(30) Foreign Application Priority Data

Apr. 19, 2019 (JP) ................................ 2019-079990
Apr. 19, 2019 (JP) ................................ 2019-079991

(51) Int. Cl.
*H04N 7/18* (2006.01)
*H04N 23/56* (2023.01)

(58) Field of Classification Search
CPC ....... A63F 13/847; A63F 13/90; B60K 35/00; B60K 37/06; B60N 2/002; B60N 2/0244; B60N 2/90; B60Q 3/46; B60Q 3/70; B60R 1/00; B60R 11/02; B60W 40/08; G06F 3/0488; H04L 67/12; H04M 1/00; H04M 1/72403; H04N 7/183; H04N 23/56
USPC ......................................................... 340/667
See application file for complete search history.

(56) References Cited

U.S. PATENT DOCUMENTS

| | | | |
|---|---|---|---|
| 9,896,002 | B2 | 2/2018 | Zouzal et al. |
| 10,457,179 | B1* | 10/2019 | Kentley-Klay ........ B60N 2/879 |
| 2009/0108649 | A1* | 4/2009 | Kneller .................. B64D 11/00 244/129.1 |
| 2012/0086249 | A1 | 4/2012 | Hotary et al. |
| 2012/0183940 | A1* | 7/2012 | Aragones ........... A63B 24/0075 434/247 |
| 2012/0242474 | A1* | 9/2012 | Oh ...................... G01C 21/3697 340/441 |
| 2012/0271143 | A1* | 10/2012 | Aragones ................ G09B 5/02 600/595 |
| 2014/0015971 | A1* | 1/2014 | DeJuliis ............. A61B 5/02055 348/148 |
| 2015/0341755 | A1* | 11/2015 | Choi ..................... G06F 3/0486 455/457 |
| 2016/0288708 | A1* | 10/2016 | Chang .................. G06V 20/597 |
| 2016/0316237 | A1* | 10/2016 | Couleaud ......... H04N 21/44218 |
| 2016/0327933 | A1 | 11/2016 | Lohken et al. |
| 2017/0054949 | A1* | 2/2017 | Shaw ................. G02B 27/0101 |
| 2017/0212633 | A1* | 7/2017 | You ....................... G06F 3/0412 |
| 2017/0313248 | A1* | 11/2017 | Kothari .................... B60R 1/28 |
| 2017/0323639 | A1* | 11/2017 | Tzirkel-Hancock ... H04R 5/023 |
| 2018/0304774 | A1* | 10/2018 | Mizoi .................... B60N 2/002 |
| 2019/0077288 | A1 | 3/2019 | Gayon et al. |
| 2019/0225232 | A1* | 7/2019 | Blau .................... G05D 1/0088 |
| 2019/0355178 | A1* | 11/2019 | Hermina Martinez ..................... G06V 20/593 |
| 2020/0023239 | A1* | 1/2020 | Hwang ................ A63B 26/003 |
| 2020/0213560 | A1* | 7/2020 | Zhang ................... H04N 7/147 |
| 2021/0221259 | A1 | 7/2021 | Mizoi |

FOREIGN PATENT DOCUMENTS

| | | |
|---|---|---|
| JP | H11-64131 | 3/1999 |
| JP | 2004530503 A | 10/2004 |
| JP | 2010285148 A | 12/2010 |
| JP | 2013062694 A | 4/2013 |
| JP | 2013090548 A | 5/2013 |
| JP | 2013538755 A | 10/2013 |
| JP | 2015009759 A | 1/2015 |
| JP | 2015-213571 | 12/2015 |
| JP | 2016193035 A | 11/2016 |
| JP | 2017081401 A | 5/2017 |
| JP | 2017192666 A | 10/2017 |
| JP | 2018075357 A | 5/2018 |
| JP | 2019036152 A | 3/2019 |
| JP | 2020-19407 | 2/2020 |

OTHER PUBLICATIONS

Office Action (with English translation) received in corresponding Application No. JP 2019-079902. dated Apr. 19, 2023, 11 pages.
Office Action (with English translation) received in corresponding Application No. JP 2019-079901, dated Apr. 21, 2023, 6 pages.
PCT International Search Report (w/ English translation) for corresponding PCT Application No. PCT/JP2020/015548, mailed on Jun. 16, 2020, 5 pages.
Korean Office Action (w/ English translation) for corresponding Application No. 2021-7037008, dated Nov. 22, 2023, 10 pages.
Chinese Office Action (w/ English translation) for corresponding Application No. 202080028012.9, dated Mar. 6, 2024, 14 pages.
Japanese Office Action (w/ English translation) for corresponding Application No. 2023-142272, dated Jul. 9, 2024, 9 pages.
Japanese Office Action (w/ English translation) for corresponding Application No. 2023-142276, dated Jul. 9, 2024, 8 pages.

* cited by examiner

Fig.26
(A) 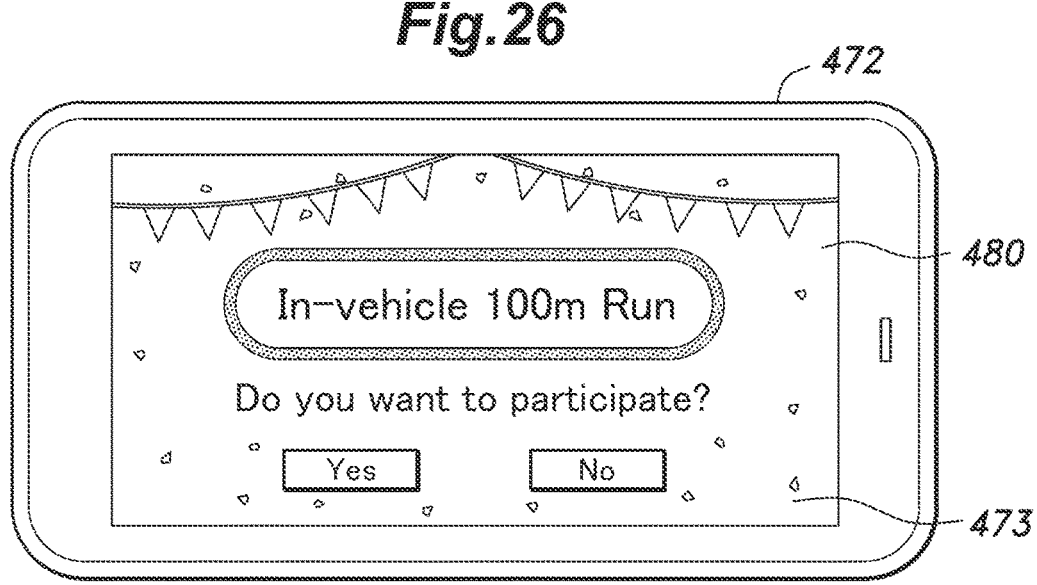
(B) 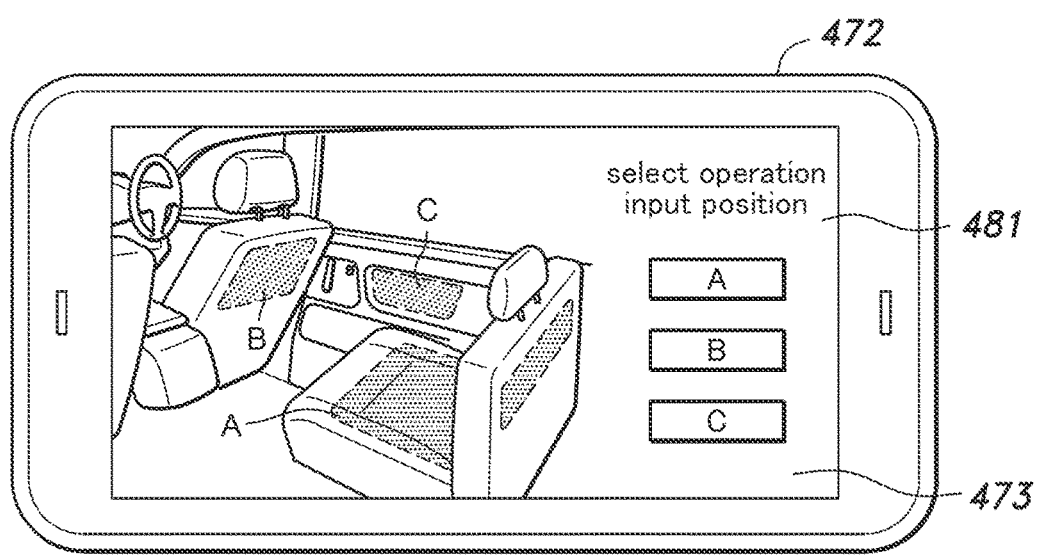
(C) 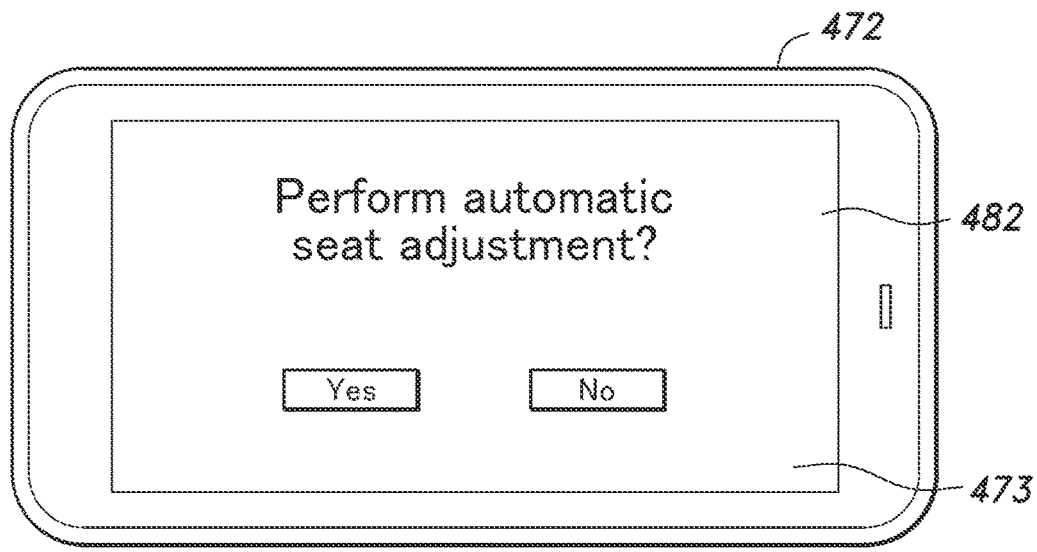

Fig.27
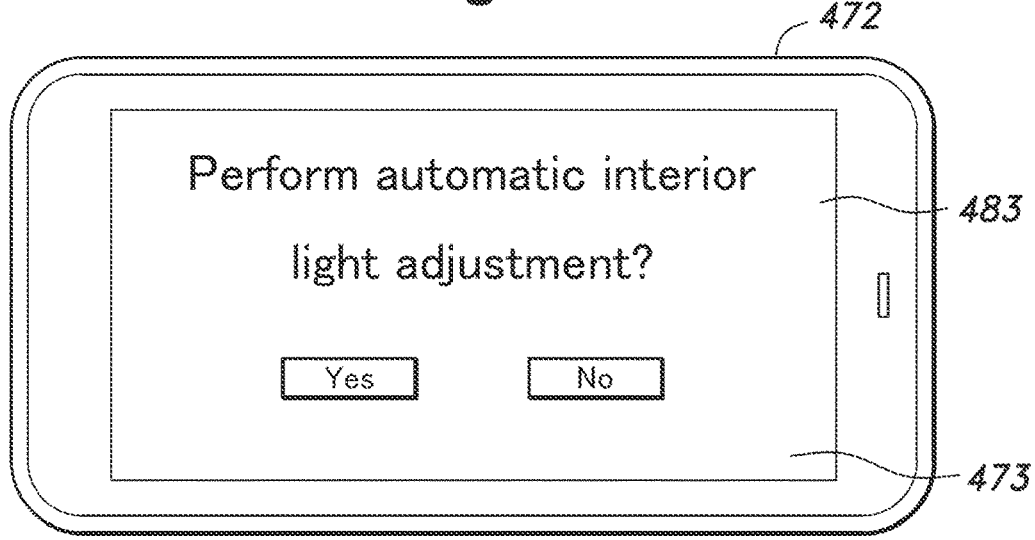
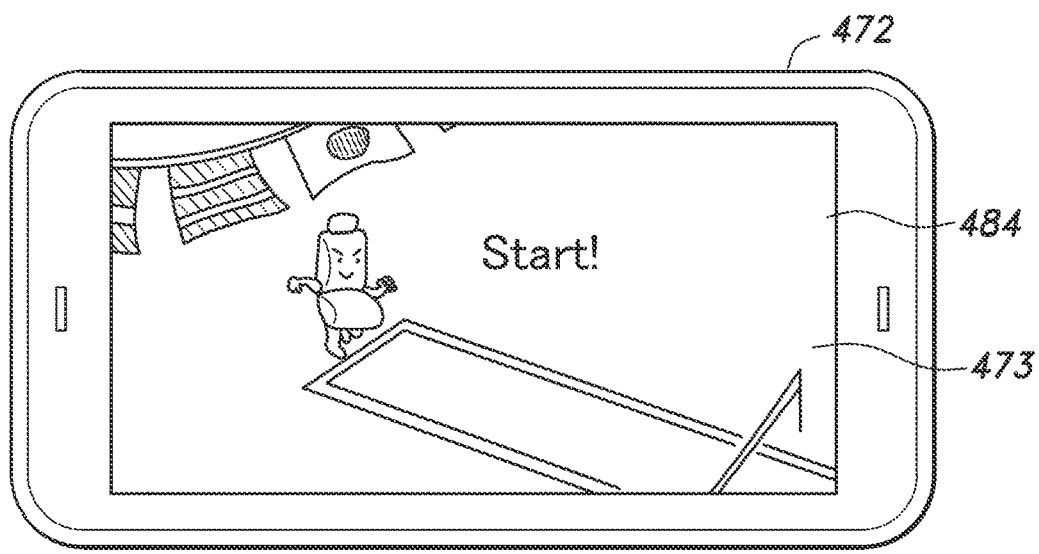
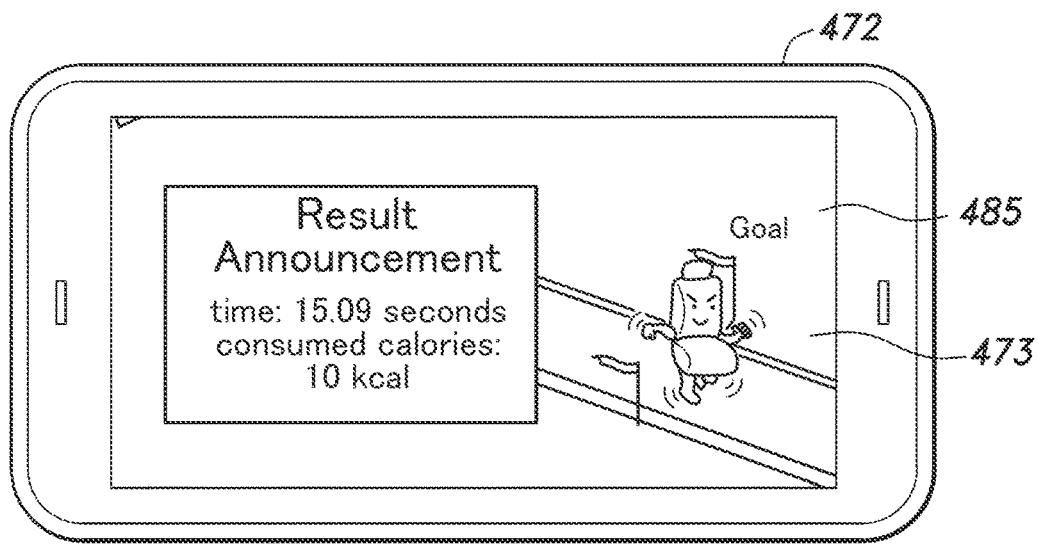

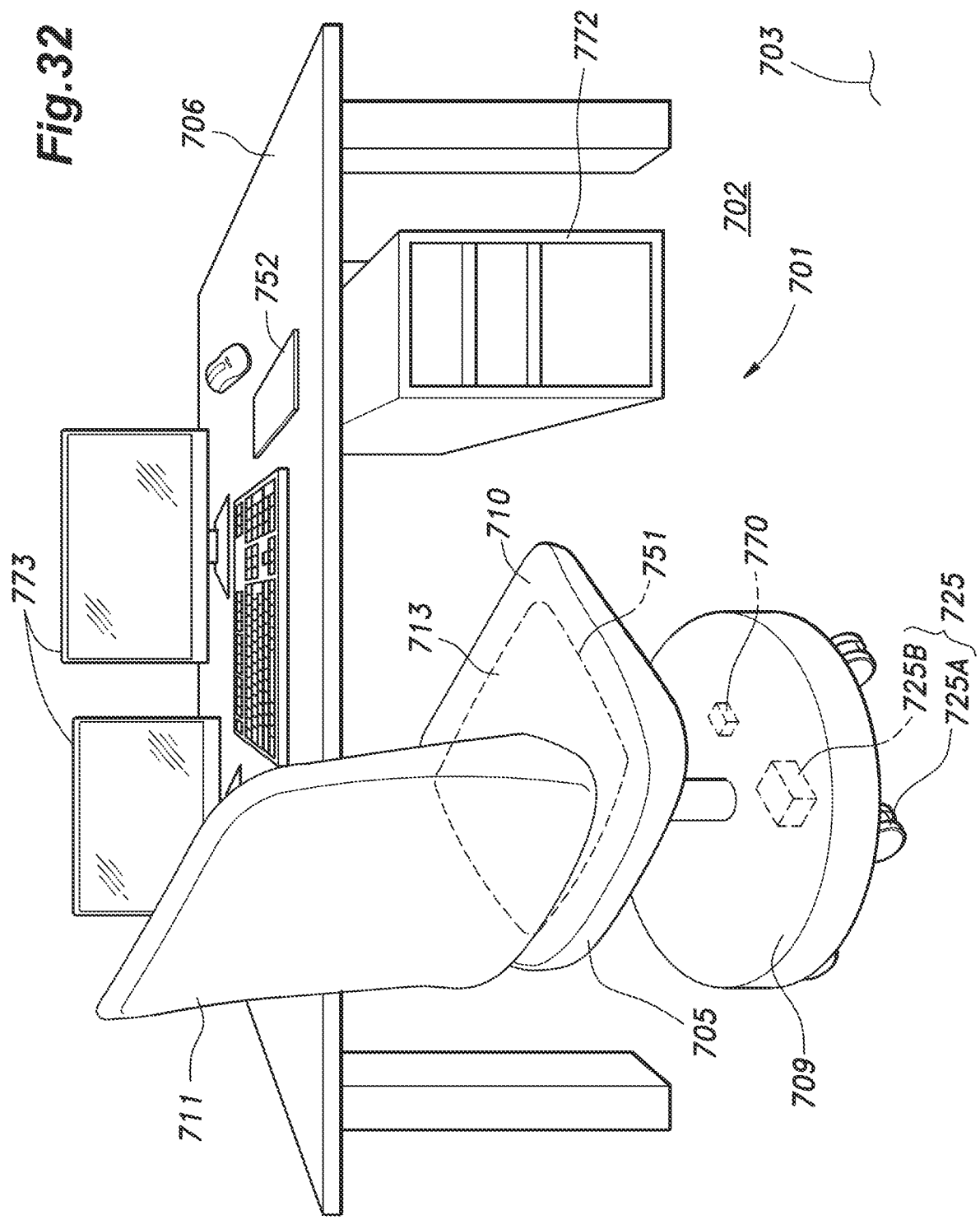

SEAT SYSTEM WITH SENSOR AND USER INTERFACE

CROSS REFERENCE TO RELATED APPLICATIONS

This application is the U.S. National Stage entry of International Application No. PCT/JP2020/015548 filed under the Patent Cooperation Treaty and having a filing date of Apr. 6, 2020, which claims priority to Japanese Patent Application No. 2019-079990 having a filing date of Apr. 19, 2019, Japanese Patent Application No. 2019-079901 having a filing date of Apr. 19, 2019, Japanese Patent Application No. 2019-079902 having a filing date of Apr. 19, 2019, and Japanese Patent Application No. 2019-079991 having a filing date of Apr. 19, 2019, all of which are incorporated herein by reference.

TECHNICAL FIELD

The present invention relates to a seat system.

BACKGROUND ART

Conventionally, there is known a device that estimates the seating posture of a seated person with a pressure sensor or the like installed in the seat of the seated person (Patent Document 1).

There is also known a seat system provided in an aircraft cabin and including a vehicle seat disposed in the cabin and a game terminal provided on the back of the vehicle seat (for example, Patent Document 1). The game terminal is provided with a video display unit consisting of a flat video display device and an operation unit (input device) including a switch, a keyboard, and a light pen. The occupant can detach the game terminal provided on the seat in front and can enjoy the game while being seated.

PRIOR ART DOCUMENT(S)

Patent Document

[Patent Document 1] JPH11-64131A
[Patent Document 2] JPS59-14877A

SUMMARY OF THE INVENTION

Task to be Accomplished by the Invention

If information of a seated person acquired by sensors provided in the seat is shared by another user, there are various advantages. For example, in a case where a game is configured to use the sensors provided on the seat as an input device, the other user can know the progress and results of the game, which can enhance the commercial value of the game. Also, in a case where the seat is outside the field of view or in a case where the seat is at a remote location, the other user can grasp the state of the seated person without visual observation, which may be used in childcare, nursing, watching, or the like.

In view of the foregoing background, an object of the present invention is to provide a seat system that allows the information of the user seated in the seat to be acquired by another user.

Means to Accomplish the Task

To achieve the above object, one aspect of the present invention provides a seat system (1) comprising: a seat main body (5); at least one sensor (40) provided in the seat main body; a control device (46) configured to process a signal from the sensor; and a first user interface (69) configured to communicate with the control device and to notify information based on a signal from the control device.

According to this aspect, the information of the user seated in the seat can be acquired by another user by using the first user interface. In a case where the seat is outside the field of view or in a case where the seat is at a remote location, the other user can grasp the state of the user seated in the seat without visual observation, which may be used in childcare, nursing, watching, or the like.

In the above aspect, preferably, the sensor is configured to acquire information obtained from a seated person who is seated on the seat main body. Preferably, the biometric information includes body temperature, pulsation, perspiration, odor, etc., for example, and the sensor includes a temperature sensor, pulse sensor, a humidity sensor, an odor sensor, etc.

According to this aspect, the biometric information of the user seated in the seat can be acquired by another user.

In the above aspect, preferably, the seat system comprises a camera (51) configured to capture an image of a seated person who is seated on the seat main body, wherein the control device causes the first user interface to display the image captured by the camera.

According to this aspect, image information of the user seated in the seat can be acquired by another user by using the first user interface.

In the above aspect, preferably, the camera is provided on an upper portion of a seat back (8) or a headrest (9).

According to this aspect, it is possible to support the camera by using the seat back or the headrest, and another mount for supporting the camera may be omitted.

In the above aspect, preferably, the control device includes an application processing unit (57) configured to execute an application based on the signal from the sensor, and causes the first user interface to display an image generated by the application processing unit.

According to this aspect, the game screen of the game being played by the user seated on the seat main body can be seen by another user by using the first user interface. Namely, the other user can enjoy the game with the user playing the game.

In the above aspect, preferably, the control device constitutes a mobile terminal (49) and performs wireless communication with the sensor, and the mobile terminal includes a second user interface (47) for displaying the image.

According to this aspect, the user seated on the seat main body can see the image with the second user interface of the mobile terminal. Also, the control device and the second user interface may be configured by using a known mobile terminal such as a tablet PC, a smartphone, etc., for example.

In the above aspect, preferably, the first user interface is configured to receive input from a user, and the control device is configured to perform output to the second user interface based on input from the first user interface.

According to this aspect, another user different from the user playing the game can participate in the game by using the input device.

In the above aspect, preferably, the control device is configured to communicate with the first user interface via the internet (59).

According to this aspect, a user at a location remote from the seat main body can acquire information of the user seated on the seat main body.

In the above aspect, preferably, the seat system is a seat system for a vehicle.

According to this aspect, the sensor can be used as a seating sensor for detecting whether the user is seated in the seat.

Also, in a case where multiple sensors are provided in the seat, there is a problem that wiring between the sensors and the control device becomes cumbersome, which complicates the structure of the entire seat and increases the manufacturing cost. Therefore, it is desired to simplify the arrangement of electrical parts including the sensors in the seat system.

To achieve the above object, one aspect of the present invention provides a seat system (201) comprising: a seat main body (205); at least one sensor (240) provided in the seat main body; a control device (246) configured to wirelessly communicate with the sensor; and a user interface (247) controlled by the control device, wherein the control device controls the user interface in accordance with a signal from the sensor.

According to this aspect, it is possible to omit a wire harness for connecting the sensor and the control device, and assembly of the sensor to the seat main body can be performed easily.

In the above aspect, preferably, the seat main body is one of multiple seat main bodies included in the seat system, each of the seat main bodies includes the sensor, and the control device wirelessly communicates with the multiple sensors.

According to this aspect, it is possible to commonly use the control device thereby to simplify the seat system.

In the above aspect, preferably, the control device and the user interface are assembled integrally to constitute a mobile terminal (49).

According to this aspect, it is unnecessary to secure a space for installing the control device and the user interface around the seat main body. Also, the user can place the user interface at any desired position.

In the above aspect, preferably, the sensor includes multiple detection units (241) and at least one first communication unit (242) connected with each of the detection units, and the control device includes a second communication unit (251) wirelessly communicating with the first communication unit. Also, preferably, the seat main body includes a seat cushion (207) and a seat back (208) provided at a rear end of the seat cushion, the multiple detection units include multiple cushion-side detection units provided in the seat cushion and multiple back-side detection units provided in the seat back, and the first communication unit includes a cushion-side first communication unit connected with each of the multiple cushion-side detection units and a back-side first communication unit connected with each of the multiple back-side detection units.

According to this aspect, it is possible to reduce the number of the first communication units. Therefore, the sensor can be simplified and the manufacturing cost can be reduced.

In the above aspect, preferably, the sensor is configured to be wirelessly supplied with electric power by a wireless power supply device provided inside the seat main body or outside the seat main body.

According to this aspect, it is possible to omit wiring for supplying electric power to the sensor.

In the above aspect, preferably, the sensor constitutes a switch for operating a device.

According to this aspect, the user can operate the device by providing a prescribed input to the sensor provided in the seat main body.

In the above aspect, preferably, the control device comprises: a first control device (248) wirelessly communicating with the sensor; and a second control device (250) connected with the first control device by wire or wirelessly and capable of executing an application, the sensor constitutes a controller for inputting a signal to the second control device, and the user interface displays an image generated by the application.

According to this aspect, the user seated on the seat main body can operate the application by moving the body.

In the above aspect, preferably, the second control device and the user interface are assembled integrally to constitute a mobile terminal (249).

According to this aspect, it is unnecessary to secure a space for installing the second control device and the user interface around the seat main body. Also, the user can place the user interface at any desired position.

In the above aspect, preferably, the seat main body includes a seat cushion (207) and a seat back (208) provided at a rear end portion of the seat cushion, the seat cushion includes a pressure receiving member (224) capable of supporting a seated person, and the first control device is provided on a lower surface of the pressure receiving member.

According to this aspect, it is possible to avoid contact between the first control device and the user seated on the seat main body. Also, the first control device can be disposed at a position where maintenance is relatively easy.

In the above aspect, preferably, the seat system comprises an electrical apparatus (261) provided in the seat main body and a third control device (262) for controlling the electrical apparatus, and the third control device is provided on the lower surface of the pressure receiving member.

According to this aspect, the first control device and the third control device are arranged at close positions, and therefore, maintenance can be performed easily.

In the above aspect, preferably, the first control device and the third control device are provided on a bracket provided on the lower surface of the pressure receiving member.

Since the bracket is provided on the lower surface of the pressure receiving member, the load of the user is less likely to be applied on the bracket. Therefore, by providing the first control device and the third control device on the bracket, it is possible to support the first control device and the third control device with good stability.

In the above aspect, preferably, the first control device is disposed on a lower surface of the bracket on a lateral side of the third control device.

According to this aspect, maintenance of the first control device and the third control device can be performed individually from the front side of the seat main body.

In the above aspect, preferably, the seat system comprises an electrical apparatus (261) provided in the seat main body and a third control device (262) for controlling the electrical apparatus, the seat main body includes a seat cushion (207) and a seat back (208) provided at a rear end portion of the seat cushion, the seat cushion includes a pressure receiving member (224) capable of supporting a seated person, the lower surface of the pressure receiving member is provided with a bracket (264), the third control device is provided on a lower surface of the bracket and has a slot (262B) that can receive the first control device, and the first control device is inserted in the slot.

According to this aspect, by insetting the first control device in the slot of the third control device, it is possible to support the first control device on the seat main body.

In the above aspect, preferably, the seat system preferably is a seat system for a vehicle.

According to this aspect, the sensor can be used as a seating sensor for detecting whether the user is seated in the seat.

The operation unit of the game terminal of Patent Document 2 is limited to switches, a keyboard, a light pen, or the like. Therefore, in the game terminal of Patent Document 1, the operation means of the game is limited and this prevents configuring an application such as a game that can be enjoyed by the occupant by moving the body, for example. Thus, it is desired to provide a seat system provided with a seat main body and an application execution device such that the number of operation means for an application is increased.

To achieve the above object, there is provided a seat system (401, 501, 601, 701) comprising: a seat main body (405, 705); at least one first sensor (451, 751) provided inside the seat main body; at least one second sensor (452, 752) that can be reached by a user seated on the seat main body and is provided external of the seat main body; and an application execution device (472, 772) provided with a display unit (473, 773), wherein the first sensor and the second sensor constitute an application controller for the application execution device.

According to this configuration, since the first sensor and the second sensor are provided, it is possible to increase the number of sensors for performing operation input compared to the case where only the first sensor is provided. Therefore, it is possible to increase the number of operation means for an application.

Also, in the above aspect, preferably, the seat system is installed in a vehicle (S) having a door (415, 416), and at least one of the second sensors is provided on a door trim (417, 418) of the door.

According to this configuration, the second sensor can be disposed at a position where the user can perform operation input.

Also, in the above aspect, preferably, at least one of the second sensors is provided on one of a roof (440), a floor (403), a pillar (460), and an instrument panel (420).

According to this configuration, the second sensor can be provided at a position in the cabin where the user can perform operation input.

Also, in the above aspect, preferably, the seat main body includes a front-side seat main body (405A) and a rear-side seat main body (405B) disposed behind the front-side seat main body, each of the front-side seat main body and the rear-side seat main body includes a seat cushion (410) forming a seating surface (413) and a seat back (411) connected to a rear portion of the seat cushion, the first sensor is provided in the rear-side seat main body, and at least one of the second sensors is provided on a rear surface of the front-side seat back of the seat main body.

According to this configuration, the second sensor can be disposed at a position where the user seated in the rear-side seat can easily perform input by providing the sensor on the rear surface of the seat back of the front-side seat main body.

Also, in the above aspect, preferably, the application execution device performs a selection process to select, from among the first sensor and the second sensor, at least one operation input sensor for performing operation input, and thereafter executes an execution process to execute an application based on a signal from the selected operation input sensor.

According to this configuration, in the execution process, it is possible to prevent malfunction due to input to a sensor other than the operation input sensor.

Also, in the above aspect, preferably, the application execution device performs a selection process to making the user select at least one operation input sensor from among the first sensor and the second sensor, and thereafter executes an execution process to execute an application based on a signal from the selected operation input sensor.

According to this configuration, it is possible to prevent malfunction due to input to a sensor other than the sensor used in the execution process. Also, since the user can select the operation input sensor from among the first sensor and the second sensor, it is possible to select a sensor suitable for the user.

Also, in the above aspect, preferably, the application execution device executes an application based on at least two sensors of the first sensor and the second sensor.

According to this configuration, since the execution process is performed based on the signals from the first sensor and the second sensor, it is possible to configure an application based on the operation input to the two operation input sensors.

In the seat system of Patent Document 2, when making the game terminal execute a game application, the occupant needs to adjust the seat by using a reclining mechanism, for example, to prepare an environment in which to enjoy the game. Therefore, it is desired to provide a seat system including a seat main body and an application execution device such that the seat system can provide an environment suitable for use of an application without imposing a burden on the user.

To achieve the above object, there is provided a seat system (401, 501, 601, 701) comprising: a seat main body (405, 705) provided with an adjustment mechanism (425, 725); an application execution device (472, 772) capable of executing an application; and a control device (470, 770) for controlling the adjustment mechanism, wherein the application execution device activates the adjustment mechanism via the control device.

According to this configuration, the application execution device can adjust the seat main body by activating the adjustment mechanism. Therefore, an environment more even suitable for use of the application execution device can be provided without imposing a burden on the user.

Also, in the above aspect, preferably, the seat main body is provided in a vehicle (S) and is disposed on a floor (403) defining a cabin (402) of the vehicle.

According to this configuration, the seat main body disposed on the floor is adjusted to be more suitable for use of the application. Therefore, an environment even more suitable for use of the application can be provided to the user in the vehicle.

Also, in the above aspect, preferably, the seat main body includes a seat cushion (410) forming a seating surface and a seat back (411) connected to a rear portion of the seat cushion, and the adjustment mechanism includes a reclining mechanism (427) for tilting the seat cushion relative to the seat back.

According to this configuration, the application execution device can tilt the seat back relative to the seat cushion. Therefore, the application execution device can adjust the seat main body into a shape suitable for use of the application.

Also, in the above aspect, preferably, the seat main body includes a seat cushion (410) forming a seating surface (413) and a seat back (411) connected to a rear portion of the seat cushion, and the adjustment mechanism includes a slide mechanism (426) provided between the seat cushion and the floor.

According to this configuration, the application execution device can slidably move the seat main body relative to the floor. Therefore, the application execution device can adjust the seat main body to a position suitable for use of the application.

Also, in the above aspect, preferably, the seat main body includes a seat cushion (410) forming a seating surface (413) and a seat back (411) connected to a rear portion of the seat cushion, and the adjustment mechanism includes a rotation mechanism (428) provided between the seat cushion and the floor to rotate the seat cushion relative to the floor about a vertical axis.

According to this configuration, the application execution device can rotate the seat main body relative to the floor. Therefore, the application execution device can adjust the seat main body to a position suitable for use of the application.

Also, in the above aspect, preferably, the seat system further comprises a lighting (441) for illuminating an interior of the cabin, and the control device can perform one of turn-on control, turn-off control, and dimming control of the lighting.

According to this configuration, the application execution device can perform turn-on control, turn-off control, and dimming control of the lighting. Therefore, the application execution device can adjust the interior of the vehicle to brightness suitable for use of the application.

Also, in the above aspect, preferably, the seat system further comprises a heater provided in the seat main body, and the control device is capable of changing an amount of heat generated from the heater (901).

According to this configuration, the application execution device can change the amount of heat from the heater provided in the seat main body. Therefore, the application execution device can adjust the temperature of the seat main body to a temperature suitable for use of the application.

Also, in the above aspect, preferably, the seat system further comprises an air conditioning device (902) provided in the vehicle to perform air conditioning of an interior of the cabin, and the control device is capable of controlling the air conditioning device.

According to this configuration, the application execution device can perform air conditioning of the interior of the cabin by controlling the air conditioning device. Therefore, the application execution device can adjust the temperature, humidity, and the like in the interior of the cabin to achieve an environment suitable for use of the application.

Also, in the above aspect, preferably, the seat system further comprises a speaker (602) to generate sound toward an interior of the cabin, and the control device is capable of controlling the sound output from the speaker.

According to this configuration, the application execution device can generate sound from the speaker via the control device such that the sound is suitable for execution of the game. Therefore, the application execution device can provide the user with an environment suitable for use of the application.

Also, in the above aspect, preferably, the application execution device is connected with a server (504) via a network (503) and controls an operation amount of the adjustment mechanism based on information from the server.

According to this configuration, the application execution device controls the operation amount of the adjustment mechanism via the control device based on the information from the server. Thereby, the operation amount can be changed according to the status of the user, and an environment even more suitable for use of the application can be provided to the user.

Effect of the Invention

One aspect of the present invention provides a seat system (1) comprising: a seat main body (5); at least one sensor (40) provided in the seat main body; a control device (46) configured to process a signal from the sensor; and a first user interface (69) configured to communicate with the control device and to notify information based on a signal from the control device.

According to this aspect, the information of the user seated in the seat can be acquired by another user by using the first user interface. In a case where the seat is outside the field of view or in a case where the seat is at a remote location, the other user can grasp the state of the user seated in the seat without visual observation, which may be used in childcare, nursing, watching, or the like.

In the above aspect, preferably, the sensor is configured to acquire information obtained from a seated person who is seated on the seat main body. Preferably, the biometric information includes body temperature, pulsation, perspiration, odor, etc., for example, and the sensor includes a temperature sensor, pulse sensor, a humidity sensor, an odor sensor, etc.

According to this aspect, the biometric information of the user seated in the seat can be acquired by another user.

In the above aspect, preferably, the seat system comprises a camera (51) configured to capture an image of a seated person who is seated on the seat main body, wherein the control device causes the first user interface to display the image captured by the camera.

According to this aspect, image information of the user seated in the seat can be acquired by another user by using the first user interface.

In the above aspect, preferably, the camera is provided on a upper portion of a seat back (8) or a headrest (9).

According to this aspect, it is possible to support the camera by using the seat back or the headrest, and another mount for supporting the camera may be omitted.

In the above aspect, preferably, the control device includes an application processing unit (57) configured to execute an application based on the signal from the sensor, and causes the first user interface to display an image generated by the application processing remit.

According to this aspect, the game screen of the game being played by the user seated on the seat main body can be seen by another user by using the first user interface, Namely, the other user can enjoy the game with the user playing the game.

In the above aspect, preferably, the control device constitutes a mobile terminal (49) and performs wireless communication with the sensor, and the mobile terminal includes a second user interface (47) for displaying the image.

According to this aspect, the user seated on the seat main body can see the image with the second user interface of the mobile terminal. Also, the control device and the second user interface may be configured by using a known mobile terminal such as a tablet PC, a smartphone, etc., for example.

In the above aspect, preferably, the first user interface is configured to receive input from a user, and the control device is configured to perform output to the second user interface based on input from the first user interface.

According to this aspect, another user different from the user playing the game can participate in the game by using the input device.

In the above aspect, preferably, the control device is configured to communicate with the first user interface via the internet (59).

According to this aspect, a user at a location remote from the seat main body can acquire information of the user seated on the seat main body.

In the above aspect, preferably, the seat system is a seat system for a vehicle:

According to this aspect, the sensor can be used as a seating sensor for detecting whether the user is seated in the seat.

To achieve an object of simplifying the arrangement of electrical parts including the sensors in the seat system, one aspect of the present invention provides a seat system (201) comprising: a seat main body (205); at least one sensor (240) provided in the seat main body; a control device (246) configured to wirelessly communicate with the sensor; and a user interface (247) controlled by the control device, wherein the control device controls the user interface in accordance with a signal from the sensor.

According to this aspect, it is possible to omit a wire harness for connecting the sensor and the control device, and assembly of the sensor to the seat main body can be performed easily.

In the above aspect, preferably, the seat main body is one of multiple seat main bodies included in the seat system, each of the seat main bodies includes the sensor, and the control device wirelessly communicates with the multiple sensors.

According to this aspect, it is possible to commonly use the control device thereby to simplify the seat system.

In the above aspect, preferably, the control device and the user interface are assembled integrally to constitute a mobile terminal (249).

According to this aspect, it is unnecessary to secure a space for installing the control device and the user interface around the seal main body. Also, the user can place the user interface at any desired position.

In the above aspect, preferably, the sensor includes multiple detection units (241) and at least one first communication unit (242) connected with each of the detection units, and the control device includes a second communication unit (251) wirelessly communicating with the first communication unit. Also, preferably, the seat main body includes a seat cushion (207) and a seat back (208) provided at a rear end of the seat cushion, the multiple detection units include multiple cushion-side detection units provided in the seat cushion and multiple back-side detection units provided in the seat back, and the first communication unit includes a cushion-side first communication unit connected with each of the multiple cushion-side detection units and a back-side first communication unit connected with each of the multiple back-side detection units.

According to this aspect, it is possible to reduce the number of the first communication units. Therefore, the sensor can be simplified and the manufacturing cost can be reduced.

In the above aspect, preferably, the sensor is configured to be wirelessly supplied with electric power by a wireless power supply device provided inside the seat main body or outside the seat main body.

According to this aspect, it is possible to omit wiring for supplying electric power to the sensor.

In the above aspect, preferably, the sensor constitutes a switch for operating a device.

According to this aspect, the user can operate the device by providing a prescribed input to the sensor provided in the seat main body.

In the above aspect, preferably, the control device comprises: a first control device (248) wirelessly communicating with the sensor; and a second control device (250) connected with the first control device by wire or wirelessly and capable of executing an application, the sensor constitutes a controller for inputting a signal to the second control device, and the user interface displays an image generated by the application.

According to this aspect, the user seated on the seat main body can operate the application by moving the body.

In the above aspect, preferably, the second control device and the user interface are assembled integrally to constitute a mobile terminal (249).

According to this aspect, it is unnecessary to secure a space for installing the second control device and the user interface around the seat main body. Also, the user can place the user interface at any desired position.

In the above aspect, preferably, the seat main body includes a seat cushion (207) and a seat back (208) provided at a rear end portion of the seat cushion, the seat cushion includes a pressure receiving member (224) capable of supporting a seated person, and the first control device is provided on a lower surface of the pressure receiving member.

According to this aspect, it is possible to avoid contact between the first control device and the user seated on the seat main body. Also, the first control device can be disposed at a position where maintenance is relatively easy.

In the above aspect, preferably, the seat system comprises an electrical apparatus (261) provided in the seat main body and a third control device (262) for controlling the electrical apparatus, and the third control device is provided on the lower surface of the pressure receiving member.

According to this aspect, the first control device and the third control device are arranged at close positions, and therefore, maintenance can be performed easily.

In the above aspect, preferably, the first control device and the third control device are provided on a bracket provided on the lower surface of the pressure receiving member.

Since the bracket is provided on the lower surface of the pressure receiving member, the load of the user is less likely to be applied on the bracket. Therefore, by providing the first control device and the third control device on the bracket, it is possible to support the first control device and the third control device with good stability.

In the above aspect, preferably, the first control device is disposed on a lower surface of the bracket on a lateral side of the third control device.

According to this aspect, maintenance of the first control device and the third control device can be performed individually from the front side of the seat main body.

In the above aspect, preferably, the seat system comprises an electrical apparatus (261) provided in the seat main body and a third control device (262) for controlling the electrical apparatus, the seat main body includes a seat cushion (207) and a seat back (8) provided at a rear end portion of the seat cushion, the seat cushion includes a pressure receiving member (224) capable of supporting a seated person, the lower surface of the pressure receiving member is provided with a bracket (264), the third control device is provided on a lower surface of the bracket and has a slot (262B) that can receive the first control device, and the first control device is inserted in the slot:

According to this aspect, by inserting the first control device in the slot of the third control device, it is possible to support the first control device on the seat main body.

In the above aspect, preferably, the seat system preferably is a seat system for a vehicle.

According to this aspect, the sensor can be used as a seating sensor for detecting whether the user is seated in the seat.

To achieve the above object, there is provided a seat system (401, 501, 601, 701) comprising: a seat main body (405, 705); at least one first sensor (451, 751) provided inside the seat main body; at least one second sensor (452, 752) that can be reached by a user seated on the seat main body and is provided external of the seat main body; and an application execution device (472, 772) provided with a display unit (473, 773), wherein the first sensor and the second sensor constitute an application controller for the application execution device.

According to this configuration, since the first sensor and the second sensor are provided, it is possible to increase the number of sensors for performing operation input compared to the case where only the first sensor is provided. Therefore, it is possible to increase the number of operation means for an application.

Also, in the above aspect, preferably, the seat system is installed in a vehicle (S) having a door (415, 416), and at least one of the second sensors is provided on a door trim (417, 418) of the door.

According to this configuration, the second sensor can be disposed at a position where the user can perform operation input.

Also, in the above aspect, preferably, at least one of the second sensors is provided on one of a roof (440), a floor (403), a pillar (460), and an instrument panel (420).

According to this configuration, the second sensor can be provided at a position in the cabin where the user can perform operation input.

Also, in the above aspect, preferably, the seat main body includes a front-side seat main body (405A) and a rear-side seat main body (405B) disposed behind the front-side seat main body, each of the front-side seat main body and the rear-side seat main body includes a seat cushion (410) forming a seating surface (413) and a seat back (411) connected to a rear portion of the seat cushion, the first sensor is provided in the rear-side seat main body, and at least one of the second sensors is provided on a rear surface of the front-side seat back of the seat main body.

According to this configuration, the second sensor can be disposed at a position where the user seated in the rear-side seat can easily perform input by providing the sensor on the rear surface of the seat back of the front-side seat main body.

Also, in the above aspect, preferably, the application execution device performs a selection process to select, from among the first sensor and the second sensor, at least one operation input sensor for performing operation input, and thereafter executes an execution process to execute an application based on a signal from the selected operation input sensor.

According to this configuration, in the execution process, it is possible to prevent malfunction due to input to a sensor other than the operation input sensor.

Also, in the above aspect, preferably, the application execution device performs a selection process to making the user select at least one operation input sensor from among the first sensor and the second sensor, and thereafter executes an execution process to execute an application based on a signal from the selected operation input sensor.

According to this configuration, it is possible to prevent malfunction due to input to a sensor other than the sensor used in the execution process. Also, since the user can select the operation input sensor from among the first sensor and the second sensor, it is possible to select a sensor suitable for the user.

Also, in the above aspect, preferably, the application execution device executes an application based on at least two sensors of the first sensor and the second sensor.

According to this configuration, since the execution process is performed based on the signals from the first sensor and the second sensor, it is possible to configure an application based on the operation input to the two operation input sensors.

To achieve the above object, there is provided a seat system (401, 501, 601, 701) comprising: a seat main body (405, 705) provided with an adjustment mechanism (425, 725); an application execution device (472, 772) capable of executing an application; and a control device (470, 770) for controlling the adjustment mechanism, wherein the application execution device activates the adjustment mechanism via the control device.

According to this configuration, the application execution device can adjust the seat main body by activating the adjustment mechanism. Therefore, an environment more even suitable for use of the application execution device can be provided without imposing a burden on the user.

Also, in the above aspect, preferably, the seat main body is provided in a vehicle (S) and is disposed on a floor (403) defining a cabin (402) of the vehicle.

According to this configuration, the seat main body disposed on the floor is adjusted to be more suitable for use of the application. Therefore, an environment even more suitable for use of the application can be provided to the user in the vehicle.

Also, in the above aspect, preferably, the seat main body includes a seat cushion (410) forming a seating surface and a seat back (411) connected to a rear portion of the seat cushion, and the adjustment mechanism includes a reclining mechanism (427) for tilting the seat cushion relative to the seat hack.

According to this configuration, the application execution device can tilt the seat back relative to the seat cushion. Therefore, the application execution device can adjust the seat main body into a shape suitable for use of the application.

Also, in the above aspect, preferably, the seat main body includes a seat cushion (410) forming a seating surface (413) and a seat hack (411) connected to a rear portion of the seat cushion, and the adjustment mechanism includes a slide mechanism (426) provided between the seat cushion and the floor.

According to this configuration, the application execution device can slidably move the seat main body relative to the floor. Therefore, the application execution device can adjust the seat main body to a position suitable for use of the application.

Also, in the above aspect, preferably, the seat main body includes a seat cushion (410) forming a seating surface (413) and a seat back (411) connected to a rear portion of the seat cushion, and the adjustment mechanism includes a rotation mechanism (428) provided between the seat cushion and the floor to rotate the seat cushion relative to the floor about a vertical axis.

According to this configuration, the application execution device can rotate the seat main body relative to the floor. Therefore, the application execution device can adjust the seat main body to a position suitable for use of the application.

Also, in the above aspect, preferably, the seat system further comprises a lighting (441) for illuminating an interior of the cabin, and the control device can perform one of turn-on control, turn-off control, and dimming control of the lighting.

According to this configuration, the application execution device can perform turn-on control, turn-off control, and dimming control of the lighting. Therefore, the application execution device can adjust the interior of the vehicle to brightness suitable for use of the application.

Also, in the above aspect, preferably, the seat system further comprises a heater provided in the seat main body, and the control device is capable of changing an amount of heat generated from the heater (901).

According to this configuration, the application execution device can change the amount of heat from the heater provided in the seat main body. Therefore, the application execution device can adjust the temperature of the seat main body to a temperature suitable for use of the application.

Also, in the above aspect, preferably, the seat system further comprises an air conditioning device (902) provided in the vehicle to perform air conditioning of an interior of the cabin, and the control device is capable of controlling the air conditioning device.

According to this configuration, the application execution device can perform air conditioning of the interior of the cabin by controlling the air conditioning device. Therefore, the application execution device can adjust the temperature, humidity, and the like in the interior of the cabin to achieve an environment suitable for use of the application.

Also, in the above aspect, preferably, the seat system further comprises a speaker (602) to generate sound toward an interior of the cabin, and the control device is capable of controlling the sound output from the speaker.

According to this configuration, the application execution device can generate sound from the speaker via the control device such that the sound is suitable for execution of the game. Therefore, the application execution device can provide the user with an environment suitable for use of the application.

Also, in the above aspect, preferably, the application execution device is connected with a server (504) via a network (503) and controls an operation amount of the adjustment mechanism based on information from the server.

According to this configuration, the application execution device controls the operation amount of the adjustment mechanism via the control device based on the information from the server. Thereby, the operation amount can be changed according to the status of the user, and an environment even more suitable for use of the application can be provided to the user.

BRIEF DESCRIPTION OF THE DRAWINGS

FIG. 26 is an explanatory diagram for explaining (A) a participation willingness input screen, (B) a sensor selection screen, and (C) a seat adjustment reception screen;

FIG. 27 is an explanatory diagram for explaining (A) an interior light adjustment reception screen, (B) a game execution screen, and (C) a game execution screen when a character has reached the goal;

FIG. 31 is an explanatory diagram for explaining a game execution screen of the 100 m run game application according to a modification; and.

FIG. 32 shows an example of a room provided with the seat system according to the present invention.

DESCRIPTION OF THE PREFERRED EMBODIMENT(S)

In the following, embodiments in which a seat system according to the present invention is applied to a vehicle such as an automobile will be described with reference to the drawings.

First Embodiment

Figure 1:
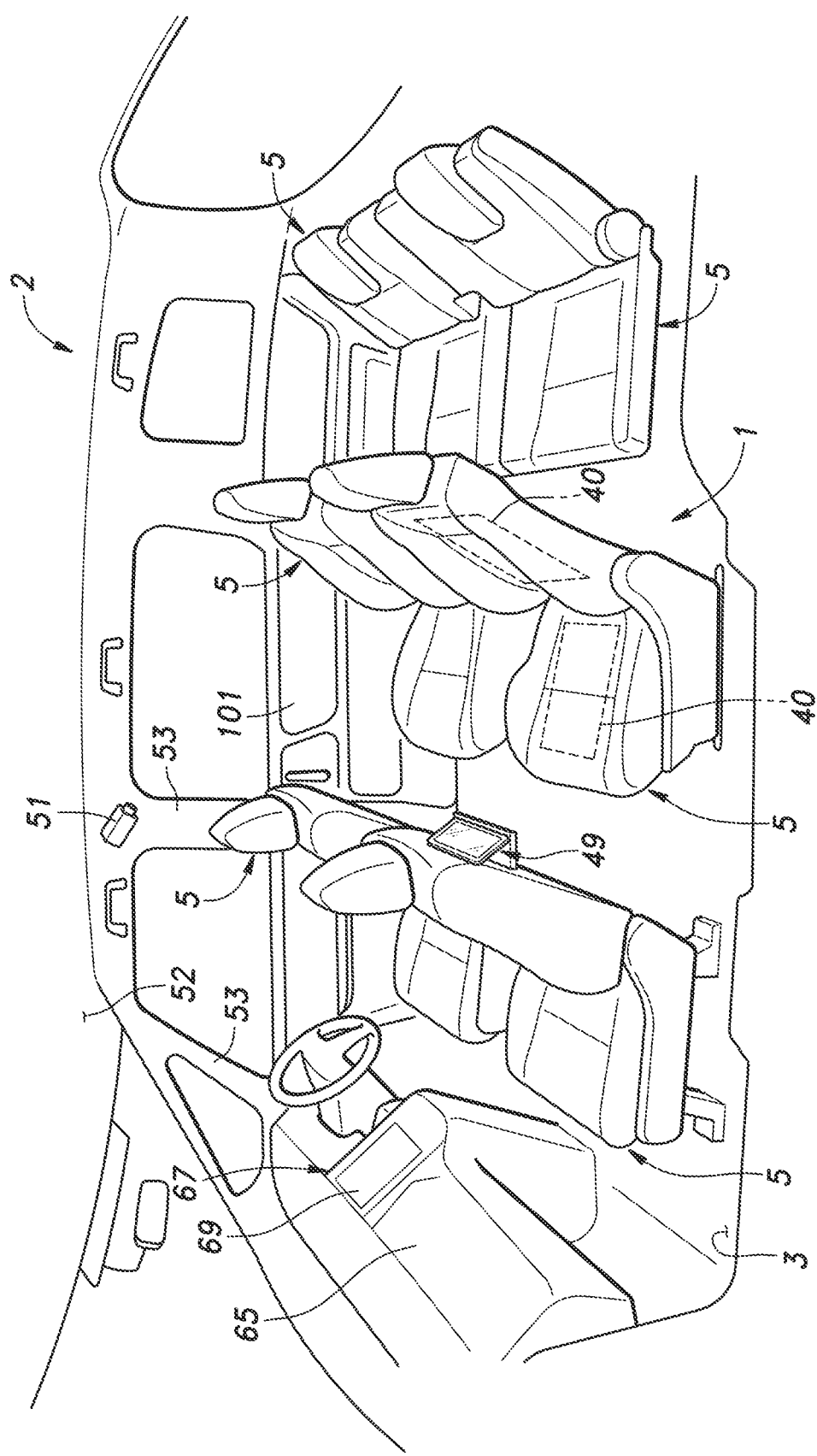
FIG. 1 is a perspective view of a cabin of a vehicle in which a seat system according to the first embodiment is installed.

As shown in FIG. 1, a seat system. 1 includes at least one seat main body 5 arranged on a floor 3 defining a bottom portion of a cabin 2. In the present embodiment, the seat system 1 includes multiple seat main bodies 5. In the following description, the front-rear, left-right, and up-down directions are defined with respect to the user seated on the seat main body 5.

The seat main bodies 5 constitute left and right front seats, left and right middle seats provided behind the front seats, and left and right rear seats provided behind the middle seats. Each seat main body 5 includes a seat cushion 7 provided on the floor 3 of the cabin 2, a seat back S joined to a rear portion of the seat cushion 7, and a headrest 9 provided on an upper side of the seat back 8.

Figure 2:
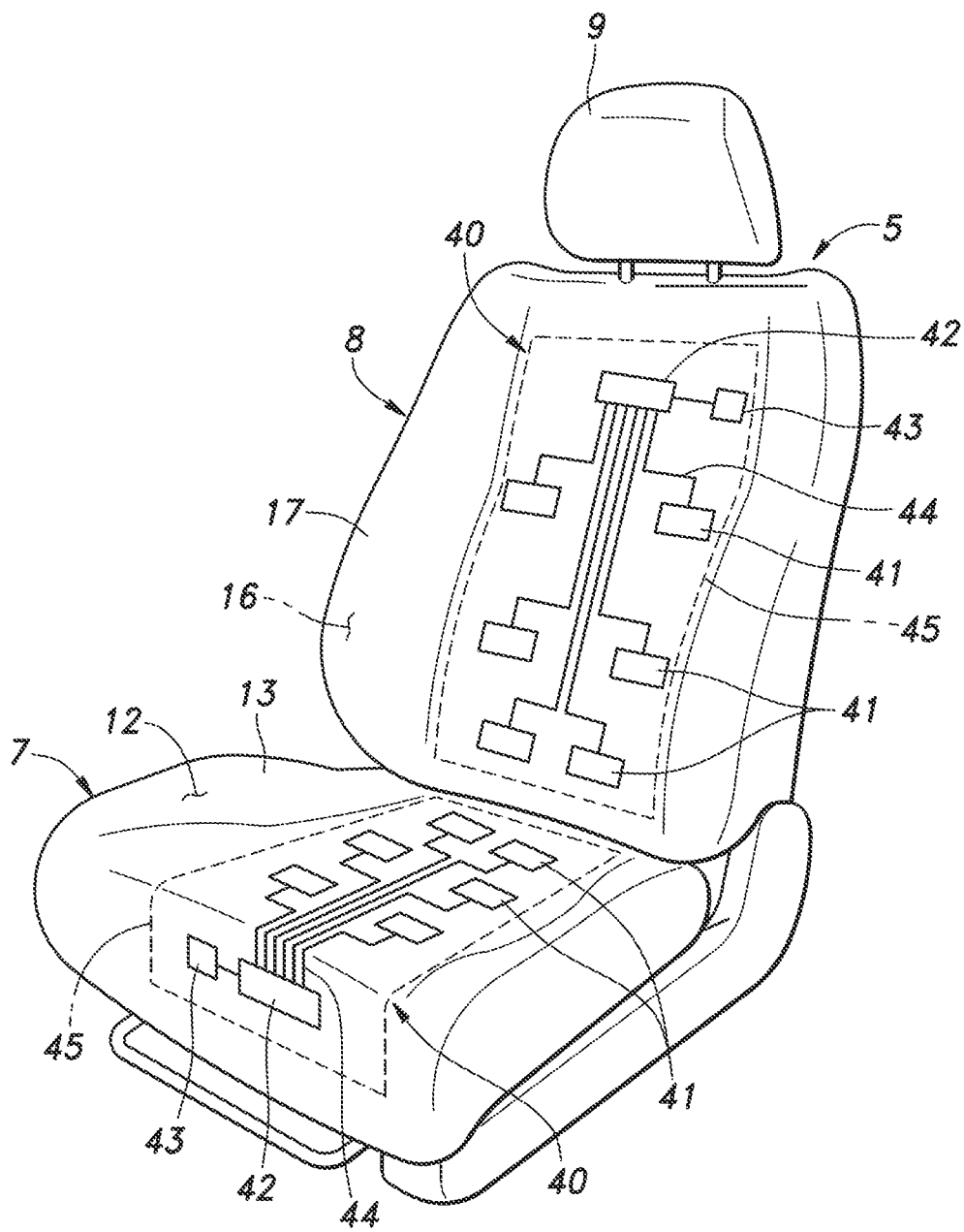
FIG. 2 is a perspective view of a seat main body.

As shown in FIG. 2, each seat cushion 7 includes a seat cushion frame (not shown in the drawings) forming a skeleton, a pad 12 supported by the seat cushion frame, and a skin member 13 coring the outer surface of the pad 12. Similarly, each seat back 8 includes a seat back frame (not shown in the drawings) forming a skeleton, a pad 16 supported by the seat back frame, and a skin member 17 covering the outer surface of the pad 16. The seat back frame is pivotably attached to the rear end of the seat cushion frame at the lower end thereof. The pads 12, 16 are formed of a flexible resin material having such as foamed urethane, for example. The skin members 13, 17 are formed of woven fabric, leather, or synthetic leather, for example.

The seat main body 5 is provided with at least one sensor 40. Preferably, the seat cushion 7 is provided with at least one sensor 40 and the seat back 8 is provided with at least one sensor 40. The sensor 40 includes multiple detection units 41, a single first communication unit 42, a single battery 43, and a wiring 44 connecting the multiple detection units 41, the first communication unit 42, and the battery 43. The first communication unit 42 is preferably configured by a microcomputer or the like. The battery 43 may be of a replacement type or may be rechargeable. The battery 43 is preferably configured to be recharged by connection with a wire harness or by wireless charging. The multiple detection units 41, the first communication unit 42, the battery 43, and the wiring 44 are preferably arranged on a common flexible sheet material 45. The sheet material 45 preferably is a flexible printed circuit board, for example. In the present embodiment, one of the sensors 40 is provided between the upper surface of the pad 12 of the seat cushion 7 and the skin member 13, and another one is provided between the front surface of the pad 16 of the seat back 8 and the skin member 17.

Each sensor 40 constitutes a load sensor, a pressure-sensitive switch, and/or a, touch sensor for detecting the load received from the user seated on the seat main body 5 or contact with the user. Each detection unit 41 of the sensor 40 may be a piezoelectric element, a membrane switch, or a capacitance sensor, for example. Also, the sensor 40 may preferably constitute biometric information sensors that detect the body temperature, pulsation, perspiration state, odor, etc. of the user seated on the seat main body 5. The biometric information sensors include a temperature sensor, a pulse sensor, a humidity sensor, an odor sensor, etc. In the present embodiment, the sensor 40 is a membrane switch that generates an on signal when receiving a load greater than or equal to a prescribed value.

Figure 3:
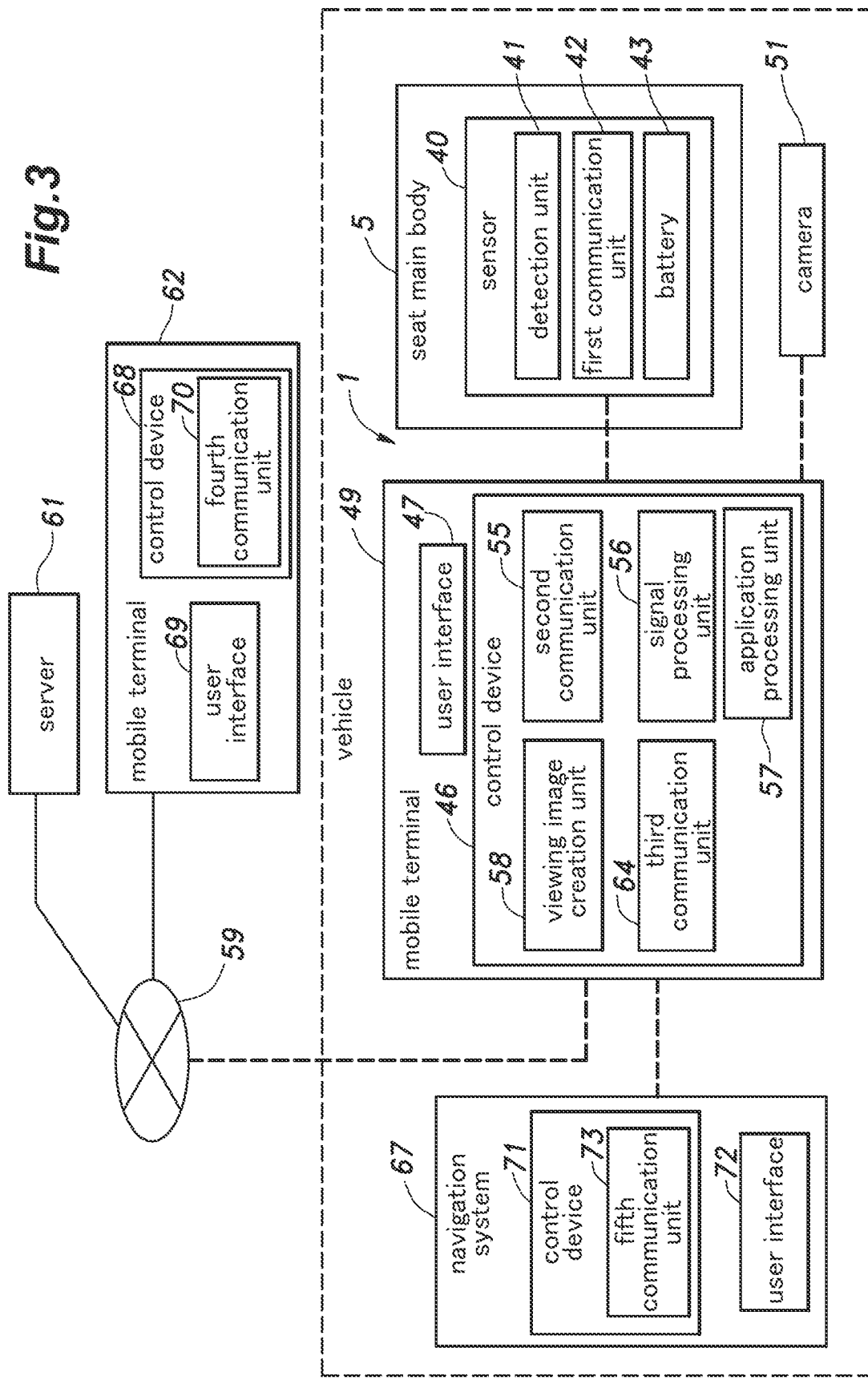
FIG. 3 is a block diagram of the seat system according to the first embodiment.

As shown in FIG. 3, the seat system 1 further includes a control device 46 communicating with each sensor 40, a user interface 47 controlled by the control device 46, and a camera 51 for capturing an image of the seated person seated on the seat main body 5. The user interface 47 at least has an output function of displaying an image and preferably has an input function of receiving input from the user. In the present embodiment, the user interface 47 is a touch panel display which enables input by the user' touch operation and display of an image. The touch panel display is preferably constituted of a liquid crystal display or an organic EL display, for example.

As shown in FIG. 1 and FIG. 3, the camera 51 may be a digital the camera. The camera 51 communicates with the control device 46 by wired communication or wireless communication and transmits the captured image data to the control device 46. The camera 51 may be provided for each seat main body 5 or a common camera 51 may be configured to capture images of multiple users sealed on the seat main bodies 5. The camera 51 is preferably provided on a structural member of the vehicle such as a roof 52 or a pillar 53 or on the rear surface of the seat main body 5 positioned in front of the seat main body 5 that is the target of the image-capture. Also, the camera 51 may be provided on an upper portion of the seat back 8 or on the headrest 9 of the seat main body 5 that is the target of the image-capture to capture an image around a side part of the face of the user seated on the seat main body 5.

In the present embodiment, the control device 46 and the user interface 47 are assembled integrally to constitute a mobile terminal 49. In another embodiment, the control device 46 and the user interface 47 may be disposed in the vehicle as mutually independent devices.

The control device 46 is an electronic control device including a CPU, a ROM, a RAM, a rewritable non-volatile memory, and so on. The control device 46 includes a second communication unit 55 wirelessly communicating with the first communication unit 42 of the sensor 40 to thereby communicate with the sensor 40, a signal processing unit 56 that processes the signal from the sensor 40, an application processing unit 57 that executes an application based on the signal from the signal processing unit 56, a viewing image creation unit 58, and a third communication unit 64 wirelessly communicating with a base station to connect with the internet 59. A server 61 may be a cloud server. The application processing unit 57 can execute various applications including games. The control device 46 functions as a platform and holds various applications. The applications may be imported to the control device 46 via the internet 59 or a storage medium. The applications include games and applications for operating the seat main body(s) 5 and the lighting and audio devices in the vehicle. In the present embodiment, the application processing unit 57 executes a game application using the sensors 40 as a controller. The server 61 connects the mobile terminal 49 with another mobile terminal 62 to enable an online game.

The other mobile terminal 62 may be present inside the vehicle or at a remote location outside the vehicle. The other mobile terminal 62 may be a known tablet PC or smartphone and includes a control device 68 and a user interface 69 for enabling input and output. The control device 68 includes a fourth communication unit 70 for wirelessly communicating with a base station to connect with the internet 59. The other mobile terminal 62 communicates with the control device 46, and the user interface 69 notifies information based on the signal from the control device 46. The user interface 69 preferably is a touch panel display with which input and output can be performed.

A dash panel 65 configuring a front portion the cabin 2 is provided with a navigation system 67. The navigation system 67 includes a control device 71 that executes a car navigation process based on GPS information and map information and a user interface 72 that displays a car navigation screen generated by the control device 71. The control device 71 of the navigation system 67 includes a fifth communication unit 73 for communicating with the second communication unit 55 of the mobile terminal 49. The user interface 72 preferably is a touch panel display with which input and output can be performed.

The first communication unit 42, the second communication unit 55, and the fifth communication unit 73 preferably conduct communication via near field communication such as Bluetooth (registered trademark). The third communication unit 64 and the fourth communication unit 70 preferably communicate with a base station device, which is connected with the internet 59, via wireless communication according a mobile communication standard to such as 4G or 5G.

The signal processing unit 56 converts the signal from the sensor 40 into a signal that can be processed by the application processing unit 57. When the application is started, the application processing unit 57 generates a game screen (image) and controls the user interface 47 provided on the mobile terminal 49 to cause the user interface 47 to display the game screen. Also, based on the signal from the signal processing unit 56, the application processing unit 57 executes the game process and changes the game screen displayed on the user interface 47. The user interface 47 preferably is a touch panel display constituted of a liquid crystal display or an organic EL display. The application processing unit 57 communicates with the server 61 via the third communication unit 64. The game application executed by the application processing unit 57 may move a character in the game based on a motion of the body of the user seated on the seat main body 5 so that the user plays a competition, for example.

Figure 4:
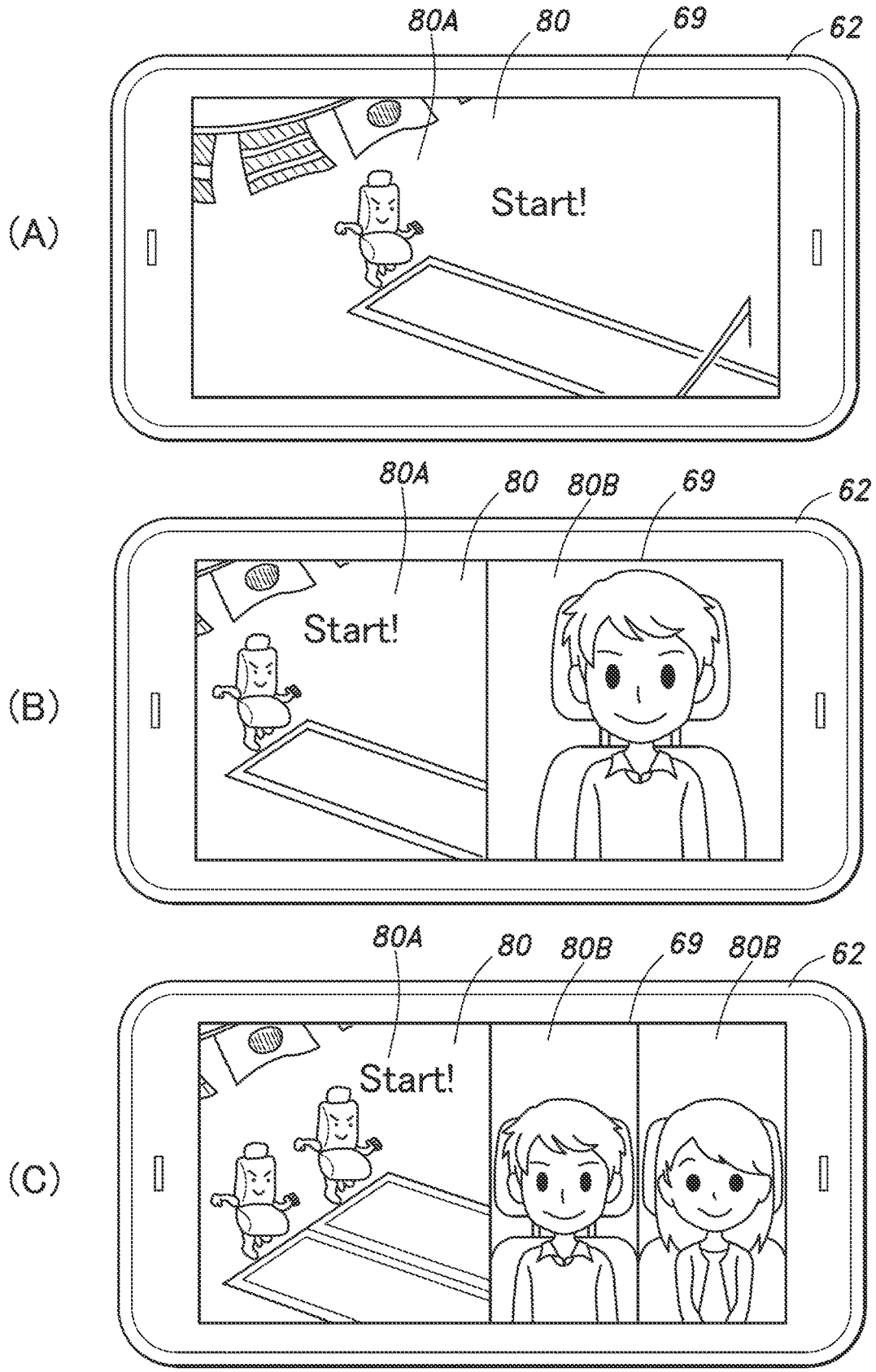
FIG. 4 shows a viewing screen displayed on the user interface of another mobile terminal, wherein (A) is a case where only a game image is included, (B) is a case where there is a single user playing the game, and (C) is a case where there are multiple users playing the game.

The viewing image creation unit 58 creates a viewing image 80 based on the image information from the camera 51 and the game screen. The viewing image 80 is an image displayed on the other mobile terminal 62 and the navigation system 67. The viewing image 80 includes at least one of a game image and a camera image. The viewing image 80 may include only a game image 80A as shown in FIG. 4(A), for example, and it is preferred that, as shown in FIG. 4(B), the game image 80A is displayed in the left half of the image and the camera image 80B is displayed in the right half. The camera image includes the user playing the game. As shown in FIG. 4(C), in a case where there are multiple users playing the game in the cabin 2, the right half may be divided in accordance with the number of the users playing the game so that the camera images 80B, 80B obtained by image-capturing the respective users are displayed.

The control device 46 transmits the viewing image 80 to the control device 71 of the navigation system 67, and the control device 71 causes the user interface 72 to display the viewing image 80. Also, the control device 46 transmits the viewing image 80 to the external mobile terminal 62, and the control device 68 of the mobile terminal 62 causes the user interface of the mobile terminal 62 to display the viewing image 80.

The user interface 69 of the other mobile terminal 62 may receive input of a message by the user, and the control device 68 may transmit the input message to the mobile terminal 49. The application processing unit 57 of the mobile terminal 49 may display the received message on the game screen. Thereby, the user of the other mobile terminal 62 also can participate in the game as a cheerer.

The viewing image 80 may be stored in at least one of the control device 46, the server 61, and the control device 68. The control device 68 may select the stored viewing image 80 in accordance with an operation by the other user and display it on the user interface 69. Preferably, the control device 68 displays an image selection screen showing a list of the past viewing images 80 on the user interface 69 to have the other user select the viewing image 80 to be displayed. Thereby, the other user can see the past viewing images 80.

Also, the server 61 preferably stores the viewing images 80 transmitted from multiple control devices 46. The control device 68 preferably displays, on the user interface 69, the viewing image 80 selected from among the viewing images 80 transmitted from the multiple control devices 46 in accordance with an operation by the other user. Preferably, the control device 68 displays an image selection screen showing a list of the viewing images 80 transmitted from the multiple control devices 46 on the user interface 69 to have the other user select the viewing image 80 to be displayed. Thereby, the other user can see the viewing images 80 generated by the multiple control devices 46.

According to the above embodiment, a video game using the sensors 40 provided in the seat main body 5 as a game controller can be provided to the user. The sensors 40 detect the motion of the body of the user seated on the seat main body 5 and the game is executed in response to the motion of the body of the user. Namely, the seat system 1 provides a game that the user seated on the seat main body 5 can enjoy by moving the body.

The seat system 1 enables the information of the user seated on the seat main body 5 to be acquired by the other user using the user interface 69 of the mobile terminal 62. In a case where the seat is outside the field of view or in a case where the seat main body 5 is at a remote location, the other user can grasp the state of the user seated on the seat main body 5 without visual observation, which may be used in childcare, nursing, watching, or the like. Fax example, the user seated on the seat main body 5 constituting the front seat can acquire the information of the user seated on the seat main body 5 constituting the middle seat by using the user interface 69 of the mobile terminal 62. Also, a user at a location far away from the vehicle can acquire the information of the user seated on the seat main body 5 in the vehicle.

In addition, since the viewing image 80 is displayed on the user interface 72 of the navigation system 67 also, the user seated on the seat main body 5 constituting the front seat can acquire it by using the user interface 72 of the navigation system 67.

Since the viewing image 80 includes the captured image of the user seated on the seat main body 5, the other user can see the image of the user playing the game. Also, since the viewing image 80 additionally includes the game image, the game playing status of the user can be seen. For example, grandparents at a remote location away from the vehicle can see the behavior of their grandchild enjoying the game in the vehicle.

In the seat system 1 according to the first embodiment, when the mobile terminal 62 is at a position relatively close to the mobile terminal 49, for example, when the mobile terminal 62 is inside the vehicle, the mobile terminal 62 may communicate with the mobile terminal 49 directly and wirelessly via near field communication.

Second Embodiment

Figure 5:
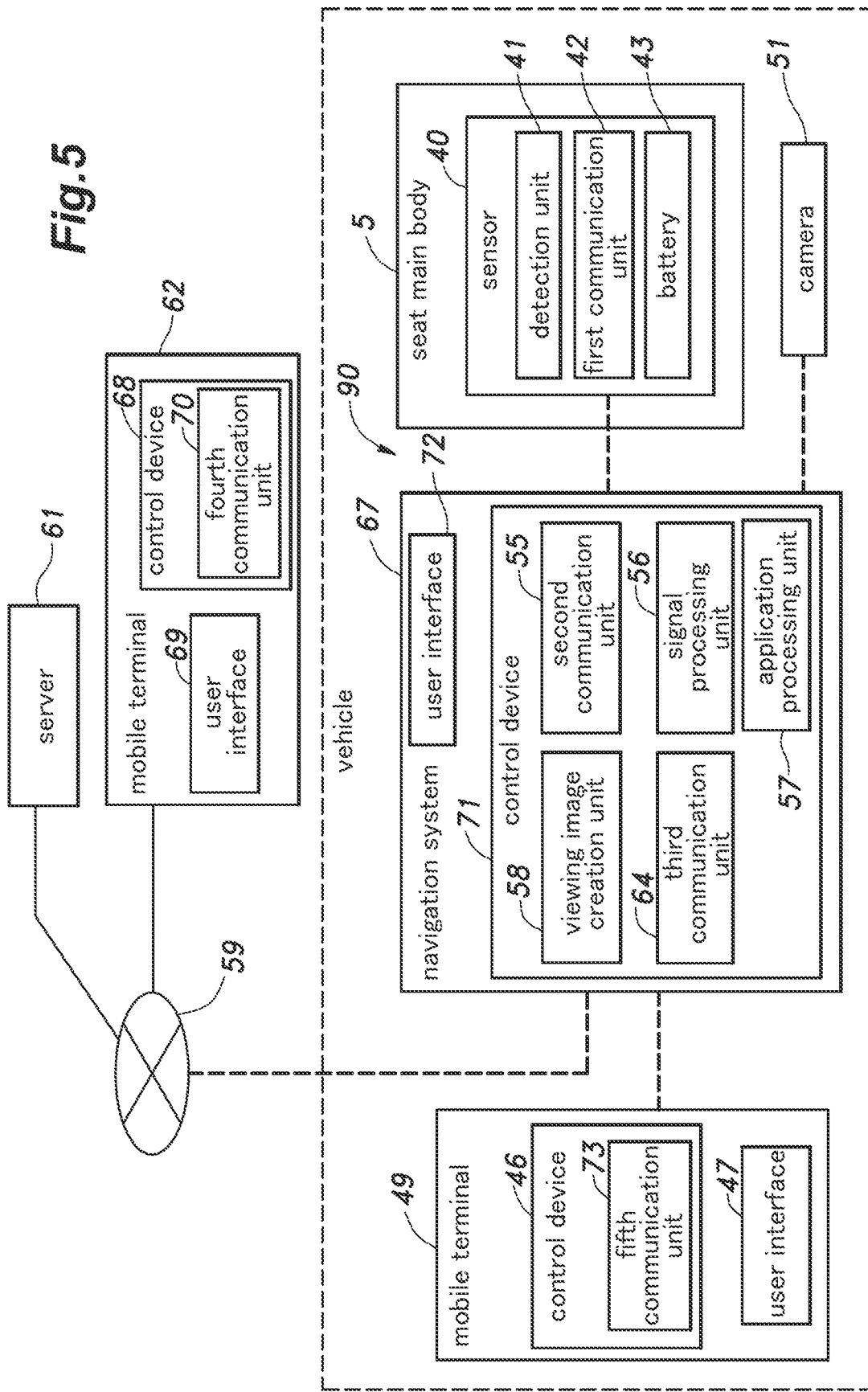
FIG. 5 is a block diagram of a seat system according to the second embodiment.

As shown in FIG. 5, compared with the seat system 1 according to the first embodiment, a seat system 90 according to the second embodiment differs in that the control device 71 of the navigation system 67 includes the second communication unit 55, the signal processing unit 56, the application processing unit 57, the viewing image creation unit 58, and the third communication unit 64. In the seat system 90, the mobile terminal 49 is optional and may be omitted.

According to the seat system 90 of the second embodiment, it is possible to process the signal from the sensors 40 and execute the game process by using the navigation system 67 provided in the vehicle, and the mobile terminal 49 may be omitted.

Third Embodiment

Figure 6:
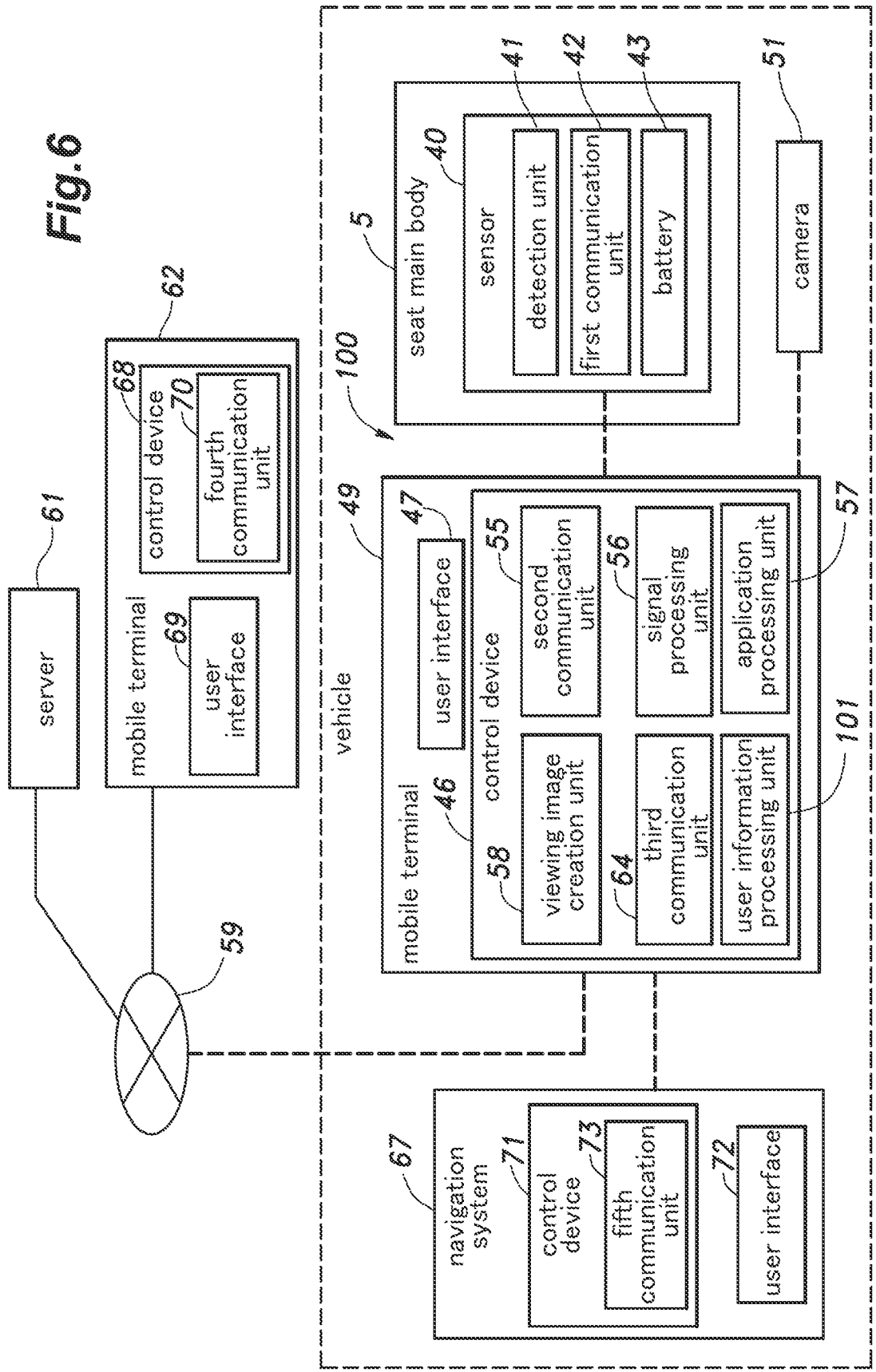
FIG. 6 is a block diagram of a seat system according to the third embodiment.

As shown in FIG. 6, compared with the seat system 1 according to the first embodiment, a seat system 100 according to the third embodiment differs in having a user information processing unit 101. In the seat system 100, the sensors 40 include a pressure sensor for detecting the pressure (load) received from the user seated on the seat main body 5, a pulse sensor for acquiring the pulsation of the user seated on the seat main body 5, and a body temperature sensor for measuring the body temperature of the user seated on the seat main body 5.

Figure 7:
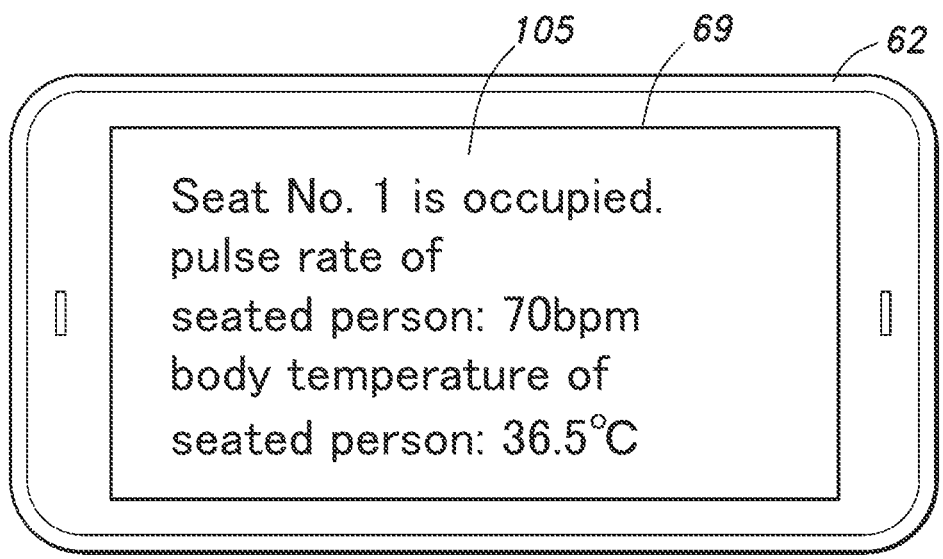
FIG. 7 is a user information screen displayed on the user interface of another mobile terminal.

The user information processing unit 101 acquires, based on the signal from the sensors 40, user information including whether there is a user seated on the seat main body 5, the pulsation of the user seated on the seat main body 5, and the body temperature of the user seated on the seat main body 5. Then, the control device 46 transmits the user information to the other mobile terminal 62 to make the user interlace 69 display a user information screen 105 containing the user information. The user information screen 105 may be a screen as shown in FIG. 7, for example. Also, the control device 46 may transmit the user information to the navigation system 67 to make the user interface 72 display the user information screen 105.

The user information may be stored in at least one of the control device 46, the server 61, and the control device 68. The control device 68 may select the stored user information in accordance with an operation by the other user, generate the user information screen 105 based on the selected user information, and display the user information screen 105 on the user interface 69. Preferably, the control device 68 displays a user information selection screen showing a list of the past user information on the user interface 69 to have the other user select the user information to be displayed. Thereby, the user can see the past user information.

Also, the server 61 preferably stores the user information transmitted from multiple control devices 46. The control device 68 may generate the user information screen 105 based on the user information selected from among the user information transmitted from the multiple control devices 46 in accordance with an operation by the other user and display the user information screen 105 on the user interface 69. Preferably, the control device 68 displays a user information selection screen showing a list of the user information transmitted from the multiple control devices 46 on the user interface 69 to have the other user select the user information to be displayed. Thereby, the other user can see the user information acquired by the multiple control devices 46.

According to the seat system 100, the user having the mobile terminal 62 can know Whether there is a user seated on the seat main body 5, and if there is a seated user, can acquire the biometric information of the user including pulsation and body temperature. In the seat system 100, by configuring the sensors 40 to include a humidity sensor, an odor sensor and the like, it is possible to allow the perspiration state, odor, etc. of the user seated on the seat main body 5 to be acquired by another user at a remote location.

When applied to a chair for residence, the seat system 100 is suitable for watching of an elderly person from a remote location. According to the seat system 100, it is possible to know whether an elderly person living at a remote location used the seat main body 5, and if used, to acquire the health condition such as a pulsation and a body temperature.

Fourth Embodiment

Figure 8:
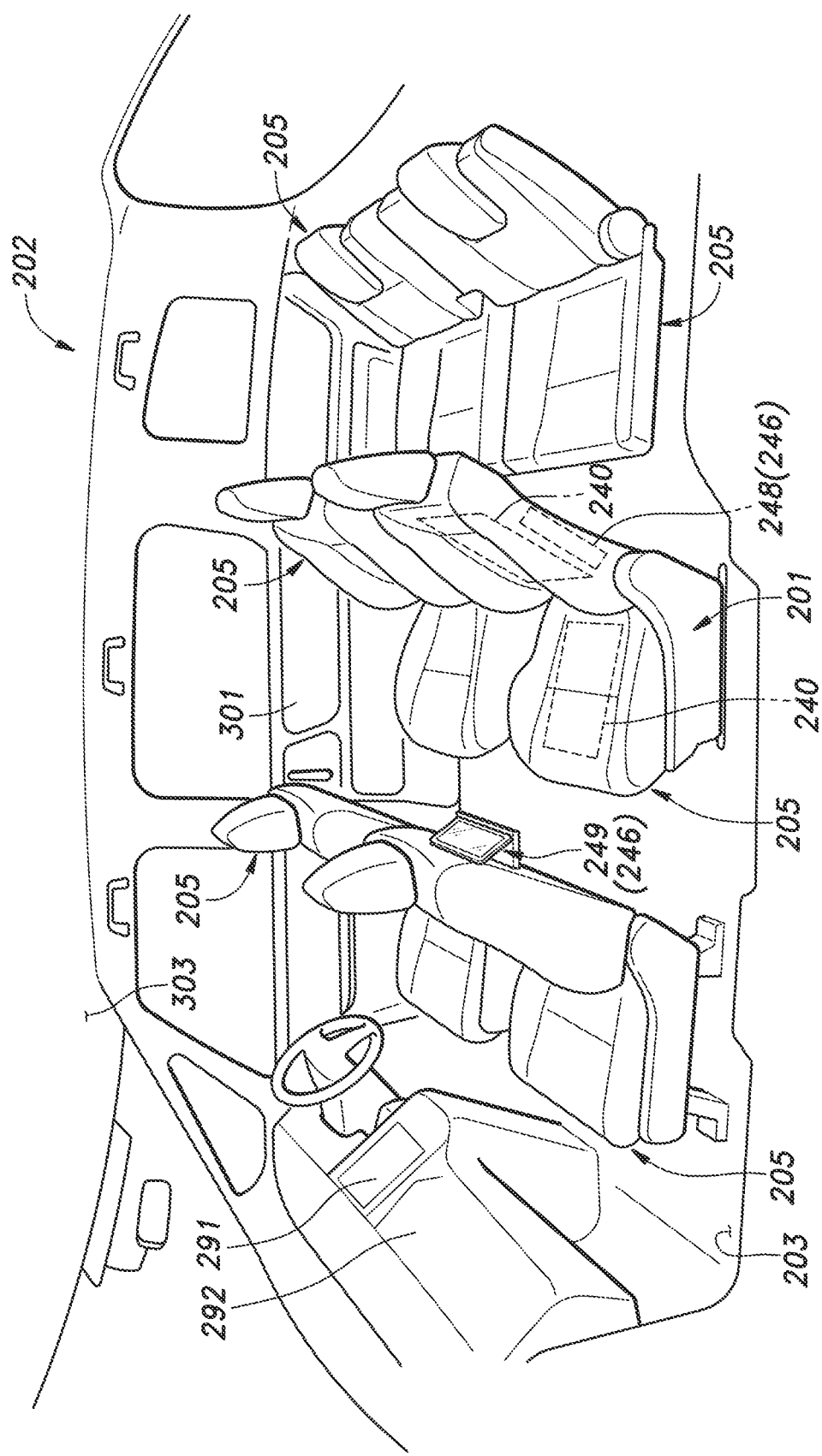
FIG. 8 is a perspective view of a cabin of a vehicle in which a seat system according to the fourth embodiment is installed.

As shown in FIG. 8, a seat system 201 includes at least one seat main body 205 arranged on a floor 203 defining a bottom portion of a cabin 202. In the present embodiment, the seat system 201 includes multiple seat main bodies 205. In the following description, the front-rear, left-right, and up-down directions are defined with respect to the user seated on the seat main body 205.

Figure 9:
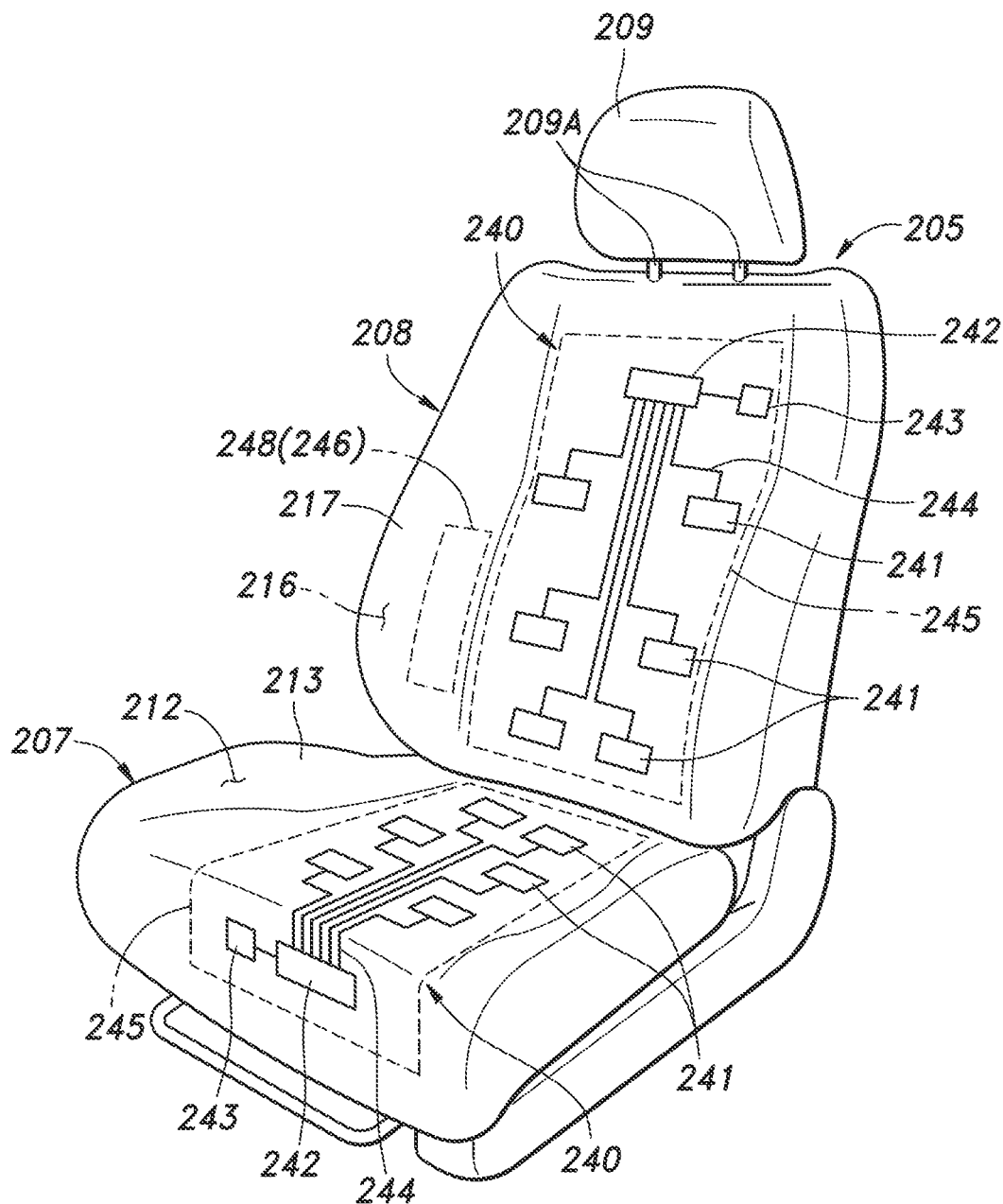
FIG. 9 is a perspective view of a seat main body.
Figure 10:
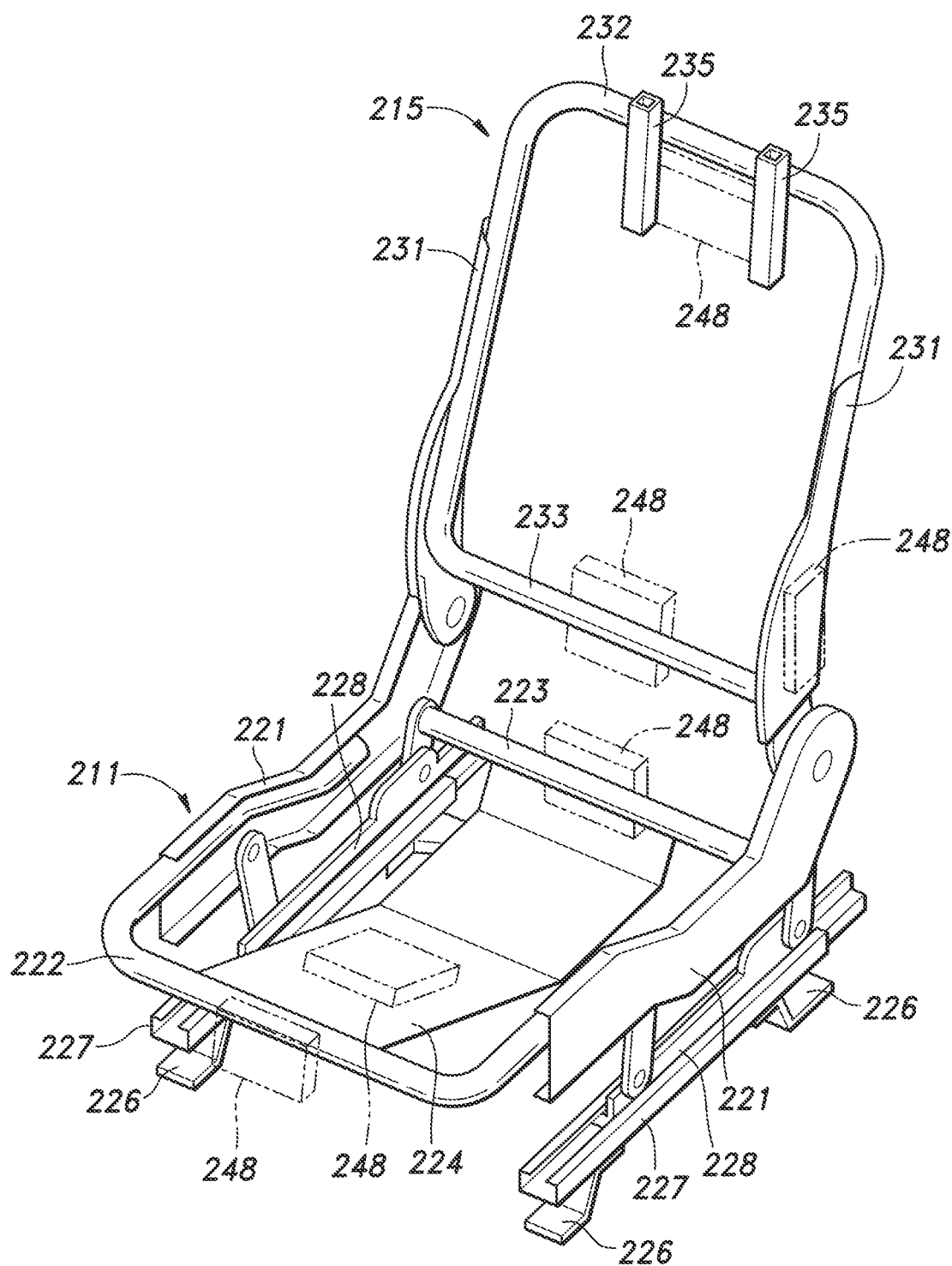
FIG. 10 is a perspective view of a seat frame.

The seat main bodies 205 constitute left and right front seats, left and right middle seats provided behind the front seats, and left and right rear seats provided behind the middle seats. As shown in FIG. 9 and FIG. 10, each seat main body 205 includes a seat cushion 207 provided on the floor 203 of the cabin 202 via slide rails 206, a seat back 208 joined to a rear portion of the seat cushion 207, and a headrest 209 provided on an upper side of the seat back 208.

Each seat cushion 207 includes a seat cushion frame 211 forming a skeleton, a pad 212 supported by the seat cushion frame 211, and a skin member 213 covering the outer surface of the pad 212. Similarly, each seat back 208 includes a seat back frame 215 forming a skeleton, a pad 216 supported by the seat back frame 215, and a skin member 217 covering the outer surface of the pad 216. The seat back frame 215 is pivotally attached to the rear end of the seat cushion frame 211 at the lower end thereof. The pads 212, 216 are formed of a flexible resin material such as foamed urethane, for example. The skin members 213, 217 are formed of woven fabric, leather, or synthetic leather, for example.

The seat cushion frame 211 includes left and right cushion side members 221 extending in the fore and aft direction, a front member 222 extending laterally to connect the front ends of the left and right cushion side members 221 to each other, a rear member 223 extending laterally to connect rear portions of the left and right cushion side members 221 to each other, and a plate-shaped pan frame 224 (pressure receiving member) extending between the front member 222 and the rear member 223, with surfaces facing up and down. The slide rails 206 include left and right lower rails 227 extending in the fore and aft direction and fixed to the floor 203 via mount members 226 and left and right upper rails 228 provided on the relative lower rails 227 to be movable in the fore and aft direction. The left and right cushion side members 221 are joined to the laterally corresponding upper rails 228. The rear ends of the left and right cushion side members 221 extend from the rear member 223 rearward and upward.

The seat back frame 215 includes left and right back side members 231 extending vertically, an upper member 232 extending laterally to connect the upper ends of the left and right back side members 231 to each other, and a lower member 233 extending laterally to connect lower portions of the left and right cushion side members 221 to each other. The lower ends of the left and right back side members 231 extend downward from the lower member 233 and are pivotably joined to the rear ends of the laterally corresponding cushion side members 221. A reclining mechanism not shown in the drawings is provided between the lower ends of the left and right back side members 231 and the rear ends of the corresponding cushion side members 221.

Figure 11:
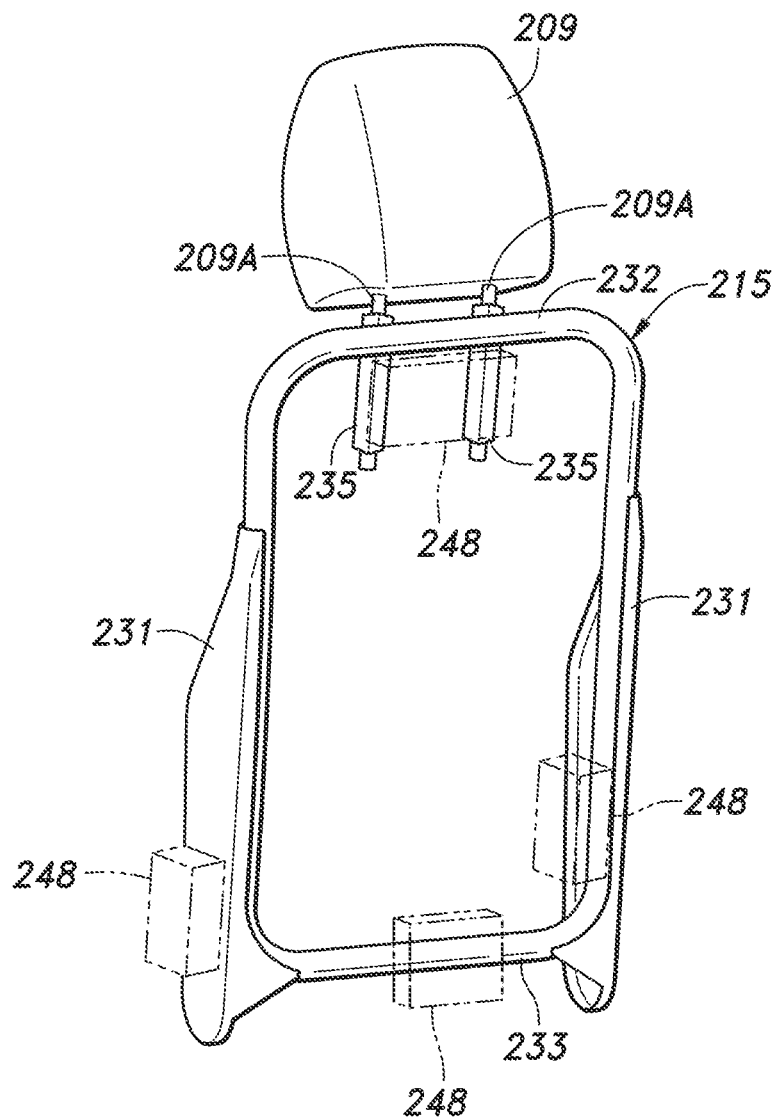
FIG. 11 is a perspective view of a seat back frame as viewed from behind.

As shown in FIG. 10 and FIG. 11, the upper member 232 is provided with left and right headrest support members 235 laterally spaced from each other. Each headrest support member 235 is formed in a rectangular tubular shape having open ends. Each headrest support member 235 is joined to the upper member 232 at a rear surface thereof and extends vertically. A sleeve made of resin (not shown in the drawings is inserted in each headrest support member 235, and left and right pillars 209A extending downward from the headrest 209 are inserted in the respective sleeves.

As shown in FIG. 9, the seat main body 205 is provided with at least one sensor 240. Preferably, the seat cushion 207 is provided with at least one sensor 240 and the seat back 208 is provided with at least one sensor 240. The sensor 240 includes multiple detection units 241, a single first communication unit 242, a single battery 243, and a wiring 244 connecting the multiple detection units 241, the first communication unit 242, and the battery 243. The first communication unit 242 is preferably configured by a microcomputer or the like. The battery 243 may be of a replacement type or may be rechargeable. The battery 243 is preferably configured to be recharged by connection with a wire harness or by wireless charging. The multiple detection units 241, the first communication unit 242, the battery 243, and the wiring 244 are preferably arranged on a common flexible sheet material 245. The sheet material 245 preferably is a flexible printed circuit board, for example. In the present embodiment, one of the sensors 240 is provided between the upper surface of the pad 212 of the seat cushion 207 and the skin member 213, and another one is provided between the front surface of the pad 216 of the seat back 208 and the skin member 217.

Each sensor 240 constitutes a load sensor, a pressure-sensitive switch, and/or a touch sensor for detecting the load received from the user seated on the seat main body 205 or contact with the user. Each detection unit 241 of the sensor 240 may be a piezoelectric element, a membrane switch, or a capacitance sensor, for example. Also, the sensor 240 may preferably constitute biometric information sensors that detect the body temperature, pulsation, perspiration state, odor, etc. of the user seated on the seat main body 205. The biometric information sensors include a temperature sensor, a pulse sensor, a humidity sensor, an odor sensor, etc. In the present embodiment, the sensor 240 is a membrane switch that generates an on signal when receiving a load greater than or equal to a prescribed value.

Figure 13:
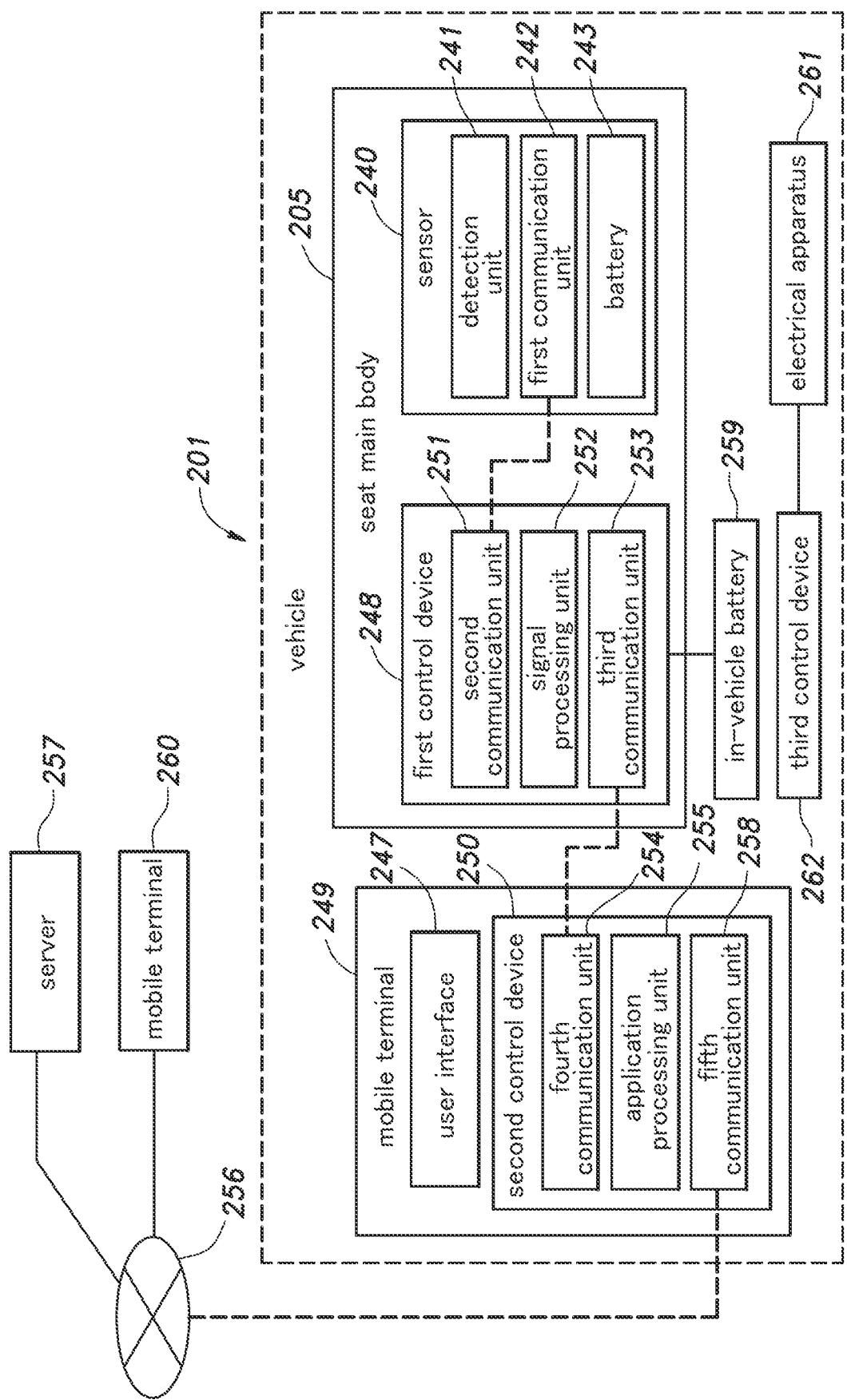
FIG. 13 is a block diagram of a seat system according to the fourth embodiment.

As shown in FIG. 8 and FIG. 13, the seat system 201 includes a control device 246 wirelessly communicating with the sensors 240 and a user interface 247 controlled by the control device 246. The user interface 247 at least has an output function of displaying an image and preferably has an input function of receiving input from the user. In the present embodiment, the user interface 247 is a touch panel display which enables input by the user' touch operation and display of an image. The touch panel display is preferably constituted of a display device such as a liquid crystal display or an organic EL display, for example. Also, the user interface 247 may be provided with a speaker for generating sound. The control device 246 controls the user interface 247 according to the signal from the sensors 240. Specifically, according to the signal from the sensors 240, the control device 246 changes the image displayed on the user interface 247 or changes the sound generated by the user interface 247. The control device 246 includes at least one of a stationary-type first control device 248 that is mounted to the seat main body 205 or a structural member present around the seat main body 205 and a second control device 250 built in a mobile terminal 249 including a, tablet PC and a smartphone.

The seat system 201 according to the fourth embodiment includes, as the control device 246, the stationary-type first control device 248 provided in the cabin 202 and the second control device 250 built in the mobile terminal 249. The first control device 248 and the second control device 250 are each an electronic control device including a CPU, a ROM, a RAM, a rewritable non-volatile memory, and so on. The first control device 248 includes a second communication unit 251 wirelessly communicating with the first communication unit 242 of each sensor 240 to receive a signal from the sensor 240, a signal processing unit 252 that processes the signal from each sensor 240, and a third communication unit 253 wirelessly communicating with the second control device 250 to transmit the signal generated by the signal processing unit 252 to the second control device 250. The second control device 250 includes a fourth communication unit 254 wirelessly communicating with the third communication unit 253 of the first control device 248 to receive the signal from the signal processing unit 252, an application processing unit 255 that executes an application, and a fifth communication unit 258 that communicates with an external server 257 via the internet 256. The server 257 may be a cloud server. The application processing unit 255 can execute various applications including games. The second control device 250 functions as a platform and holds various applications. The applications may be imported to the second control device 250 via the internet 256 or a storage medium. The applications include games and applications for operating the seat main bodies 205 and the lighting and audio devices in the vehicle. In the present embodiment, the application processing unit 255 executes a game application using the sensors 240 as a controller. The server 257 connects the mobile terminal 249 with another mobile terminal 260 to enable an online game. The other mobile terminal 260 may be present inside the vehicle or at a remote location outside the vehicle.

The first communication unit 242, the second communication unit 251, the third communication unit 253, and the fourth communication unit 254 preferably conduct communication via near field communication such as Bluetooth (registered trademark). The fifth communication unit 258 connects with the server 257 via a base station device and the internet 256 by wireless communication according to a mobile communication standard such as 4G or 5G.

The signal processing unit 252 converts the signal from the sensor 240 into a signal that can be processed by the application processing unit 255. When the game application is started, the application processing unit 255 generates a game screen (game image) and controls the user interface 247 provided in the mobile terminal 249 to cause the user interface 247 to display the game screen. Also, based on the signal received from the signal processing unit 252, the application processing unit 255 executes the game process and changes the game screen displayed on the user interface 247. The application processing unit 255 communicates with the server 257 via the fifth communication unit 258. The game application may move a character in the game based on a motion of the body of the user seated on the seat main body 205 so that the user plays a competition, for example.

In the present embodiment, the first control device 248 is provided for each seat main body 205, and at least one mobile terminal 249 including the second control device 250 is provided for the vehicle. In the present embodiment, six first control devices 248 are provided, and a single mobile terminal 249 including the second control device 250 is provided. The mobile terminal 249 including the second control device 250 wirelessly communicates with the six first control devices 248.

Each first control device 248 is connected with an in-vehicle battery 259 by wire and is supplied with electric power from the in-vehicle battery 259. In another embodiment, the first control device 248 may have a battery (not shown in the drawings). The battery may be of a replacement type or may be rechargeable. The charging of the battery may be performed by wired charging or by wireless charging.

The seat main body 205 is provided with an electrical apparatus 261 and a third control device 262 for controlling the electrical apparatus 261. The electrical apparatus 261 includes at least one of known devices such as an electric reclining device, an electric fore-and-aft slide device, a seat heater, a seat blower, etc. As an example, in the present embodiment, the electrical apparatus 261 is a seat heater provided between the pad 212 of the seat cushion 207 and the skin member 213. The seat heater includes a flexible sheet material and a heating wire provided on the surface of the sheet material and generates heat when supplied with electric power. The third control device 262 controls the supply of electric power from the in-vehicle battery 259 to the seat heater. The third control device 262 is an electronic control device including a CPU, a ROM, a RAM, a rewritable non-volatile memory, and so on. The third control device 262 may wirelessly communicate with the sensors 240 and control the electrical apparatus 261 according to the signal from the sensors 240. Namely, the sensors 240 may function as a switch for operating the electrical apparatus 261.

Figure 12:
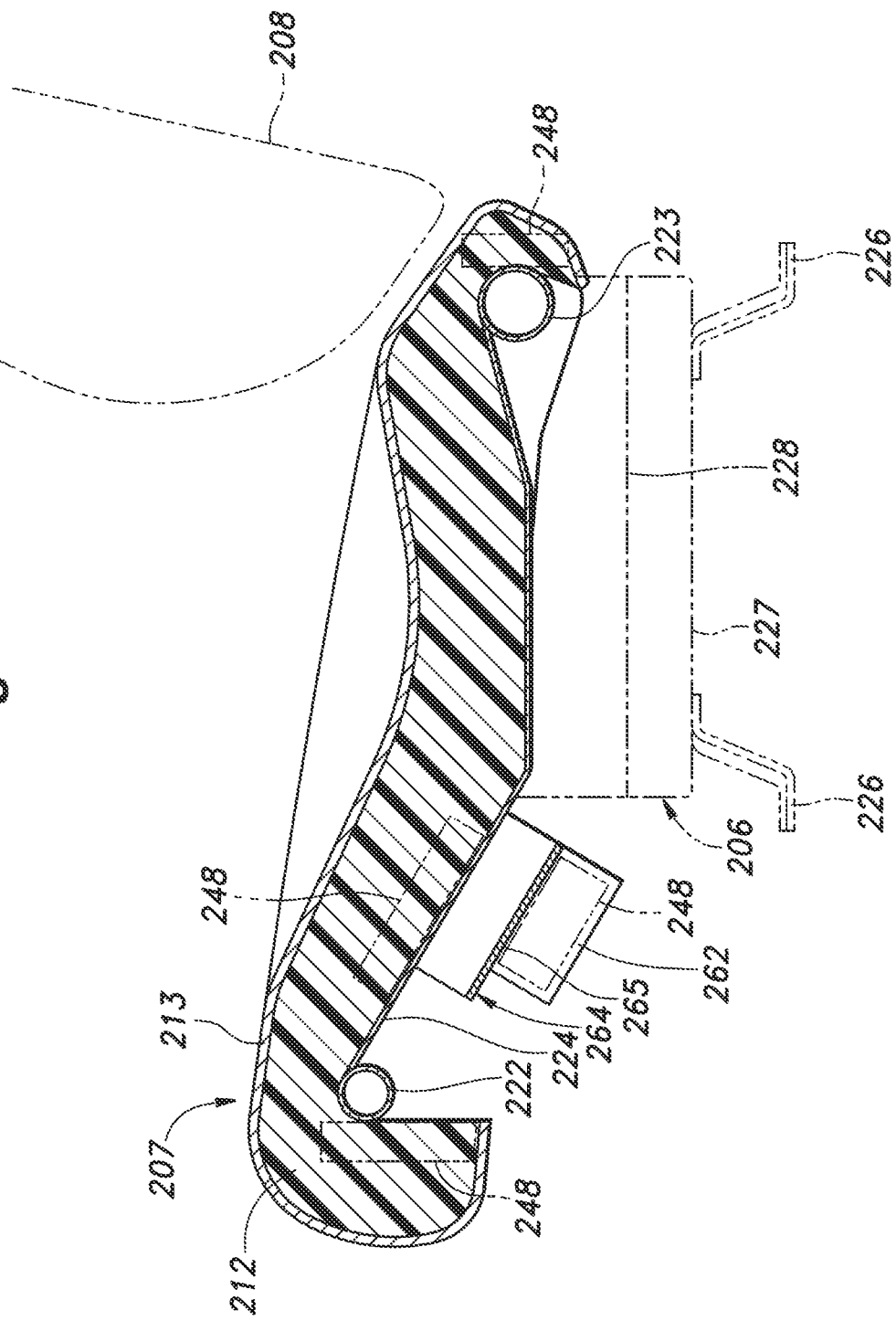
FIG. 12 is a sectional view of a seat cushion taken along a center line.

Each first control device 248 includes a case 248A having a flat rectangular parallelepiped shape and forming an outer shell thereof. The first control device 248 is provided in the seat main body 205 or on a structure member configuring the cabin 202. As shown in FIG. 10 to FIG. 12, the first control device 248 is preferably attached to the seat back frame 215 or the seat cushion frame 211, for example. In FIG. 10 to FIG. 12, multiple positions where the first control device 248 can be disposed are shown by two-dot chain lines. The first control device 248 is preferably disposed in one of the positions shown by the two-dot chain lines in FIG. 10 to FIG. 12. Specifically, as shown in FIG. 10 and FIG. 11, the first control device 248 is preferably attached to the left and right headrest support members 235. For example, the first control device 248 is preferably attached to the rear surfaces of the both left and right headrest support members 235 such that the surfaces of the first control device 248 face in the fore and aft direction. Also, it is possible to provide a support plate to extend between the rear surfaces of the left and right headrest support members 235 such that the surfaces of the support plate face in the fore and aft direction, and to attach the first control device 248 to the rear surface or the front surface of the support plate such that the surfaces of the first control device 248 face in the fore and aft direction. Also, the first control device 248 may be attached to an outboard surface or an inboard surface of either back side member 231 constituting a side portion of the seat back frame 215 such that the surfaces of the first control device 248 face in the lateral direction. Also, the first control device 248 may be attached to a front portion or a rear portion of the lower member 233 constituting the lower portion of the seat back frame 215 such that the surfaces of the first control device 248 face in the fore and aft direction. Also, the first control device 248 may be attached to a front portion or a rear portion of the upper member 232 constituting the upper portion of the seat back frame 215 such that the surfaces of the first control device 248 face in the fore and aft direction. The way of attaching the first control device 248 to various parts of the seat back frame 215 may be fastening using bolts and nuts, fastening using a resin fastener, fastening using a fastening band, or the like.

The first control device 248 is preferably covered with the pad 216 and the skin member 217 of the seat back 208. Also, an opening may be formed in the pad 216 and the skin member 217 of the seat back 208, and the first control device 248 may be exposed on the outer surface of the seat back 208. The outer surface of the first control device 248 may be disposed to be flush with the outer surface of the seat back 208 or may protrude outward relative to the outer surface of the seat back 208.

Also, the first control device 248 may be provided on the seat cushion frame 211, as shown in FIG. 10 and FIG. 12. Tor example, the first control device 248 may be attached to a front portion or a rear portion of the front member 222 constituting the front portion of the seat cushion frame 211 such that the surfaces of the first control device 248 face in the fore and aft direction. Also, for example, the first control device 248 may be attached to a front portion or a rear portion of the rear member 223 constituting the rear portion of the seat cushion frame 211 such that the surfaces of the first control device 248 face in the fore and aft direction. The first control device 248 is preferably covered with the pad 212 and the skin member 213 of the seat cushion 207. Also, an opening may be formed in the pad 212 and the skin member 213 of the seat cushion 207, and the first control device 248 may be exposed on the outer surface of the seat cushion 207. The outer surface of the first control device 248 may be disposed to be flush with the outer surface of the seat back 208 or may protrude outward relative to the outer surface of the seat back 208.

Also, the first control device 248 may be attached to an upper surface or a lower surface of the pan frame 224 of the seat cushion frame 211. A bracket 264 may be provided on the lower surface of the pan frame 224, and the first control device 248 may be attached to the bracket 264. The bracket 264 includes a planar support part 265 opposing the lower surface of the pan frame 224 via a gap and a pair of legs 266 extending from both ends of the support part 265 to the lower surface of the pan frame 224 and are joined to the lower surface of the pan frame 224. The bracket 264 preferably is a sheet metal member and is preferably joined to the pan frame 224 by bolt fastening or welding. The support part 265 of the bracket 264 is disposed in parallel with the pan frame 224 and is inclined upward toward the front.

Figure 14:
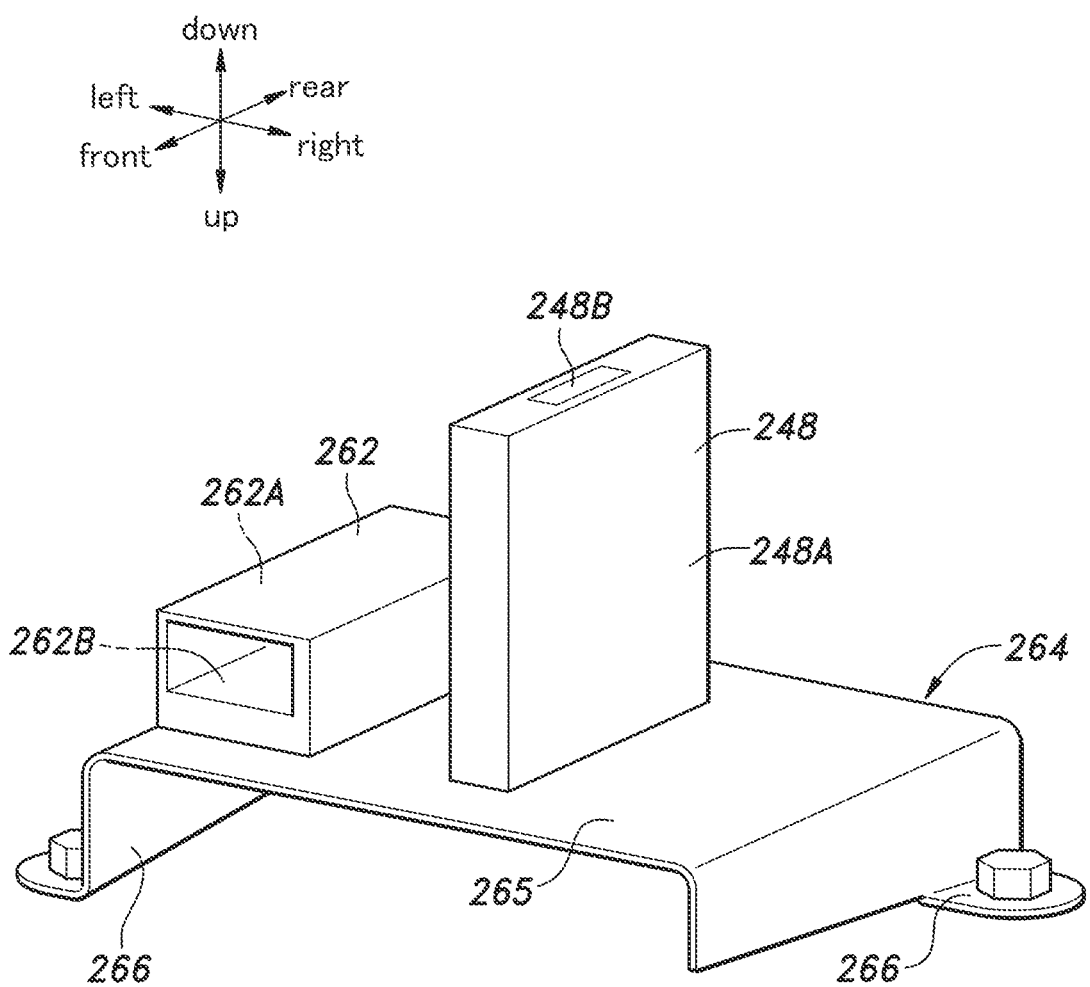
FIG. 14 is a perspective view of a bracket as viewed from below and shows an example of an arrangement of a first control device and a third control device relative to the bracket.
Figure 15:
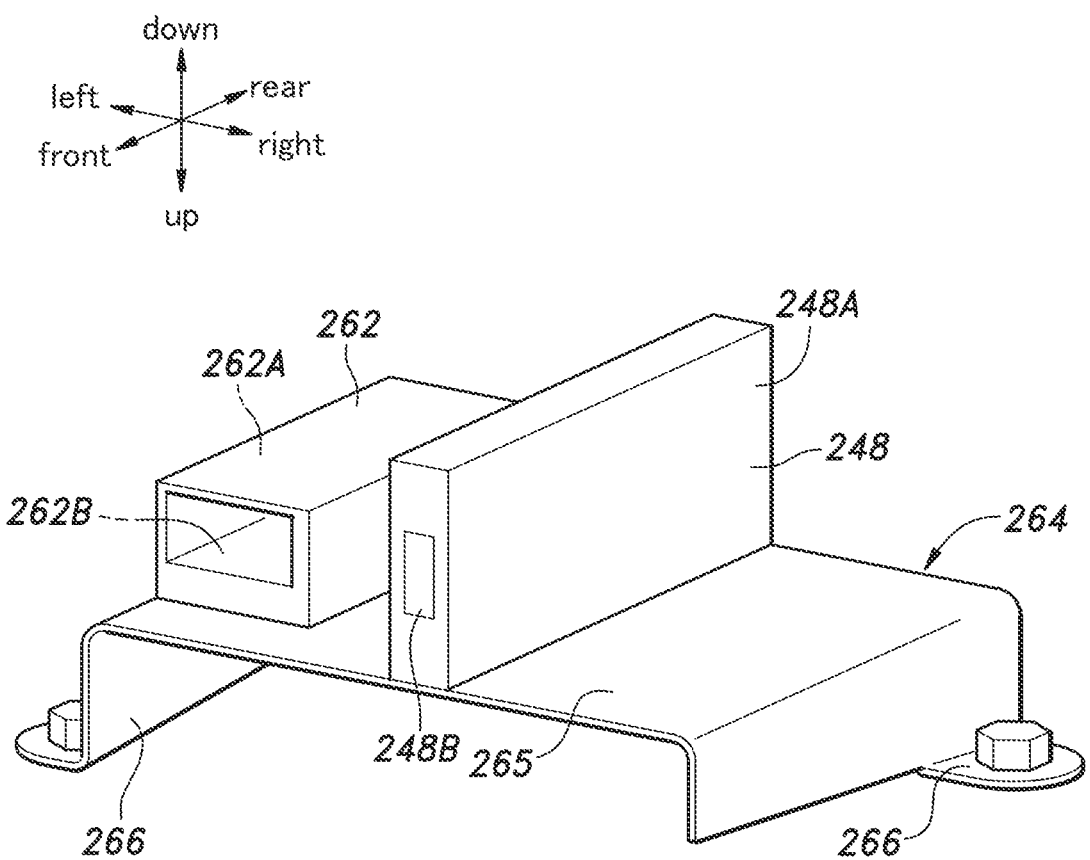
FIG. 15 is a perspective view of a bracket as viewed from below and shows an example of the arrangement of the first control device and the third control device relative to the bracket.
Figure 16:
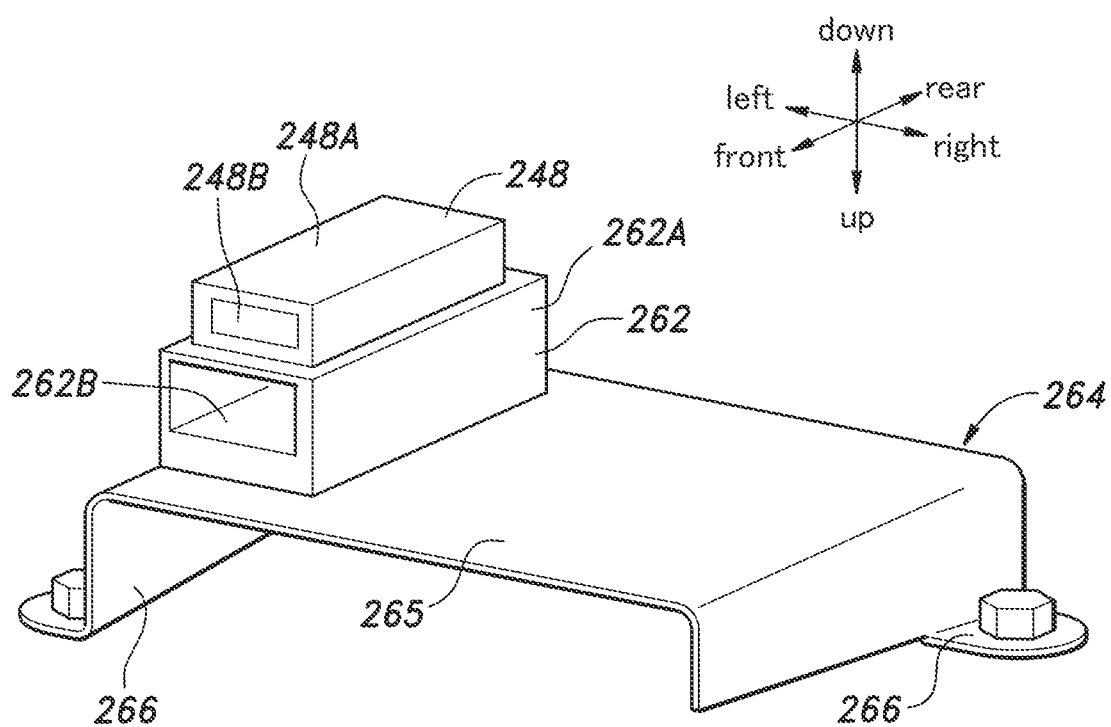
FIG. 16 is a perspective view of a bracket as viewed from below and shows an example of the arrangement of the first control device and the third control device relative to the bracket.

The third control device 262 is attached to the lower surface of the support part 265 of the bracket 264 such that the main surface thereof extends along the support part 265. The first control device 248 is attached to the lower surface of the support part 265 on a side of the third control device 262 in the fore and aft direction or in the lateral direction. For example, as shown in FIG. 14 to FIG. 16, the third control device 262 is preferably disposed to the left or right of the first control device 248 and attached to the support part 265 such that the main surface faces in the fore and aft direction or in the lateral direction. Also, as shown in FIG. 15, the first control device 248 may be disposed on the support part 265 such that a connector part 248B provided on the outer surface of the case 248A is positioned at the front end, or may be disposed such that the connector part 248B is positioned at the lower end.

Also, as shown in FIG. 16, the first control device 248 may be attached to a case 262A constituting an outer shell of the third control device 262 attached to the support part 265. For example, the first control device 248 may be attached to the front or rear side surface, the left or right side surface, or the lower surface of the third control device 262. In the case where the first control device 248 is attached to the lower surface of the third control device 262, it is preferred that the first control device 248 and the third control device 262 are preferably joined to overlap each other such that their main surfaces are in parallel.

Figure 17:
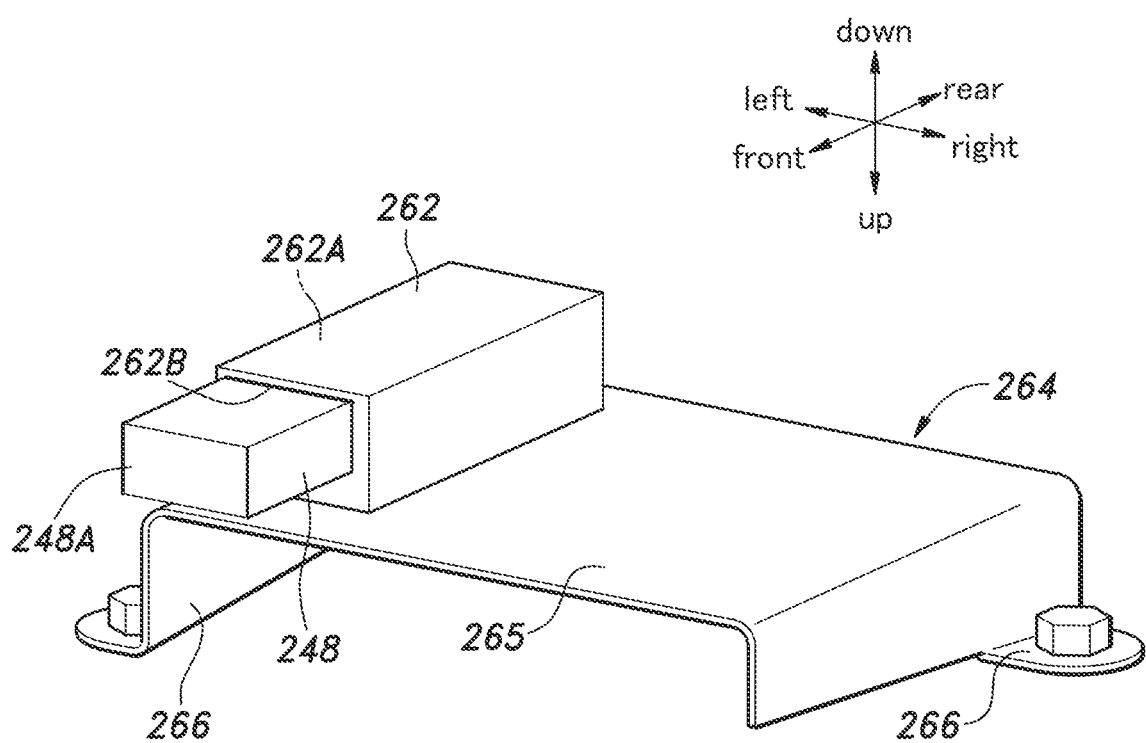
FIG. 17 is a perspective view of a bracket as viewed from below and shows an example of the arrangement of the first control device and the third control device relative to the bracket.

Also, as shown in FIG. 17, the case 262A of the third control device 262 may be preferably formed with a slot 262B which can detachably receive the first control device 248. The slot 262B is preferably provided in an interior thereof with a connector (not shown in the drawings) of the third control device 262 that can be electrically connected with a connector of the first control device 248. Thereby, by inserting the first control device 248 in the slat 262B, it is possible to have the first control device 248 be supported to the third control device 262 and to electrically connect the first control device 248 with the third control device 262.

According to the above embodiment, the seat system 201 can provide the user with a video game using the sensors 240 provided in the seat main body 205 as a game controller. The sensors 240 detect the motion of the body of the user seated on the seat main body 205 and the game is executed in response to the motion of the body of the user. Namely, the seat system 201 provides a game that the user seated on the seat main body 205 can enjoy by moving the body.

Since the sensors 240 and the first control device 248 are connected by wireless communication, the wiring structure in the seat main body 205 can be simplified. Also, assembly of the sensor 240 to the seat main body 205 can be performed easily. Since the multiple detection units 241 included in a single sensor 240 are connected to the common first communication unit 242, it is possible to reduce the number of the first communication units 242 and to simplify the configuration of the sensor 240.

Since the second control device 250 and the user interface 247 are constituted by the mobile terminal 249, it is unnecessary to secure a space for installing the second control device 250 and the user interface 247 around the seat main body 205. Also, the user can dispose the user interface 247 at any desired position.

The first control device 248 can be disposed at any position on the seat back frame 215 and the seat cushion frame 211. Particularly, by providing the second control device 250 on the lower surface of the pan frame 224, it is possible to avoid contact between the first control device 248 and the user seated on the seat main body 205 and to dispose the first control device 248 at a position where maintenance is relatively easy. Also, since the first control device 248 and the third control device 262 are arranged at close positions, maintenance can be performed easily. Further, since the bracket 264 is provided on the lower surface of the pan frame 224, the load of the user is less likely to be applied on the bracket 264. Therefore, by providing the first control device 248 and the third control device 262 on the bracket 264, it is possible to support the first control device 248 and the third control device 262 with good stability.

Fifth Embodiment

Figure 18:
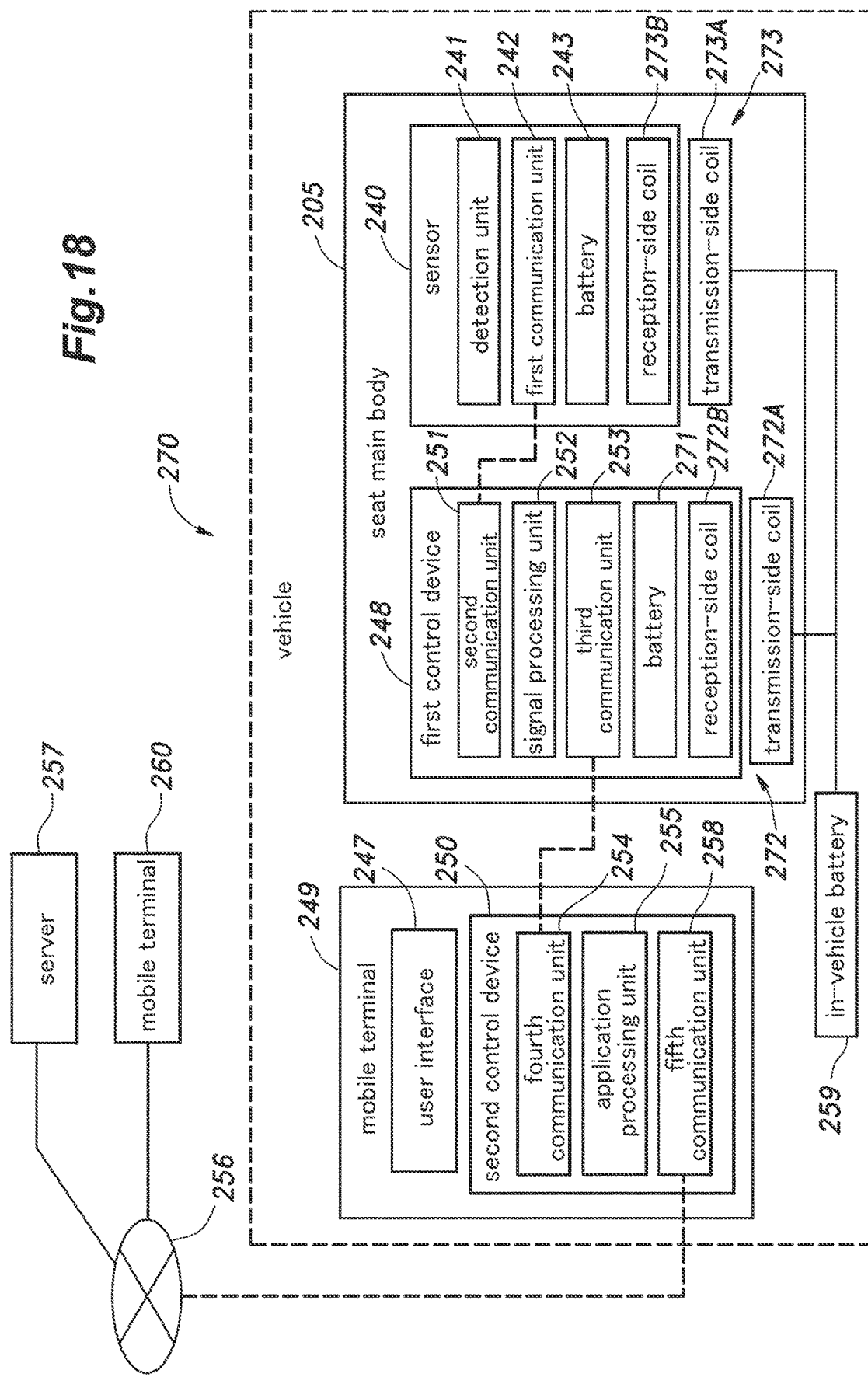
FIG. 18 is a block diagram of a seat system according to the fifth embodiment.

As shown in FIG. 18, compared with the seat system 201 according to the fourth embodiment, a seat system 270 according to the fifth embodiment differs in that the first control device 248 has a battery 271 and is not connected with the in-vehicle battery 259 via a wire harness. The battery 271 of the first control device 248 may be of a replacement or may be rechargeable. The charging of the battery may be performed by wired charging or by wireless charging. In the present embodiment, the battery 271 and the in-vehicle battery 259 are connected by a wireless power supply device 272. Also, the battery 243 of the sensor 240 and the in-vehicle battery 259 are connected with a wireless power supply device 273. For example, the wireless power supply devices 272, 273 include transmission-side coils 272A, 273A and reception-side coils 272B, 273B, respectively, and supply the electric power of the in-vehicle battery 259 to the batteries 271, 43 by electromagnetic induction.

According to the seat system 270 of the fifth embodiment, since the first control device 248 is not connected with other devices including the sensors 240 and the in-vehicle battery 259 via a wire harness, the degree of freedom of the arrangement of the first control device 248 is improved.

Sixth Embodiment

Figure 19:
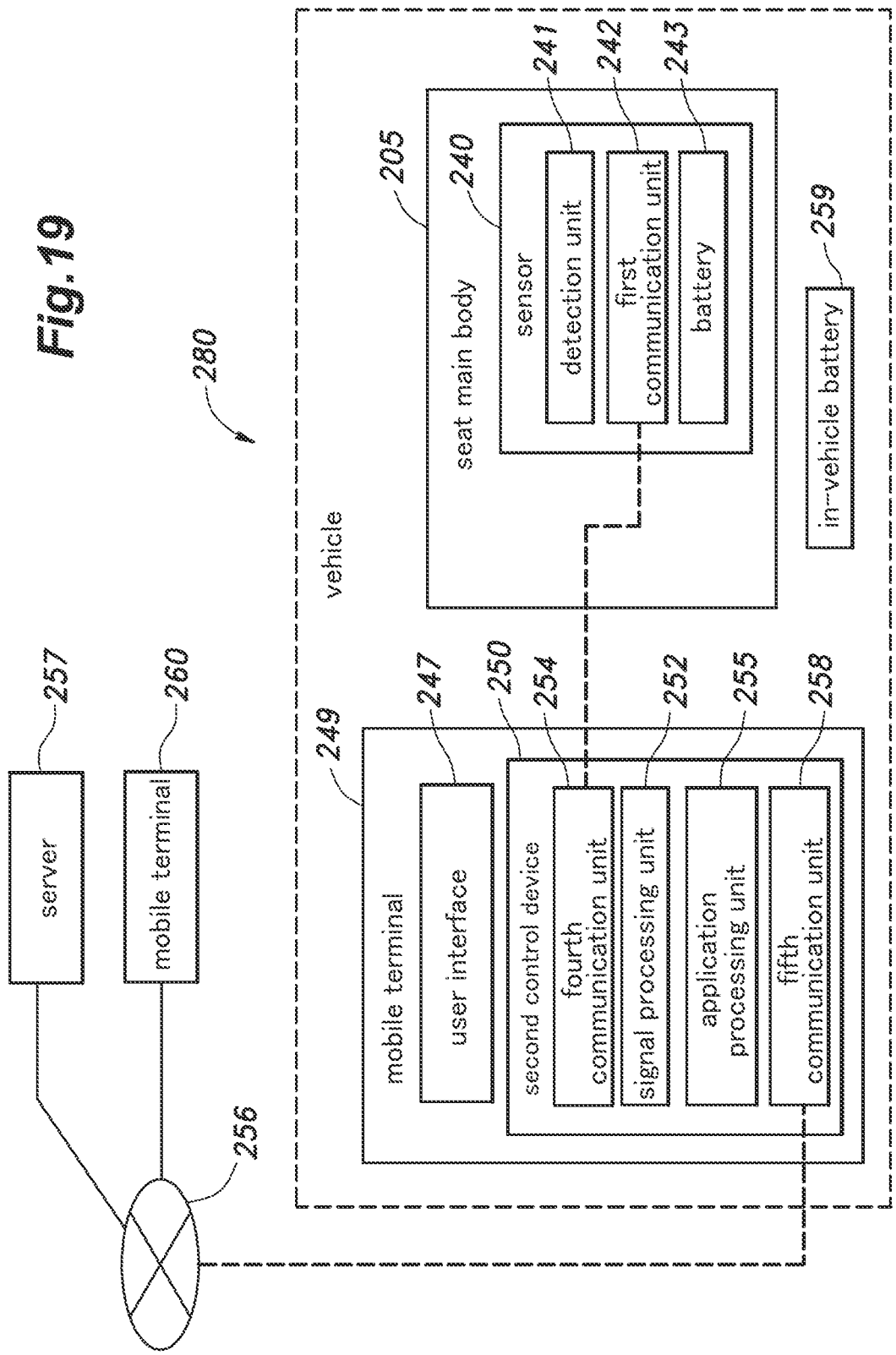
FIG. 19 is a block diagram of a seat system according to the sixth embodiment.

As shown in FIG. 19, compared with the seat system 201 according to the fourth embodiment, in a seat system 280 according to the sixth embodiment, the first control device 248 is omitted, and the sensor 240 and the second control device 250 provided in the mobile terminal 249 communicate wirelessly. The first communication unit 242 of the sensor 240 and the fourth communication unit 254 preferably perform wireless communication via known near field communication. The signal processing unit 252 that processes the signal from the sensor 240 is provided in the second control device 250.

According to the seat system 280 of the sixth embodiment, it is possible to omit the first control device 248 and to simplify the seat system 280.

Seventh Embodiment

Figure 20:
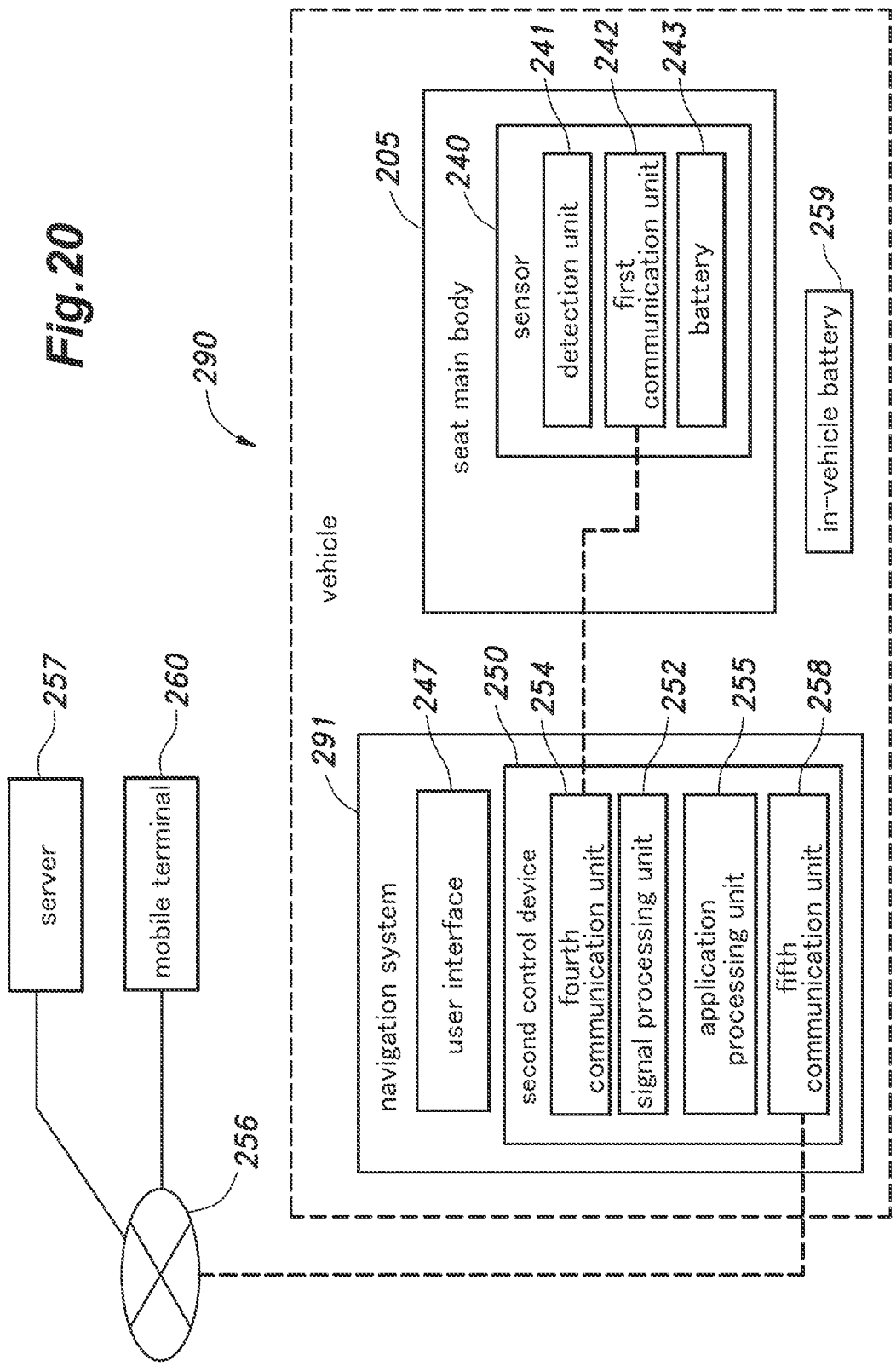
FIG. 20 is a block diagram of a seat system according to the seventh embodiment.

As shown in FIG. 20, compared with the seat system 280 according to the sixth embodiment, a seat system 290 according to the seventh embodiment includes, instead of the mobile terminal 249, a navigation system 291 having the user interface 247 and the second control device 250. Namely, the user interface 247 and the second control device 250 are configured by the navigation system 291 instead of the mobile terminal 249.

According to the seat system 290 of the seventh embodiment, it is possible to configure a game device by using the navigation system 291 provided in the vehicle and to omit the mobile terminal 249. The user interface 247 of the navigation system 291 is provided at a lateral center of the dash panel 292 constituting the front portion of the cabin 202. Therefore, the users seated on the seat main bodies 205 of the front seat and the middle seat can see the user interface 247 easily.

Eighth Embodiment

Figure 21:
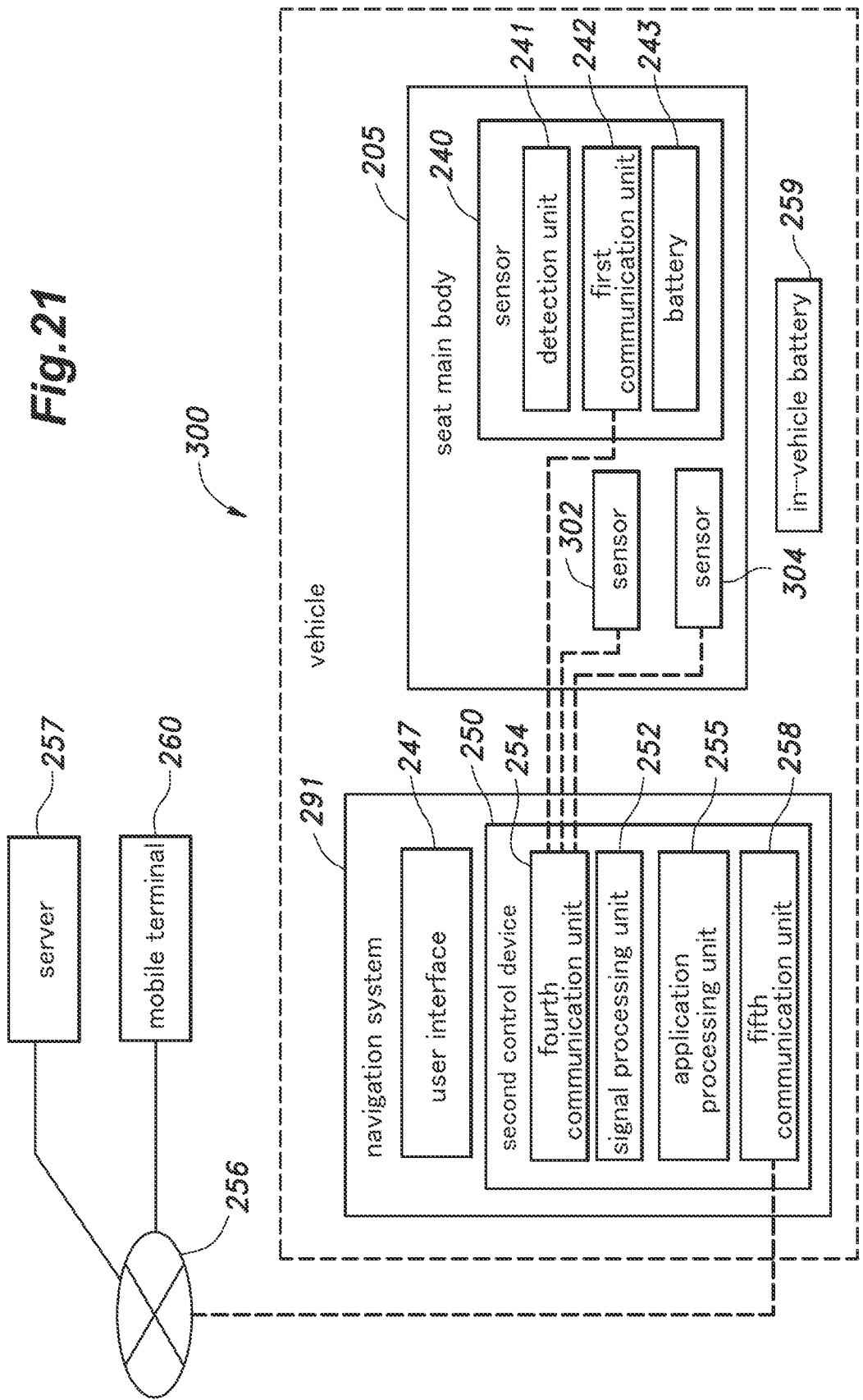
FIG. 21 is a block diagram of a seat system according to the eighth embodiment.

As shown in FIG. 21, compared with the seat system 290 according to the seventh embodiment, in a seat system 300 according to the eighth embodiment, the second control device 250 is wirelessly connected with a sensor 302 provided on a door 301 and a sensor 304 provided on a roof 303. The sensors 302, 304 each have a similar configuration to that of the sensor 240 provided in the seal main body 205, and include the detection unit 241, the first communication unit 242, and the battery 243.

According to the seat system 300 of the eighth embodiment, the user can play the game by using at least one of the sensor 240 provided in the seat main body 205, the sensor 302 provided on the door 301, and the sensor 304 provided on the roof 303. The sensor 240 may be provided to another member provided in the cabin 202 such as the floor 203, the dash panel 292, and the like, without being provided on the door 301 or the roof 303. Also, the second control device 250 may be provided in the mobile terminal 249 instead of the navigation system 291.

Ninth Embodiment

Figure 22:
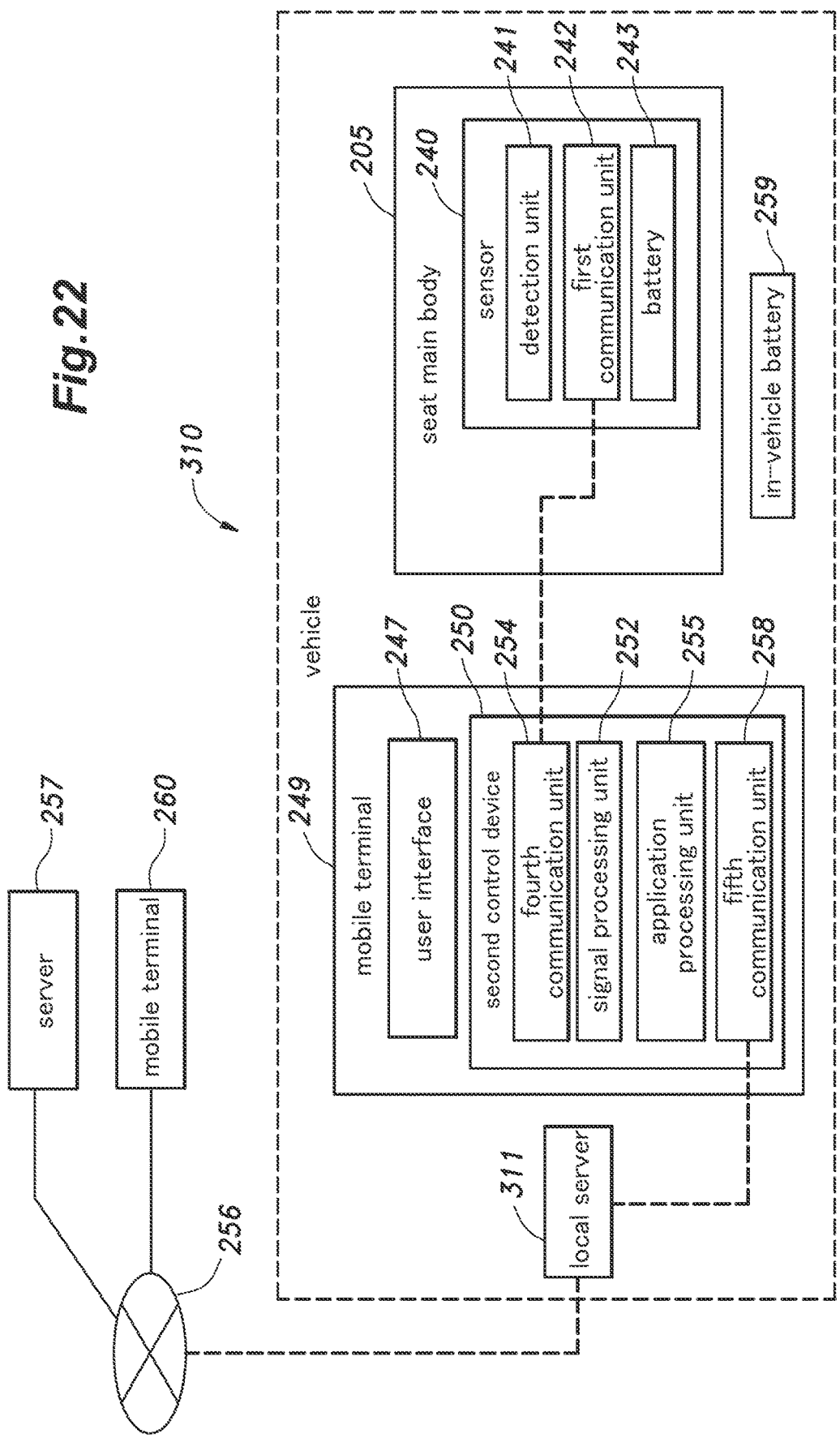
FIG. 22 is a block diagram of a seat system according to the ninth embodiment.

As shown in FIG. 22, compared with the seat system 280 according to the sixth embodiment, a seat system 310 according to the ninth embodiment differs in having a local server 311 provided in the vehicle. The mobile terminal 249 wirelessly communicates with the local server 311, and the local server 311 is connected with the base station wirelessly and with the server 257 via the interact 256. The local server 311 preferably communicates with the server 257 at every prescribed period.

Tenth Embodiment

Figure 23:
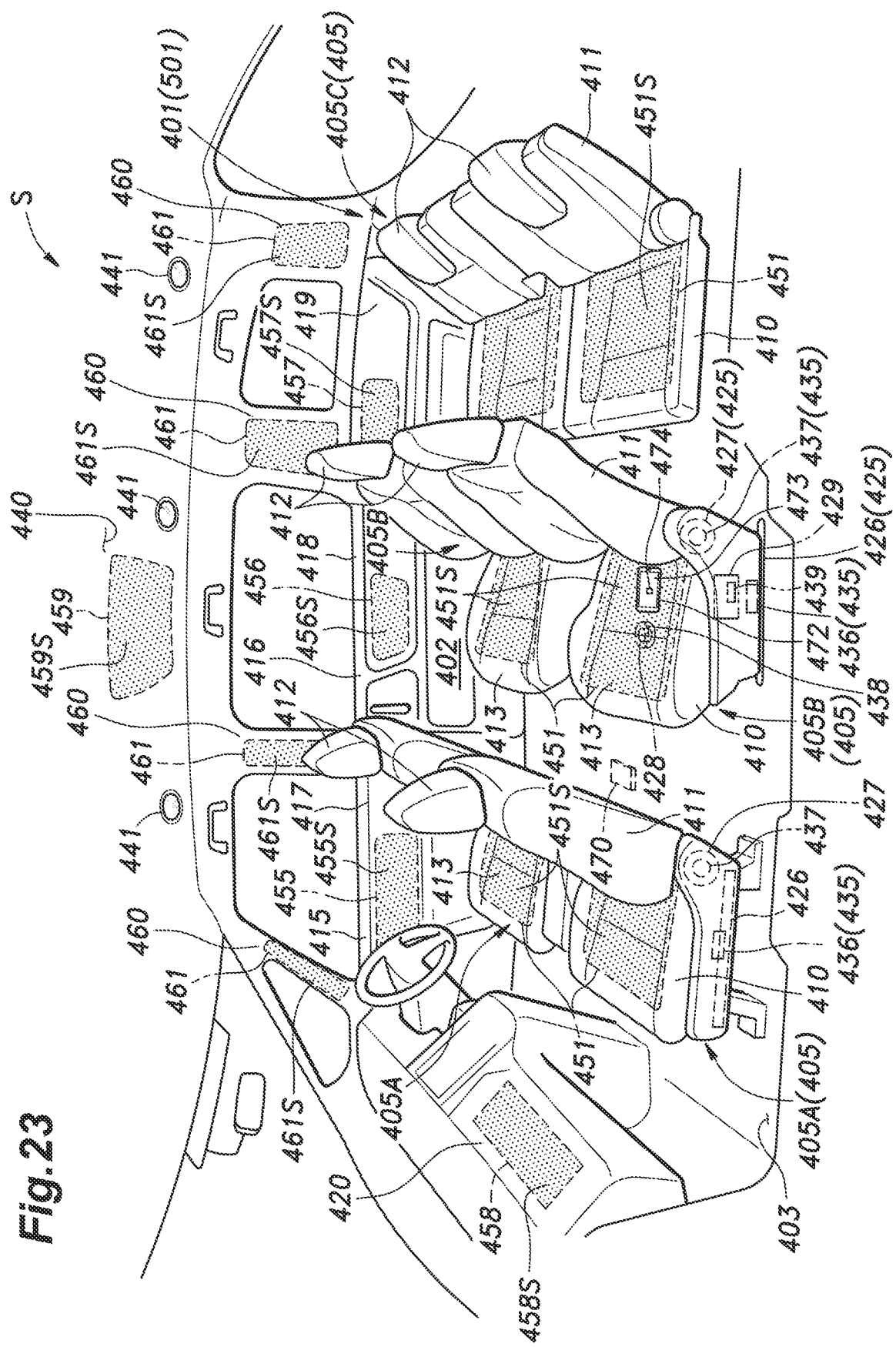
FIG. 23 is a perspective view of a cabin of a vehicle in which a seat system according to the tenth embodiment is installed.

As shown in FIG. 23, a seat system 401 includes multiple seat main bodies 405 provided in a vehicle S such as an automobile and arranged on a floor 403 defining a cabin 402. In the following, description will be made with the front-rear, left-right, and up-down directions being defined with respect to an occupant (hereinafter, the user) seated on the seat main body 405. Also, the direction toward the seat main body 405 in the lateral direction may be referred to as an inward direction and the direction away from the seat main body 405 may be referred to as an outward direction, as necessary.

In the present embodiment, the seat system 401 includes, as the seat main bodies 405, a pair of left and right front seat main bodies 405A forming the first row, a pair of left and right middle seat main bodies 405B forming the second row, and a rear seat main body 405C firming the third row. The left and right middle seat main bodies 405B are disposed behind the corresponding front seat main bodies 405A, and the front seat main bodies 405A and the middle seat main bodies 405B are arranged to be aligned in the fore and aft direction. In the present embodiment, the rear seat main body 405C is a bench seat extending laterally behind the left and right middle seat main bodies 405B to define two seating regions.

Each seat main body 405 includes a seat cushion 410 provided on the floor 403 of the cabin 402, a seat back 411 joined to a rear portion of the seat cushion 410, and a headrest 412 provided on an upper side of the seat back 411. The seat cushion 410 is a seating part that supports the buttocks and thighs of the seated user from below, and forms a seating surface 413 on the upper surface thereof. The seat back 411 is a backrest part that supports the back of the seated user from rear.

As shown in FIG. 23, the vehicle S is provided with front doors 415 on the outboard side of the front seat main bodies 405A and rear doors 416 on the outboard side of the middle seat main bodies 405B. On the inboard surfaces of the front doors 415 and the rear doors 416D, door trims 417, 418 are attached, respectively. The wall surfaces defining the cabin 402 on the outboard sides of the rear seat main body 405C are provided with rear side trims 419, respectively. Also, an instrument panel 420 is provided in front of the front seat main bodies 405A. The instrument panel 420 is positioned in front of the front seat main body 405A constituting the driver's seat and in front of the front seat main body 405A constituting the front passenger seat to be touched by both the user seated in the driver's seat and the user seated in the front passenger seat can.

Figure 24:
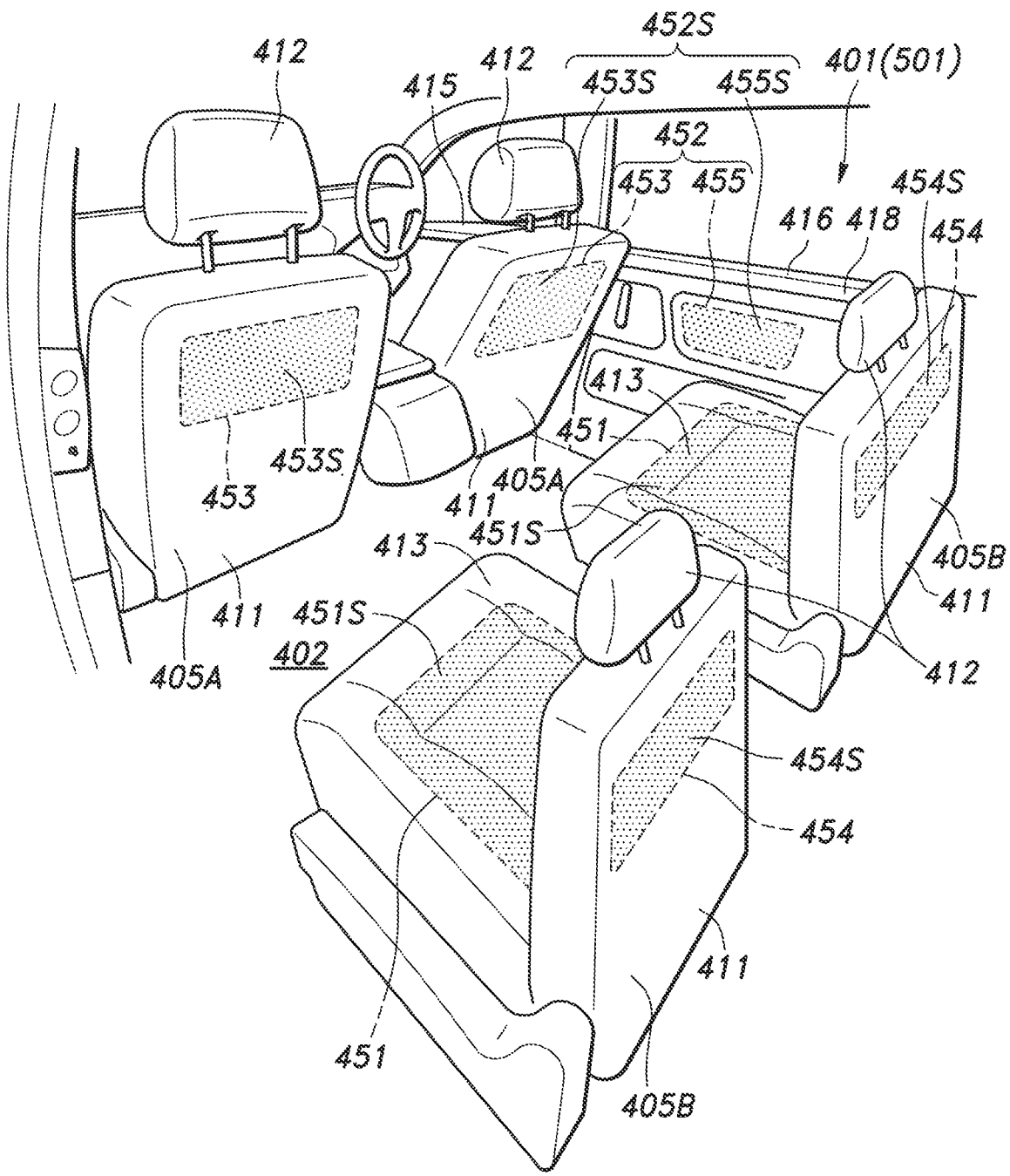
FIG. 24 is a perspective view of middle seat main bodies.

FIG. 24 exemplarily shows a perspective view of the middle seat main bodies 405B as viewed obliquely from behind, Each seat cushion 410 includes a seat cushion frame forming a skeleton, a pad supported by the seat cushion frame, and a skin member covering the outer surface of the pad. Similarly, each seat back 411 includes a seat back frame forming a skeleton, a pad supported by the seat back frame, and a skin member covering the outer surface of the pad. The seat back frame is attached to the seat cushion frame at the lower end thereof.

The pads are formed of a flexible resin material such as foamed urethane, for example. The skin members are formed of woven fabric, leather, or synthetic leather, for example.

As shown in FIG. 23, the front seat main bodies 405A and the middle seat main bodies 405B are each provided with an adjustment mechanism 425 for adjusting the position and shape thereof. The adjustment mechanism 425 includes a slide mechanism 426 provided between the seat cushion 410 and the floor 403 to make the seat cushion 410 movable in the fore and aft direction relative to the floor 403 within a prescribed range. Further, the adjustment mechanism 425 includes a reclining mechanism 427 for tilting the seat back 411 relative to the seat cushion 410 within a prescribed range. Also, the adjustment mechanism 425 may include a rotation mechanism 428 for rotating the seat cushion 410 relative to the floor 403 about a vertical axis, and may include a height adjustment mechanism 429 for moving the seat cushion 410 up and down relative to the floor 403.

Each adjustment mechanism 425 is provided with an actuator 435 for changing the position or shape of the seat main body 405. More specifically, as shown in FIG. 23, each slide mechanism 426 is provided with a forward and backward movement actuator 436 for moving the corresponding seat main body 405 in the fore and aft direction relative to the floor 403 in accordance with an input signal. Each reclining mechanism 427 is provided with a tilt actuator 437 for tilting the corresponding seat back 411 relative to the seat cushion 410 in accordance with an input signal. The rotation mechanism 428 preferably includes, as the actuator 435, a motor 438 for rotating the seat cushion 410 relative to the floor 403, and the height adjustment mechanism 429 preferably includes an up and down movement actuator 439 for moving the seat cushion 410 up and down relative to the floor 403.

The seat system 401 includes interior lights 441 provided on a roof 440 (ceiling) defining the upper surface of the cabin 402 and serving as a lighting for illuminating the interior of the cabin 402. In the present embodiment, the interior lights 441 are provided above and in front of the respective seat main bodies 405. Each interior light 441 can be turned on and off and the brightness thereof can be varied in accordance with an input signal. Namely, turn-on control, turn-off control, and dimming control of the interior lights 441 are possible.

The seat system 401 further includes first sensors 451 and second sensors 452 (see FIG. 24) for receiving input from the users who have got in the vehicle. Each first sensor 451 is provided inside one of the seat main bodies 405 to receive input from the user seated on the seat main body 405. Each first sensor 451 is a sensor provided in the seat cushion 410 of the corresponding seat main body 405 to detect seating of the user on the seating surface 413 of the seat cushion 410. Namely, each first sensor 451 is a seating sensor whose detection area 451S is the seating surface 413 of the corresponding seat main body 405. In the present embodiment, the first sensor 451 is constituted of a pressure sensor that detects a pressure on the seating surface 413 (upper surface) of the seat cushion 410. The first sensor 451 can detect a change in the pressure in accordance with raising and lowering of the knees of the user seated on the seat main body 405, Note that the first sensor 451 may be another sensor and may include multiple membrane switches that are provided in the seat cushion 410 or the seat back 411, for example, and are turned on in response to seating of the user. Also, the first sensor 451 may be a proximity sensor that is provided in the seat cushion 410 or the seat back 411 and detects proximity of the user or a touch sensor that detects contact of the user (touch) with the seat back 411. Also, the first sensor 451 may be a temperature sensor that detects a temperature change on the surface of the seat cushion 410 or the seat back 411 caused by contact of the user. Also, the first sensor 451 may be a humidity sensor that detects a humidity change on the surface of the seat cushion 410 or the seat back 411 caused by contact of the user.

The second sensors 452 are only required to be provided at positions that can be reached by the users seated on the seat main bodies 405 and may be provided on any member defining the cabin 402. Each second sensor 452 is a sensor for detecting contact of the user with a prescribed area (hereinafter, a touch area 452S) of an inboard surface of the member on which the sensor is provided. Each second sensor 452 preferably detects contact of the user based on at least one of a pressure applied on contact the touch area 452S by contact of the user, a load greater than or equal to a threshold value applied on the touch area 452S, proximity of the user to the touch area 452S, a temperature change in the touch area 452S caused by contact of the user, and a humidity change in the touch area 452S caused by contact of the user. Namely, the second sensor 452 preferably includes at least one of a pressure sensor that detects a pressure applied to the touch area 452S, a membrane switch that is turned on by a load applied to the touch area 452S, a proximity sensor that detects proximity to the touch area 452S, a temperature sensor that detect a temperature of the touch area 452S, and a humidity sensor that detects a humidity in the touch area 452S.

In the present embodiment, as shown in FIG. 24, the second sensors 452 include a sensor 453 provided inside each front seat main body 405A and having a touch area 453S formed in an upper portion of the rear surface of the seat back 411 of the front seat main body 405A. In addition, the second sensors 452 include a sensor 454 provided inside each middle seat main body 405B and having a touch area 454S formed in an upper portion of the rear surface of the seat back 411 of the middle seat main body 405B. As shown in FIG. 23, the second sensors 452 further include sensors 455, 456 having touch areas 455S, 456S provided on the inboard surfaces of the door trims 417, 418, respectively, a sensor 457 having a touch area 457S provided on the inboard surface of each rear side trim 419, and a sensor 458 having a touch area 458S on the inboard surface of the instrument panel 420. The second sensor 452 may further include a sensor 459 provided on the roof 440 (ceiling) and having a touch area 459S set on the inboard surface of the roof 440. The second sensors 452 may further include a sensor 461 provided on a pillar 460 forming a window pillar and having a touch area 461S on the inboard surface of the pillar 460. Each of the touch areas 458S, 459S, 461S is preferably provided at a position that can be contacted (touched) by the user seated on one of the seat main bodies 405.

The seat system 401 further includes a control device 470 connected with each of the first sensors 451, each of the second sensors 452, each of the forward and backward movement actuators 436, each of the tilt actuators 437, and each of the interior lights 441. The control device 470 is an electronic control unit (ECU) constituted of a microcomputer, a ROM, a RAM, a peripheral circuit, an input/output interface, a driver, etc. The control device 470 receives signals from the first sensors 451 and the second sensors 452 and transmits the signals to the forward and backward movement actuators 436, the tilt actuators 437, and the interior lights 441 to control the forward and backward movement actuators 436, the tilt actuators 437, and the interior lights 441 by making them produce appropriate output.

The seat system 401 further includes an application execution device 472 to be held by a user who has got in the vehicle. The application execution device 472 is a so-called smartphone provided with a touch panel 473, a memory, and a central processing unit (hereinafter, a processing device 474). The touch panel 473 functions as a display unit for displaying information and also functions as an input unit for receiving input by contact by the user. The processing device 474 can wirelessly communicate with the control device 470 provided in the vehicle S and acquire the detection result of the first sensors 451 and the second sensors 452. Also, the processing device 474 can control each of the forward and backward movement actuators 436, the tilt actuators 437, and the interior lights 441 by transmit prescribed signals to the control device 470.

The processing device 474 can execute a 100 m run game application which moves the character displayed on the touch panel 473 in response to the input to the sensor from the user (see FIG. 26(A) and FIG. 27(C)). In the following, a process performed in the game application executed by the processing device 474 will be described in detail with reference to FIG. 25, FIG. 26, and FIG. 27.

Figure 25:
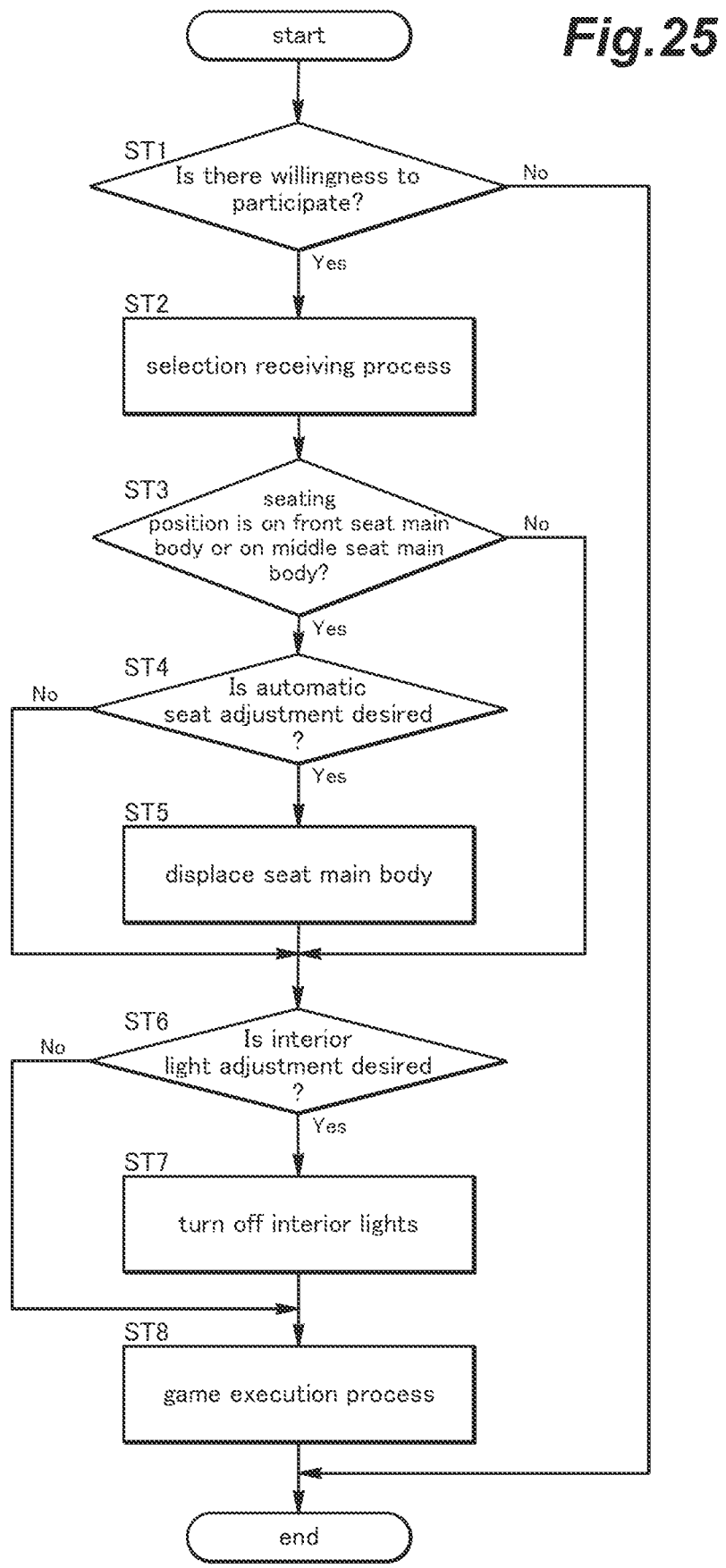
FIG. 25 is a flowchart of a process executed by a 100 m run game application.

As shown in FIG. 25, the processing device 474 first displays a participation receiving screen 480 (see FIG. 26(A)), through which the user's willingness to participate is input, on the touch panel 473 and receives input indicating the willingness to participate from the user (ST1). The participation receiving screen 480 includes a "Yes" input button corresponding to the presence of willingness to participate and a "No" input button corresponding to the absence of willingness to participate.

If the processing device 474 detects a touch on the "Yes" input button in the participation receiving screen 480, the processing device 474 executes a selection receiving process (ST2) as shown in FIG. 25, in which a sensor selection screen 481 (see FIG. 26(B)) is displayed on the touch panel 473 to have the user select a single sensor with which an operation input is to be performed (hereinafter, an operation input sensor). If the processing device 474 detects a touch on the "No" input button in the participation receiving screen 480, the processing device 474 ends the application.

In the selection receiving process, the processing device 474 first performs wireless communication with the control device 470 via Bluetooth (registered trademark) for example, thereby to acquire the position of the application execution device 472. The processing device 474 estimates the seating position of the user holding the application execution device 472 from the acquired position of the application execution device 472. Then, based on the estimated seating position of the user, the processing device 474 estimates the surface on which the user is seated, namely, the seating surface 413, and decides the first sensor 451 that detects a touch on the seating surface 413 as a first input sensor.

Further, based on the estimated seating position of the user, the processing device 474 extracts, from among the second sensors 452, a sensors) that can be reached by the seated user and is(are) provided external of the seat main body 405 on which the user is seated, and decides the extracted sensor(s) as a second input sensor(s). In the present embodiment, the processing device 474 decides, from among the second sensors 452, two second input sensors, namely, a second front input sensor and a second lateral input sensor, More specifically, the processing device 474 decides the sensor that is positioned in front of the user and can be reached by the seated user as the second front input sensor and decides the sensor positioned on the lateral side of the user and can be reached by the seated user as the second lateral input sensor.

In the present embodiment, when the seating position of the user is on the middle seat main body 405B (rear-side seat main body), the processing device 474 decides the first sensor 451 provided in the seat cushion 410 of the middle seat main body 405B as the first input sensor. Further, the processing device 474 decides the second sensor 452 provided in the upper portion of the rear surface of the seat back 411 of the front seat main body 405A (front-side seat main body) in front of the middle seat main body 405B on which the user is seated as the second front input sensor. The second front input sensor detects contact of the user with the upper portion of the rear surface of the seat back 411 of the front seat main body 405A.

When the seating position of the user is on the front seat main body 405A, the processing device 474 decides the second sensor 452 that detects contact with the instrument panel 420 as the second front input sensor. When the seating position of the user is on the rear seat main body 405C, the processing device 474 decides the second sensor 452 that is provided in the upper portion of the rear surface of the seat back 411 of the middle seat main body 405B to detect contact of the user with the upper portion of the rear surface of the seat back 411 of the middle seat main body 405B as the second front input sensor.

In the present embodiment, when the seating position of the user is on the middle seat main body 405B, the processing device 474 decides the second sensor 452 provided on the door trim 417 of the rear door 416 positioned to the side of the middle seat main body 405B as the second lateral input sensor. Similarly, when the user is seated on the front seat main body 405A, the processing device 474 decides be second sensor 452 provided on the door trim 418 of the front door 415 positioned to the side of the front seat main body 405A as the second lateral input sensor. When the user is seated on the rear seat main body 405C, the processing device 474 decides the second sensor 452 provided on the rear side trim 419 positioned to the side of the rear seat main body 405C as the second lateral input sensor.

Subsequently, the processing device 474 displays the positions of the first sensor 451, the second front sensor, and the second lateral sensor on the touch panel 473. At this time, as shown in FIG. 26(B), the processing device 474 preferably configures an image in the cabin 402 based on the seating position of the user and displays the image on the touch panel 473.

At the same time, the processing device 474 displays an "A" button corresponding to the first sensor 451, a "B" button corresponding to the second front sensor, and a "C" button corresponding to the second lateral sensor on the touch panel 473, as shown in FIG. 26(B). Thereafter, the processing device 474 detects a touch on each button in the touch panel 473 thereby to receive the user's selection. When the processing device 474 detects a touch on the "A" button, the "B" button, or the "C" button in the sensor selection screen 481, the processing device 474 stores the user's selection result in the memory as an ID of the operation input sensor and completes the selection receiving process. At this time, in the present embodiment, the processing device 474 stores the ID (for example, "A," "B," "C," or the like) indicating the button on which the touch was detected in the memory as the ID of the operation input sensor.

When the selection receiving process is completed, the processing device 474 determines whether or not the seating position of the user is on the front seat main body 405A or on the middle seat main body 405B (ST3), When the seating position is on the front seat main body 405A or on the middle seat main body 405B, reception of automatic adjustment of the seat main body 405 is performed (ST4), and when the seating position is in the rear seat main body 405C, reception of automatic adjustment of the interior lights 441 is performed without performing the reception of automatic adjustment of the seat main body 405.

As shown in FIG. 25, when performing the reception of automatic adjustment of the seat main body 405, the processing device 474 displays a seat adjustment reception screen 482 (see FIG. 26(C)) on the touch panel 473 to receive input indicating the user's willingness for execution of a seat adjustment process (ST4). In the seat adjustment reception screen 482, a "Yes" input button corresponding to the presence of willingness for execution of the automatic adjustment of the seat main body 405 and a "No" input button corresponding to the absence of such willingness are displayed.

When a touch on the "Yes" button is detected in the seat adjustment reception screen 482, the processing device 474 performs the seat adjustment process in which the actuator 435 of the adjustment mechanism 425 is driven to displace the seat main body 405 on which the user is seated such that it is comfortable for the user to play the game (ST5). Note that "displacement" here includes parallel movement, rotation, and deformation of the seat main body 405, and at least includes forward and backward movement of the seat cushion 410 relative to the floor 403 and tilting of the seat back 411 relative to the seat cushion 410. In the present embodiment, when a touch on the "Yes" button is detected in the seat adjustment reception screen 482, the processing device 474 drives the forward and backward movement actuator 436 via the control device 470 to move the seat main body 405 on which the user is seated as rearward as possible. Further, the processing device 474 drives the tilt actuator 437 via the control device 470 to tilt the seat back 411 of the seat main body 405 on which the user is seated as forward as possible relative to the seat cushion 410 of the seat main body 405 on which the user is seated. Thereby, the seat back 411 assumes an upright posture.

In the case where the adjustment mechanism 425 includes the rotation mechanism 428, the processing device 474 may rotate the seat main body 405 in the seat adjustment process to displace (move) the seat main body 405 to the position where the user is comfortable to play the game. Specifically, the processing device 474 preferably rotates the seat main body 405 to face forward in the seat adjustment process. Thereby, it is possible to provide the user with an environment in which the user can enjoy the game more.

As shown in FIG. 25, when the displacement of the seat main body 405 is completed, the processing device 474 displays an interior light adjustment reception screen 483 (see FIG. 27(A)) for receiving automatic adjustment of the interior lights 441 thereby to receive input indicating the user's willingness for execution of the interior light automatic adjustment (ST6).

When a touch on the "Yes" button is detected in the interior light adjustment reception screen 483, the processing device 474 turns off the interior lights 441 (ST7). As shown in FIG. 25, when the interior lights 441 are turned off, the processing device 474 displays a game execution screen 484 (see FIG. 27(B)) on the touch panel 473. When a touch on the "No" button is detected in the interior light adjustment reception screen 483, the processing device 474 displays the game execution screen 484 on the touch panel 473 without switching the interior lights 441 on or off.

After displaying the game execution screen 484, the processing device 474 refers to the memory to acquire the ID of the operation input sensor selected by the user. Thereafter, the processing device 474 performs an execution process to execute a 100 m run application in which the character displayed on the touch panel 473 is moved toward the goal based on the signal detected by the operation input sensor selected by the user (ST8). More specifically, when the ID corresponding to the A button is stored in the memory as the ID of the operation input sensor, the processing device 474 acquires the signal detected by the first input sensor via the control device 470. Thereafter, the processing device 474 moves the character displayed on the touch panel 473 based on the signal detected by the first input sensor. In the present embodiment, the processing device 474 is preferably configured to move the character forward in response to raising and lowering of the knees of the user seated on the seat main body 405 detected by the first input sensor.

When the ID corresponding to the B button is stored in the memory as the ID of the operation input sensor, the processing device 474 moves the character based on the signal detected by the second front input sensor. More specifically, the control device 470 preferably moves the character forward in response to contact (touch) of the user detected by the second front sensor.

When the ID corresponding to the C button is stored in the memory as the ID of the operation input sensor, the processing device 474 moves the character based on the signal detected by the second lateral sensor. More specifically, the control device 470 preferably moves the character forward in response to contact (touch) of the user detected by the second lateral input sensor.

Note that preferably, the processing device 474 changes the movement amount of the character depending on the amplitude of the signal detected by the operation input sensor. Once the character reaches the goal, the processing device 474 displays a result display screen 485 (see FIG. 27(C)) which includes the time required until reaching the goal, consumed calories, etc., on the touch panel 473 and thereafter ends the application.

Next, an operation of the seat system 401 configured as above will be described. For example, when the user seated on the middle seat main body 405B starts a 100 m run game application, the participation receiving screen 480 is displayed on the touch panel 473 of the application execution device 472. When the user touches the "Yes" button, the sensor selection screen 481 is displayed. At this time, the processing device 474 selects, from among the first sensors 451, the sensor that detects contact with the seating surface 413 on which the user is seated, and sets the selected sensor as the first input sensor. Also, the processing device 474 sets, from among the second sensors 452, the sensor that is provided on the rear surface of the seat back 411 of the front seat main body 405A and detects contact of the user with the rear surface as the second front input sensor. Further, the processing device 474 sets the sensor that is provided on the door trim 418 of the rear door 416 positioned to the side of the middle seat main body 405B and detects contact of the user with the inboard surface thereof as the second lateral input sensor. Thereafter, the processing device 474 displays the positions of the first input sensor, the second front input sensor, and the second lateral input sensor and the buttons corresponding to the respective sensors in the sensor selection screen 481 on the touch panel 473. Thereby, the user can select the operation input sensor from among the first input sensor, the second front input sensor, and the second lateral input sensor.

Thereafter, when the user selects the sensor by touching the button displayed on the sensor selection screen 481, the processing device 474 displays the seat adjustment reception screen 482 on the touch panel 473. When the user touches the "Yes" button displayed in the seat adjustment reception screen 482, the middle seat main body 405B is moved as rearward as possible. Thereby, the distance between the front seat main body 405A and the middle seat main body 405B becomes large, and the middle seat main body 405B on which the user is seated is disposed at a position where the seated user can move the legs up and down easily. At the same time, the seat back 411 of the middle seat main body 405B on which the user is seated is moved to be upright relative to the seat cushion 410 so that the middle seat main body 405B is in a shape in which the seated user can move the lets up and down easily. Thereby, the application execution device 472 can adjust the seat main body 405 to be in the position and shape in which the user in the vehicle can enjoy the game more. Namely, the position and shape of the seat main body 405 are adjusted to be suitable for use of the application, whereby it is possible to provide the user with an environment in which the user can enjoy the game more.

Subsequently, the processing device 474 displays the interior light adjustment reception screen 483 on the touch panel 473 of the application execution device 472. When the user touches the "Yes" button in the interior light adjustment reception screen 483, the interior light 441 is turned off. This allows the user to recognize the screen display on the touch panel 473 easily. Thereby, an environment in which it is possible to enjoy the game more is provided to the user.

Thereafter, the processing device 474 displays the game execution screen 484 on the touch panel 473. The user moves the character by inputting to the operation input sensor selected by the user. Namely, the operation input sensor selected from among the first sensors 451 and the second sensors 452 configures the application controller of the application execution device 472. When the character reaches the goal, the processing device 474 ends the 100 m run game application.

Next, the effect of the seat system 401 configured as above will be discussed. In the sensor selection screen 481, the user can select, from among the first input sensor, the second front input sensor, and the second lateral input sensor, an operation input sensor through which input for operating the character is made. Thereby, compared with a case where only the first sensors 451 are provided in the cabin 402, it is possible to increase the number of sensors through which the user can make input. Therefore, for example, a user with a disabled leg can select the second front sensor or the second lateral sensor and enjoy the game. Namely, the seat system 401 can provide an operation input method usable by more users. Also, it is possible to increase the number of operation means for the game application executed by the application execution device 472. Thereby, more users can enjoy the game application, and it is possible to provide a wider variety of applications to the users.

The sensor provided in the seat cushion 410 of the seat main body 405 on which the user is seated is set as the first input sensor. Thereby, the first sensor 451 can be provided at a position where the user can easily make input. The user can operate the game application while being seated on the seat main body 405, and the operation of the game application is easy.

The sensor provided in the instrument panel 420 or the rear surface of the seat back 411 positioned in front of the seat main body 405 on which the user is seated is set as the second front input sensor. Thereby, a sensor provided at a position where the user can easily make input can be set as the second front input sensor.

The sensor provided on the door trim 417, 418 or the rear side trim 419 positioned to the side of the seat main body 405 on which the user is seated is set as the second lateral input sensor. Thereby, a sensor provided at a position where the user can easily make input can be set as the second lateral input sensor.

In the above embodiment, the game application includes a selection process for having the user selects at least one sensor from among the first sensor 451, the second front sensor, and the second lateral sensor and an execution process for moving the character based on the signal from the selected sensor. Thereby, even if the user inadvertently touches a sensor other than the selected sensor, the character does not move, and malfunction due to input to a sensor other than the selected sensor can be prevented. Also, since the user can select the sensor used for operating the game application, namely, the operation input sensor, from among the first input sensor and the second input sensors, the user can select a sensor appropriate for the operation of the game application.

Eleventh Embodiment

A seat system 501 according to the eleventh embodiment differs from the tenth embodiment with respect to the configuration of the application execution device 472 and the details of the selection receiving process, the seat adjustment process, and the execution process included in the 100 m run game application, and is the same as the tenth embodiment with respect to the other configuration, and therefore, description of the configuration will be omitted.

Figure 28:
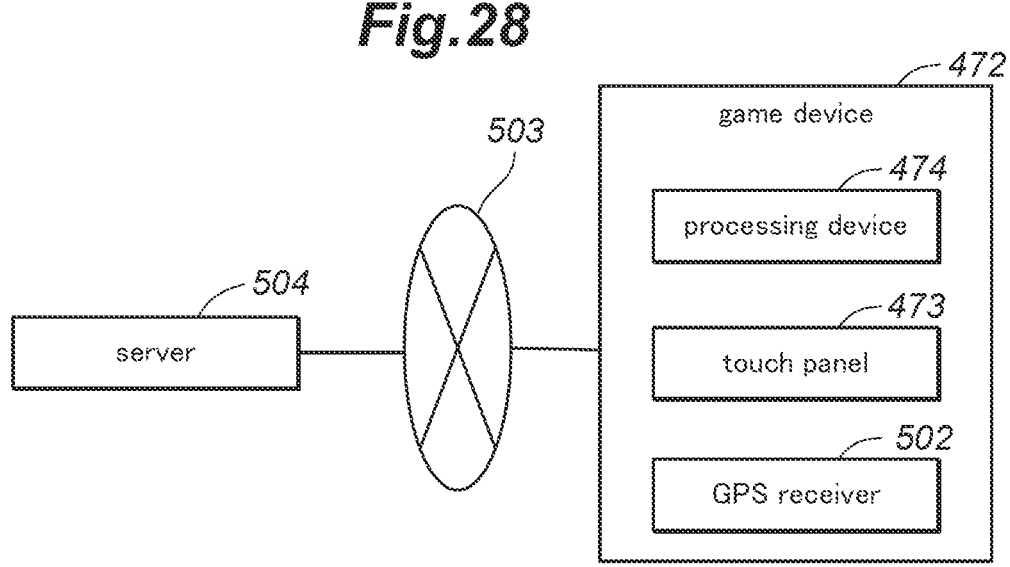
FIG. 28 is a network configuration diagram of a seat system according to the eleventh embodiment including an application execution device.

As shown in FIG. 28, the application execution device 472 according to the present embodiment is provided with a GPS receiver 502, and the processing device 474 of the application execution device 472 can be connected with a server 504 that holds weather information via a network 503 such as the internet by means of public line communication.

In the selection receiving process, the processing device 474 receives a signal from an artificial satellite via the GPS receiver 502 and acquires the position of the application execution device 472. Then, the processing device 474 connects with the server 504 holding the weather information via the network 503. Thereafter, the processing device 474 acquires the outside temperature predicted at the position of the application execution device 472 from the server 504. When the predicted outside temperature is higher than or equal to a prescribed threshold value, the processing device 474 selects the first sensor 451 and stores the ID of the first sensor 451, which is a selection result, in the memory. At this time, preferably, the processing device 474 displays a screen on the touch panel 473 to notify the user that the processing device 474 has selected the operation input sensor because the outside temperature is higher than or equal to the threshold value. When the predicted outside temperature is lower than the prescribed threshold value, the processing device 474 displays the positions of the first input sensor, the second front input sensor, and the second lateral input sensor and the "A" to "C" buttons on the touch panel 473, as in the tenth embodiment. Thereafter, the processing device 474 detects a touch on each button on the touch panel 473 thereby to receive selection of the operation input sensor by the user, and stores the ID of the operation input sensor in the memory.

In the seat adjustment process, the processing device 474 controls the operation amount of the adjustment mechanism 425 based on the information from the server 504. More specifically, when the outside temperature is higher than or equal to the threshold value in the seat adjustment process, the processing device 474 controls the operation amount of the tilt actuator 437 such that the seat back 411 is brought in a position inclined slightly rearward relative to the seat cushion 410 compared with a case where the outside temperature is lower than the threshold value, thereby to deform the seat main body 405.

When the outside temperature is higher than or equal to the threshold value in the execution process, the processing device 474 moves the character faster for the input to the first input sensor compared with the case where the outside temperature is lower than the threshold value. Namely, when the outside temperature is higher than or equal to the threshold value in the execution process, the processing device 474 increases the character's movement speed for the input to the first input sensor.

The operation and effect of the seat system 501 according to the eleventh embodiment will now be discussed. In the selection receiving process, when it is predicted that the outside temperature is higher than or equal to the threshold value, for example, on a summer day or the like, the first sensor 451 is selected as the operation input sensor by the processing device 474. Thereby, compared with a case where the user performs input to the second front sensor or the second lateral sensor, it is possible to reduce the amount of motion performed by the user during the game. Thereby, in the case where the predicted outside temperature is higher than or equal to the threshold value, for example, on a summer day or the like, it is possible to prevent the user from excessively consuming the physical strength due to playing of the game. On the other hand, when the outside temperature is lower than the threshold value, the user him-herself selects the operation input sensor from among the first input sensor, the second front input sensor, and the second lateral input sensor.

In this way, in the seat system 501 according to the eleventh embodiment, the operation input sensor is selected based on the outside temperature, which is information regarding the environment around the user held in the server 504. Namely, in the seat system 501, a sensor appropriate for the environment around the user is selected as the operation input sensor, and the user can operate the game application by making input to the operation input sensor. Thereby, usability of the seat system 501 is improved.

Further, in the present embodiment, when the outside temperature is higher than or equal to the threshold value, the movement speed of the character for the input to the first input sensor is increased. Thereby, it is possible to reduce the amount of motion performed by the user during the game and to provide a more suitable environment to the user.

When the outside temperature is higher than or equal to the threshold value, the seat back 411 is brought in a position inclined slightly rearward relative to the seat cushion 410. Thereby, when the outside temperature is higher than or equal to the threshold value, a space is more easily created between the back of the user and the seat back 411. Thereby, the user can enjoy the game in a cooler environment and the seat main body 405 is brought into a shape more suitable to the user. Namely, since the processing device 474 can control the tilt actuator 437 based on the information from the server 504 according to the user's situation, an environment in which it is possible to enjoy the game more can be provided to the user.

Twelfth Embodiment

Compared with the seat system 401 according to the tenth embodiment, a seat system 601 according to the twelfth embodiment differs in including speakers 602. Also, in the twelfth embodiment, the content of the game executed by the application execution device 472 differs from that in the tenth embodiment, and the participation receiving screen 480, the selection receiving process, and the execution process differ. The other configuration of the twelfth embodiment is the same as the tenth embodiment, and therefore, explanation thereof will be omitted.

Figure 29:
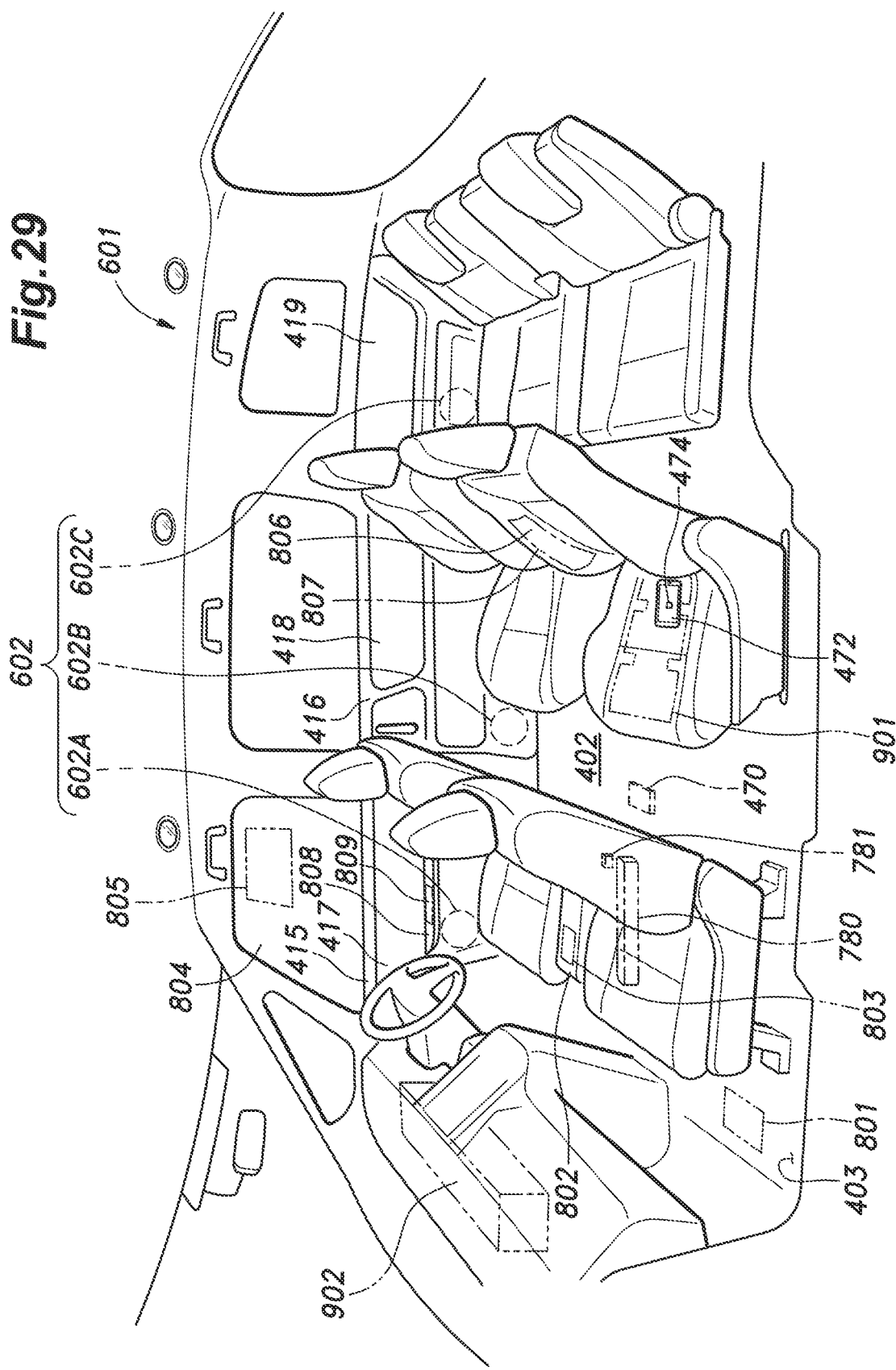
FIG. 29 is a perspective view of a cabin of a vehicle in which a seat system according to the twelfth embodiment is installed.

As shown in FIG. 29, the seat system 601 includes speakers 602A provided in the door trims 417 of the left and right front doors 415, speakers 602B provided in the door trims 418 of the left and right rear doors 416, and speakers 602C provided in the left and right rear side trims 419. The speakers 602A, 602B, 602C are each mounted on the inboard side surface of the corresponding door trim 417, 418 or rear side trim 419 and are each connected with the control device 470 via a predetermined signal line. Each speaker venerates sound toward the interior of the cabin 402 based on the signal from the control device 470. Namely, the control device 470 can control the sound output from each speaker 602A, 602B, 602C. The control device 470 receives the signal from the processing device 474 of the application execution device 472 and outputs the signal to each speaker.

Figure 30:
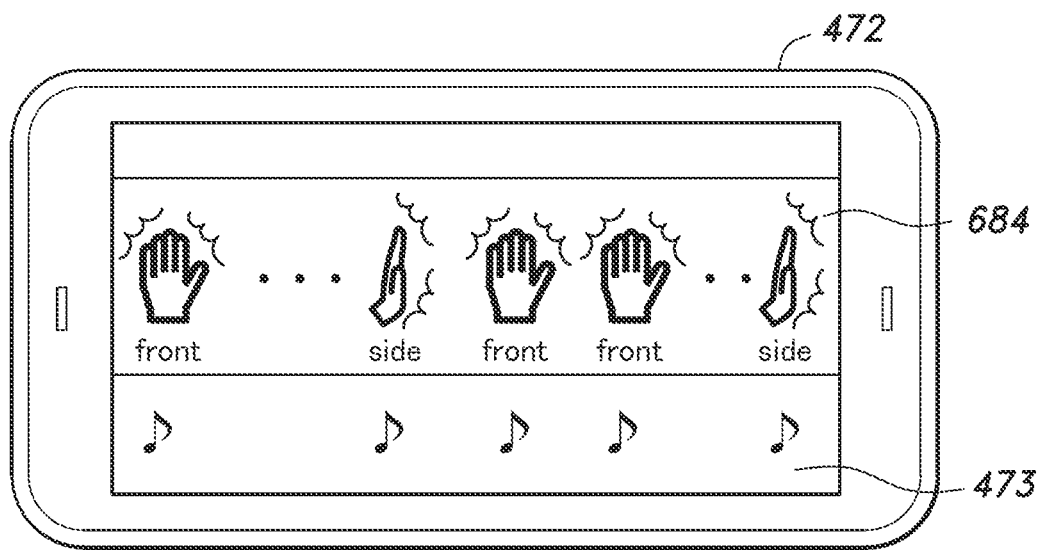
FIG. 30 is an explanatory diagram for explaining a game execution screen of a game according to the twelfth embodiment.

The game application executed by the application execution device 472 requires the user to make input to the sensor to the music, as shown in a game execution screen 684 (see FIG. 30).

In the selection receiving process, the processing device 474 displays the first input sensor, the second front input sensor, and the second lateral input sensor in the sensor selection screen 481 as in the tenth embodiment, and receives input indicating two operation input sensors from the user. The processing device 474 stores the IDs of the two operation input sensors in the memory.

In the execution process, the processing device 474 first acquires the seating position of the user holding the application execution device 472 and extracts the speaker 602 closest to the seating position as an output speaker. Thereafter, the processing device 474 causes the output speaker to output predetermined music. At this time, the processing device 474 displays the game execution screen 684 (see FIG. 30) corresponding to the music and simultaneously acquires the signals from the two operation input sensors via the control device 470. At this time, the processing device 474 preferably displays input instructions to the user for the respective operation input sensors on the game execution screen 684. Further, the processing device 474 preferably calculates a matching degree of the timing of input by the user to each of the operation input sensors with the music based on the signals from the two operation input sensors and displays the result on the screen.

The effect of the seat system 601 according to the twelfth embodiment will now be discussed. Since the seat system 601 according to the twelfth embodiment includes the speakers 602, it is possible to configure a game application in which input should be made to the operation input sensor to the music. Also, the application execution device 472 can make the speakers 602 generate sound appropriate for execution of the game via the control device 470. Thereby, the application execution device 472 can provide the user with an environment which provides a higher sense of reality so that the game can be enjoyed more, Namely, the application execution device 472 can provide the user with an environment suitable for use of the application execution device 472.

The processing device 474 performs the execution process based on the signals from the two operation input sensors. Thereby, the game application executed by the application execution device 472 can be operated based on the signals from the multiple operation input sensors. This makes it possible to increase the variation of game applications that can be provided to the user.

Concrete embodiments of the present invention have been described in the foregoing, but the present invention is not limited to the above embodiments and may be modified or altered in various ways. In the above embodiments, description was made of an example in which the seat system was applied to an automobile, but the seat system may be applied to a seat of a vehicle other than an automobile or a seat provided in a building such as a theater, a housing, or the like.

The signal processing unit 56 may determine whether a child seat or a booster seat is installed on the seat main body 5 based on the signal from the sensor 40, and if a child seat or a booster seat is installed, make the output from the signal processing unit 56 to the application processing unit 57 zero (0). When the sensor 40 includes a load sensor (pressure sensor), the signal processing unit 56 preferably detects whether a child seat or a booster seat is placed on the seat main body 5 based on a load distribution detected by the sensor 40. For example, it is preferably determined that a child seat or a booster seat is placed on the seat cushion 7 of the seat main body 5 when the load distribution detected by the sensor 40 matches a pattern set beforehand.

Also, the child seat or the booster seat installed on the seat main body 5 may have a sensor that can transmit a signal to the control device 46 via wireless communication. The sensor of the child seat and the booster seat may be similar to the sensor 40 applied to the seat main body 5. By making the output based on the signal from the sensor 40 of the seat main body 5 zero when the signal processing unit 56 detects that the child seat or the booster seat is placed on the seat main body 5, it is possible to output a signal from the sensor provided in the child seat or the booster seat to the application processing unit 57. Thereby, the user seated on the child seat or the booster seat can play the game.

In the above embodiments, description was made of an example in which the seat system was applied to an automobile, but the seat system may be applied to a seat of a vehicle other than an automobile or a seat provided in a building such as a theater, a housing, or the like. Also, in the above embodiments, description was made of an example in which the pan frame 224 was adopted in the seat cushion frame 211 as a pressure receiving member that can support the seated person, but the pan frame 224 may be replaced with another pressure receiving member. The pressure receiving member is a member coupling the front member 222 and the rear member 223 and may be, for example, multiple S-springs, a member formed of multiple wires connected by resin, or the like. The second control device 250 and the third control device 262 may be supported by the pressure receiving member which consists of S-springs or the like.

In the tenth embodiment and the eleventh embodiment, an example in which the 100 m run game application was executed by the single application execution device 472 was described, but the present invention is not limited to this aspect. For example, configuration may be made such that multiple application execution devices 472 are capable of wireless communication and the 100 m run game application can be simultaneously executed by the multiple application execution devices 472.

Figure 31:
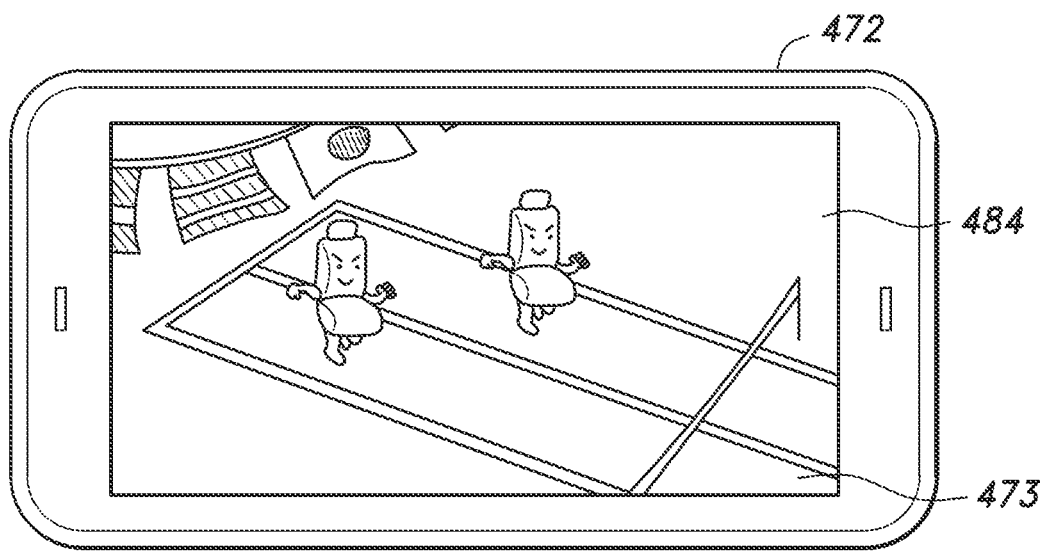

More specifically, the 100 m run game may be configured such that when two users are seated on the middle seat main bodies 405B, the two users can simultaneously enjoy the 100 m run game. In this case, it is preferred to configure such that when the game application is started by one application execution device 472, the application execution device 472 makes notification to another application execution device 472 present in the vehicle. Also, as shown in FIG. 31, the application execution device 472 may be preferably configured to display the characters corresponding to the respective users in the touch panel 473 and to move each character forward in response to the input to the corresponding operation input sensor. Thereby, since each user can select an operation input sensor suitable to the user, multiple users including a physically handicapped user for whom input to the seating sensor is difficult can simultaneously enjoy the game.

In the above embodiments, description was made of the seat systems 401, 501, 601 installed in the vehicle S, but the present invention is not limited to this aspect. For example, as shown in FIG. 32, a seat system 701 may be provided in a room 702 in which a seat main body 705 (chair) on which a person can be seated and a desk 706 are disposed. The desk 706 is provided with a computer serving as the application execution device 472, and a monitor 773 is disposed on the desk 706. The seat main body 705 preferably includes a support base 709 provided on a floor 703 defining a lower surface of the room 702, a seat cushion 710 (seating part) supported by the support base 709 and forming a seating surface 713, and a seat back 711 (backrest part) forming a backrest. The support base 709 is provided with an adjustment mechanism 725 for moving the support base 709 back and forth and left and right relative to the floor 703 and rotating the support base 709 about a vertical axis, and a control device 770 that controls the driving of the adjustment mechanism 725. The adjustment mechanism 725 includes multiple wheels 725A and a motor 725B for controlling the driving of each of the wheels 725A. When a game application is executed, an application execution device 772 wirelessly communicates with the control device 770 thereby to acquire the position of the seat main body 705. Thereafter, the application execution device 772 preferably activates the adjustment mechanism 725 via the control device 770 to move the seat main body 705 back and forth and left and right and to rotate the seat main body 705 about the vertical axis so that the seat main body 705 is moved to a position suitable for playing the game.

Also preferably, a first sensor 751 for detecting contact of the user with the seating surface 713 is provided in the interior of the seat main body 705, more specifically, in the interior of the seat cushion 710, and a second sensor 752 for detecting contact of the user is provided on the desk 706. The application execution device 772 preferably executes the game application in response to an operation input to the first sensor 751 and the second sensor 752 from the user seated on the seat main body 705.

Further, the seat system 401 may include a seat main body 405 and an air cell adjustment mechanism provided with an air cell for changing the shape of the seal main body 405 and an air supply and discharge device for supplying and discharging air to and from the interior of the air cell, and the air cell adjustment mechanism may be configured to be actuated by the control device 470. Preferably, the processing device 474 activates the air cell adjustment mechanism via the control device 470 in the seat adjustment process to deform the seat main body 405. More specifically, it is preferred if the processing device 474 drives the air supply and discharge device to discharge the air inside the air cell in the seat adjustment process. Thereby, the user can move easily when the game application is executed, and an environment in which the user can enjoy the game can be provided to the user.

The seat system 401 may include a seat main body 405 provided with a middle-folding mechanism for rotating the upper portion of the seat back 411 relative to the lower portion about an axis extending in the lateral direction, and the middle-folding mechanism may be configured to be activated by the control device 470. The processing device 474 preferably activates the middle-folding mechanism via the control device 470 in the seat adjustment process to deform the seat main body 405 into a shape suitable for playing the game.

Also, when the seat system 401 may include a seat main body 405 having an armrest 780 (see FIG. 29) displaceably supported on the seat back 411 and an armrest adjustment mechanism 781 for displacing the armrest 780 relative to the seat back 411, and the armrest adjustment mechanism 781 may be configured to be activated by the control device 470. The processing device 474 preferably activates the armrest adjustment mechanism 781 via the control device 470 in the seat adjustment process to displace the armrest 780.

In the above embodiments, the application execution device 472 was configured to activate the adjustment mechanism 425 before the execution process, but it is not limited to this aspect. For example, the application execution device 472 may be configured to activate the adjustment mechanism 425 according to the development of the game. Also, the application execution device 472 may be configured to vary the brightness of the interior light 441 according to the development of the game.

In the above embodiments, the application execution device 472 was a smartphone but it is not limited to this aspect. The application execution device 472 may be constituted of a tablet, a slate PC, or a car navigation system.

Also, as shown in FIG. 29, the second sensors 452 may include a sensor 801 provided on the floor 403 defining the lower surface of the cabin 402 to detect contact (touch) of the user with the floor 403. Also, the second sensors 452 may include a sensor 803 provided on a center console 802 to detect contact (touch) of the user with the center console 802. Further, the second sensors 452 may include a sensor 805 provided on a window 804 to detect contact (touch) therewith. Also, the first sensors 451 may include a sensor 807 provided inside the seat back 411 to detect contact of the user with a front surface of a bolster part 806 provided on each of the left and right side parts of the seat back 411 to protrude forward. When armrests 808 are provided on the door trims 417, 418 or the seat main bodies 405, the first sensors 451 and the second sensors 452 may include sensors 809 for detecting contact (touch) with the respective armrests 808.

In the above-described eleventh embodiment, the processing device 474 was configured to acquire the predicted temperature from the server 504, but it is not limited to this aspect. For example, the processing device 474 may be configured to acquire the predicted weather, humidity, or amount of precipitation from the server 504 and to control the operation amount of the adjustment mechanism 425 based on the acquired information.

In the above-described twelfth embodiment, the application execution devices 472, 772 executed the game application based on the signals from the two operation input sensors but they are not limited to this aspect. The application execution devices 472, 772 may execute the game application based on the signals from three or more sensors included in the first sensors 451, 751 or the second sensors 452, 752.

In the above embodiments, the adjustment mechanism 425 included the slide mechanism 426, the reclining mechanism 427, the rotation mechanism 428 for rotating the seat cushion 410 relative to the floor 403 about the vertical axis, and the height adjustment mechanism 429, but the adjustment mechanism 425 is not limited to these. For example, the adjustment mechanism 24 may include a floor rotation mechanism that rotates at least a part of the floor 403. In this case, the floor 403 preferably includes a plate-shaped fixed part that is fixed to the frame constituting the vehicle body and defines a circular opening and a disc-shaped movable part that is accommodated in the opening to be flush with the fixed part. The movable part is supported by the frame constituting the vehicle body to be rotatable about a vertically extending axis, and the floor rotation mechanism preferably include a motor for rotating the movable part relative to the frame.

Also, the adjustment mechanism 425 may include a rotation mechanism that rotates the seat main body 405 about a laterally extending axis. In this case, the seat main body 405 is supported by the frame constituting the vehicle body to be rotatable about the laterally extending axis, and the adjustment mechanism 425 preferably includes a motor for rotating the seal main body 405.

In a case where the seat main body 405 includes an ottoman provided in front of the seat cushion 410, the adjustment mechanism 425 may include a displacement mechanism for displacing the ottoman. Also, in a case where the seat cushion 410 can freely undergo expansion and contraction in the fore and aft direction, the adjustment mechanism 425 may include an actuator for causing the seat cushion 410 to expand/contract to change the fore and aft length.

Also, the seat system 401 may include a heater 901 (see FIG. 29) provided in the seat main body 405, more specifically, in the seat cushion 410 or the seat back 411. In this case, the control device 470 is preferably connected with the heater 901 to be capable of adjusting the voltage applied to the heater 901. This makes it possible for the control device 470 to change an amount of heat generated, by the heater 901. Thereby, the application execution device 472 can adjust the amount of heat generated by the heater 901 by transmitting a signal to the control device 470. Thus, the seat system 401 can provide the user with an environment even more suitable for use of the application.

Also, the seat system 401 may include an air conditioning device 902 (see FIG. 29) that performs air conditioning in the cabin, and the control device 470 may be connected with the air conditioning device 902 to be capable of controlling the air conditioning device 902. The air conditioning device 902 is a device for adjusting the temperature and/or humidity in the cabin and may be a so-called air conditioner.

Also, the seat system 401 may include a vibration device accommodated inside the seat main body 405 to transmit vibration to the seated user. In this case, the control device 470 is preferably connected with the vibration device to be capable of controlling the vibration device. The control device 470 preferably drives the vibration device according to the execution content of the application.

In the above embodiments, a game application was executed by the application execution devices 472, 772, but the present invention is not limited to this aspect. Fax example, applications for making documents or illustrations may be executed by the application execution devices 472, 772.

In the above-described first embodiment, configuration was made such that the information of the user seated on the seat main body 5 can be acquired by the other user, but configuration may be made such that the user seated on the seat main body 5 can acquire the information.

LIST OF REFERENCE NUMERALS 1, 90, 100, 201, 270, 280, 290, 300, 310, 401, 501, 601, 701 seat system 5 seat main body 7 seat cushion
8 seat back
9 headrest
40 sensor
46 control device
47 user interface
49 mobile terminal
51 camera
55 second communication unit
56 signal processing unit
57 application processing unit
58 viewing image creation unit
59 internet
61 server
62 mobile terminal
64 third communication unit
65 dash panel
67 navigation system
68 control device
69 user interface
70 fourth communication unit
71 control device
72 user interface
73 fifth communication unit
80 viewing image
101 user information processing unit
105 user information screen
205 seat main body
207 seat cushion
208 seat back
209 headrest
211 seat cushion frame
215 seat back frame
221 cushion side member
222 front member
223 rear member
224 pan frame
240 sensor
241 detection unit
242 first communication unit
243 battery
246 control device
247 user interface
248 first control device
248A case
248B connector part
249 mobile terminal
250 second control device
251 second communication unit
252 signal processing unit
253 third communication unit
254 fourth communication unit
255 application processing unit
256 internet
257 server
258 fifth communication unit
259 in-vehicle battery
260 mobile terminal
261 electrical apparatus
262 third control device
262A case
262B slot
264 bracket
272, 273 wireless power supply device
291 car navigation system
402 cabin
403 floor
405 seat main body
405A front seat main body (front-side seat main body)
405B middle seat main body (rear-side seat main body)
410 seat cushion
411 seat back
413 seating surface
415 front door
416 rear door
417 door trim
418 door trim
425 adjustment mechanism
426 slide mechanism
427 reclining mechanism
428 rotation mechanism
441 interior light (lighting)
451 first sensor
452 second sensor
470 control device
477 application execution device
473 touch panel
503 network
504 server
705 seat main body
710 seat cushion
711 seat back
725 adjustment mechanism
751 first sensor
752 second sensor
770 control device
772 application execution device
773 monitor
901 heater
902 air conditioning device
S vehicle

The invention claimed is:

1. A seat system comprising:
a seat main body;
at least one sensor provided in the seat main body;
a control device configured to process a signal from the sensor;
a first user interface and a second user interface each configured to communicate with the control device and to notify information based on a signal from the control device; and
a camera configured to capture an image of a seated person who is seated on the seat main body;
wherein the control device includes an application processing unit configured to execute an application based on a signal from the sensor and a viewing image creation unit,
wherein the application processing unit generates an application screen, causes the second user interface to display the application screen, executes application processes based on signals from the sensor, and changes the application screen displayed on the second user interface,
wherein the viewing image creation unit creates a viewing image based on both image information from the camera and the application screen,
wherein the control device transmits the viewing image to the first user interface, and
wherein the first user interface displays the viewing image including both the image of the seated person and the application screen,
wherein the sensor detects a motion of a body of a user seated on the seat main body, and wherein the application processing unit moves a character in the application screen based on the signal of the sensor.

2. The seat system according to claim 1, wherein the camera is provided on an upper portion of a seat back or a headrest.

3. The seat system according to claim 1, wherein the control device constitutes a mobile terminal and performs wireless communication with the sensor, and the mobile terminal includes the second user interface for displaying the image.

4. The seat system according to claim 3, wherein the first user interface is configured to receive input from a user, and the control device is configured to perform output to the second user interface based on input from the first user interface.

5. The seat system according to claim 1, wherein the control device is configured to communicate with the first user interface via the internet.

6. The seat system according to claim 1, wherein the seat system is a seat system for a vehicle.

7. The seat system according to claim 1, wherein the application processing unit executes game processes as the application processes.

* * * * *